(12) United States Patent
Doi et al.

(10) Patent No.: US 6,389,422 B1
(45) Date of Patent: May 14, 2002

(54) METHOD OF RELAYING FILE OBJECT, DISTRIBUTED FILE SYSTEM, COMPUTER READABLE MEDIUM RECORDING A PROGRAM OF FILE OBJECT RELAY METHOD AND GATEWAY COMPUTER, ALLOWING REFERENCE OF ONE SAME FILE OBJECT AMONG NETWORKS

(75) Inventors: Katsuo Doi; Hiroyoshi Toda, both of Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/237,934

(22) Filed: Jan. 27, 1999

(30) Foreign Application Priority Data

Jan. 27, 1998 (JP) .......................................... 10-014474

(51) Int. Cl.[7] .............................................. G06F 17/30
(52) U.S. Cl. ............................. 707/10; 707/3; 709/217; 709/218; 709/220; 709/223
(58) Field of Search ........................... 709/9, 203, 216, 709/218, 217, 225, 329, 223, 220, 238, 245; 707/10

(56) References Cited

U.S. PATENT DOCUMENTS

| | | | |
|---|---|---|---|
| 4,887,204 A | | 12/1989 | Johnson et al. |
| 4,897,781 A | | 1/1990 | Chang et al. |
| 5,852,717 A | * | 12/1998 | Bhide et al. ................. 709/203 |
| 6,003,077 A | * | 12/1999 | Bawden et al. ............. 709/223 |
| 6,026,474 A | * | 2/2000 | Carter et al. ................. 711/202 |
| 6,035,324 A | * | 3/2000 | Chang et al. ................ 709/203 |
| 6,041,041 A | * | 3/2000 | Ramanthan et al. ........ 370/241 |
| 6,070,184 A | * | 5/2000 | Blount et al. ............... 709/200 |
| 6,085,193 A | * | 7/2000 | Malkin et al. ................. 707/10 |
| 6,144,959 A | * | 11/2000 | Anderson et al. ............... 707/9 |

FOREIGN PATENT DOCUMENTS

| | | |
|---|---|---|
| JP | 63-200244 | 8/1988 |
| JP | 63-201845 | 8/1988 |
| JP | 4-313126 | 11/1992 |
| JP | 7-93205 | 4/1995 |
| JP | 9-231119 | 9/1997 |

* cited by examiner

Primary Examiner—Jean M. Corrielus
(74) Attorney, Agent, or Firm—Nixon & Vanderhye, P.C.

(57) ABSTRACT

A method and system for relaying a file object used in a gateway computer allowing the change of various parameters settings, dependent on particular networks, in a simple manner. The method and system further allowing reference of a file object referred to when a client computer was first connected to a certain network even when the client computer is then connected to another network in a simple manner. The method and system provides for relaying a file object in accordance with any of a plurality of control structures corresponding to a plurality of networks, respectively. The gateway computer includes storage for storing a file object. Each of the plurality control structures has an address of a representative gateway computer to which a client computer is connected. The method of relaying the file object includes the steps of receiving an event, when the event is a request for switching between the control structures, switching various parameters in accordance with that one of the control structures to which switching is requested, when the event is a request for getting the file object transmitted by the client computer, reading and relaying to the client computer the file object from either one of an upstream computer and the storage, and storing the relayed file object in the storage.

60 Claims, 36 Drawing Sheets

FIG.20

| STRUCTURE MEMBER | EXAMPLE OF ELEMENTS |
|---|---|
| NETWORK NAME | "VIA INTERNAL NETWORK LAN" |
| DIAL UP TELEPHONE NUMBER | "03-456-7890" |
| REPRESENTATIVE GATEWAY COMPUTER 1 | "proxy1.foobar.co.jp:8080" |
| REPRESENTATIVE GATEWAY COMPUTER 2 | "proxy2.foobar.co.jp:8080" |
| REPRESENTATIVE GATEWAY COMPUTER 3 | "proxy3.foobar.co.jp:8080" |
| PREFETCH ACCESS WAIT TIME (sec) | 10 |
| PREFETCH ACCESS PERMISSION | true |
| NUMBER OF SIMULTANEOUS PREFETCH ACCESS REQUEST | 2 |
| MAXIMUM NUMBER OF PREFETCH ACCESS LAYERS | 3 |
| TOTAL NUMBER OF PREFETCH ACCESSES | 100 |
| FILE OBJECT SIZE LIMIT (KB) | 20 |
| FILE OBJECT TYPE LIMIT | "gif;jpg;jpeg" |
| PREFETCH ACCESS INHIBITION SERVER COMPUTER | "www.foobar.co.jp;123.45.67.89" |

METHOD OF RELAYING FILE OBJECT, DISTRIBUTED FILE SYSTEM, COMPUTER READABLE MEDIUM RECORDING A PROGRAM OF FILE OBJECT RELAY METHOD AND GATEWAY COMPUTER, ALLOWING REFERENCE OF ONE SAME FILE OBJECT AMONG NETWORKS

BACKGROUND OF THE INVENTION

1. Field of the Invention

The present invention relates to a method of relaying a file object, a distributed file system, a computer readable medium recording a program of a method of relaying a file object, and to a gateway computer. More specifically, the present invention relates to a method of relaying a file object, a distributed file system, a computer readable recording medium, recording a program of a method of relaying a file object and a gateway computer, allowing reference of one same file object among networks.

2. Description of the Background Art

In a conventional distributed file system, a server computer stores replicas of file objects in a storage, that is, a cache. In response to an access request from a client computer, the server computer relays a replica of a file object stored in the cache to the client computer. By such a series of operations, the speed of accessing is improved. Such method has been know from Japanese Patent Laid-Open No. 4-313126 entitled "File Input/Output System for Decentralized File System", and Japanese Patent Laid-Open No. 63-200244 entitled "File Access System", Japanese Patent Laid-Open No. 63-201845 entitled "Remote File Access System", for example. A computer used for such a method and performing the above described operation is generally referred to a as a gateway computer.

A typical example of the distributed file system is the internet which is a global network utilizing TCP/IP (Transmission Control Protocol/Internet Protocol). A distributed file system consisting of file objects in the form of hypertext formed utilizing Hypertext Transfer Protocol (HTTP) on the internet is referred to as a World Wide Web (WWW) system. In the WWW system, when a file object is transferred utilizing HTTP, relaying of a file object by the gateway computer, storing of a replica of the file object and relaying of the replica of the file object are widely performed. The gateway computer relaying the file object in the WWW system on the internet is generally referred to as Proxy server. Generally, the Proxy server is implemented by running a Proxy software on a computer connected to the network.

The file objects include not only simple text but also image, voice, video image and various other data, which are attractive both to providers and users of the information. This results in explosive flow of WWW system traffic on the network.

Further, a user uses a browser software having a graphical user interface installed in a client computer. This allows the user to successively access pieces of information consisting of file objects held by server computers distributed on the network. Because of this simplicity, today, the WWW system is enormously popular.

A file object is specified by a URL (Uniform Resource Locator). If the URL is "http://www. sharp co. jp/image/index.html", the name of the server computer is "www.sharp.co.jp", and a file "image/index.html" in a directory for the Web server in the server computer is designated.

Referring to FIG. 36, the conventional distributed file system includes a server computer 120, a representative gateway computer 116, a client computer 102, a global network 132, and a local network 112. To global network 132, server computer 120 and representative gateway computer 116 are connected. To the local network 112, representative gateway computer 116 and client computer 102 are connected.

A browser 104 is in operation on client computer 102. In accordance with an instruction from a user 100, browser 104 transmits a request for a file object to representative gateway computer 116, receives the file object and presents the file object to user 100.

A Proxy 370 is in operation in representative gateway computer 116. In response to a request for getting a file object transmitted from client computer 104, Proxy 370 reads the file object from the server computer 120 or a cache 374 which will be described later, and transmits the read object to client computer 104. Representative gateway computer 116 includes a cache 374 for storing a file object read from server computer 120, and an access log 372 for storing record of reading (for example, date of reading) of a file object received from server computer 120.

Server computer 120 includes a storage 376 for storing file objects.

Referring to FIG. 37, representative gateway computer 116 is a computer having a network interface, including a CPU (Central Processing Unit) 380, a memory 382, an I/O (Input/Output) unit 388, a file device 390 and a network I/O unit 384. These components of representative gateway computer 116 are coupled by an internal bus 386. File device 390 is classified into a cache file 374, a log file 372 and a unit storing other variables and so on.

Again referring to FIG. 36, a series of operations for getting a file object in the conventional distributed file system will be described.

A client computer 102a transmits a request for a file object to representative gate computer 116 for an access to a file object on an external network.

Proxy 370 which is a process (thread) operating in representative gate computer 116 receives the request.

Proxy 370 accesses cache 374, and determines whether the corresponding file object exists in the cache 374. When the file object is stored in cache 374, Proxy 370 compares valid date thereof with time of change (modification) of the file object stored in cache 374. If the valid date of the file object is not expired, Proxy 370 reads the file object from cache 374, and transmits the file object to client computer 102a.

If there is not a valid file object in cache 374, that is, when the desired file object is absent or when the object is present but the valid date has already been expired, then Proxy 374 transmits a request for the file object to server computer 120 connected to global network 132.

Upon reception of the request, server computer 120 reads the file object from storage 376 and transmits the file object to Proxy 370. Proxy 370 which has received the file object transfers the file object to client computer 102a. Further, it writes the file object to cache 374. At this time, HTTP header information of transfer, date of writing the file object and time and date of accessing are stored in log file 372.

When another client computer 102b transmits a request for getting the same file object to representative gateway computer 116, Proxy 370 reads the file object from cache 374 and transmits it to client computer 102b. In this manner, as client computers 102a and 102b share cache 374, it is possible for client computers 102a and 102b to take out a file object which is frequently requested, at a high speed.

It is possible to operate browser 104 and Proxy 370 simultaneously as separate processes, on a client computer 102. One example of such a client computer 102 is disclosed in Japanese Patent Laid-Open No. 7-93205. Browser 104 on the client computer 102 transmits a request for a file object to Proxy 370 operating on client computer 102 itself In this case, the IP address for specifying a computer on which Proxy 370 is in operation is set to IP address 127.0.0.1 which designates the client computer itself. This enables simultaneous running of browser 104 and Proxy 370 on client computer 102 without any special change or modification to browser 104.

The above described client computer 102 is generally implemented by a desktop computer. A desktop computer has state of the art high speed CPU, large storage memory, a well fitting keyboard with wide key pitch, a large display monitor and a hard disk of large capacity, as well as full specification satisfied only by the stationary computer.

The WWW system on the internet allows the above described method of accessing in which user 100 explicitly requests a specific file object stored in server computer 120 so that the file object is transferred to client computer 102. Further, the system allows the following access method. Namely, hypertext information contained in the file object is analyzed, and hyperlinked another file object is automatically stored in the storage of the client computer 102. A software performing such an accessing operation is generally referred to as an Auto Pilot tool, which operates on client computer 102. The Auto Pilot tool performs automatic accessing in a time band different from the time band when user 100 actually makes an access to the file object of server computer 120 (generally, in a time band when network traffic lightens by utilizing timer reservation, for example).

Different from the above described methods of accessing, there is also a method of accessing in which while user 100 is actually accessing a file object of server computer 120, hypertext information contained in the relayed file object is analyzed, and hyperlinked another object is stored in a storage of representative gateway computer 116 or client computer 102. Further, similar technique are known from Japanese Laid-Open Patent No, 9-231119 entitled "Information Communication System". Such a method in which hypertext information contained in the file object is analyzed to make access to the hyperlinked another file object prior to the user access is generally referred to as prefetch.

The file object utilized in the WWW system or the like on the internet is described in the form of hypertext. The hypertext refers to text with address information allowing access to a plurality of different file objects described therein. The address information allowing access to other file objects is referred to as hyperlink. The user repeats an operation of selecting one of the hyperlinks contained in the file object and getting a further file object. Prefetching is a technique such as described in the following. When client computer 104 first reads a file object in the form of hypertext, representative gateway computer 116 relaying the object or client computer 102 utilizing the object extracts hyperlinks contained in the file object. Representative gateway computer 116 or client computer 102 predicts a file object to be selected by user 100, and the predicted object is stored in advance in the storage of gateway computer 116 or client computer 102.

The prefetch technique for the file object in the hypertext form can readily be understood by an analogy of branch prediction technique, which is a technique for processing instructions in a microprocessor. Instructions executed by a microprocessor includes a plurality of branch instructions. Microprocessor executes a branch instruction and thereafter, in accordance with the result of execution, reads from the memory an instruction to be executed next from the branch destination. This interrupts pipeline processing, resulting in much time for processing. Therefore, an operation has been known in which at a time point when the microprocessor reads a branch instruction, a branch destination is predicted, and instruction at the predicted branch destination is read to a branch instruction buffer, which operation is referred to as dynamic branch prediction. The essence of the dynamic branch prediction is the prefetch technique. In the branch prediction technique for the microprocessor, various methods have been proposed, and in some of which, types of instructions or history of the branch instruction are learned. Efficiency of prefetching depends on the differences in specific methods of prediction.

It is of great importance also in the technique of prefetching of hypertext file objects to improve the efficiency of prefetching.

In order for a user to take and carry about the file objects stored in client computer 102, which is a desktop computer, it is necessary to provide a replica of a desired file object to a portable computer (hereinafter referred to as "mobile computer").

As to the method of providing a replica of the file object, an off line reader software which will be described later, may be run on the mobile computer, so that the object file on the server computer is stored in the mobile computer. Alternatively, the file object stored in the desktop computer may be copied to the mobile computer. However, this method requires explicit operation of the user, and therefore it is not very convenient.

A browser on the desktop computer may use an arbitrary storage as a cache for storing a file object. Therefore, when a storage device having a portable storage medium is used as a cache, the file object may be moved. Such a storing medium and the storing device are represented by a floppy disk and a floppy disk drive, respectively. Read/write from and to the floppy disk drive is at a low speed, and the floppy disk has a storage as small as about 1 MB (Mega Byte). Therefore, by the floppy disk, it is impossible for a user to carry about only about 20 file objects each having the average data amount of 50 KB (Kilo Byte). Therefore, it is difficult to carry about a file object of large capacity.

The disadvantage in the speed of operation may be addressed by using a Flash Disk card of PCMCIA type utilizing a flash memory, as a cache. The flash memory, however, is expensive, and involves exchange (replacing) to the mobile computer when the user moves. Therefore, carrying of the cache causes troublesome work.

Further, a common desktop computer does not have any PCMCIA slot. In order to utilize a Flash Disk card, it is necessary to additionally provide an extension PCMCIA unit to the computer.

It is possible to have two hard disks of which contents are always identical, by utilizing mirroring technique of the hard disk and to carry about only one of these hard disks. However, the hard disk of the desktop computer is not so designed as to allow the user to remove and carry. Therefore, it is not convenient.

Assuming that the cache is movable, a separate cache is further required in order to use the browser operating on the desktop computer to which the cache originally belongs.

Accordingly, it is necessary for the user to change the setting of the browser to use another cache. When another cache does not actually exist, the browser itself is not activated. Therefore, it is difficult to modify the setting.

For a user to use a cache on a separate desktop computer connected to a network at the place where the user moves to, it is necessary to change the setting of the browser as described above, and in addition, the setting of the browser must be changed again to the original state after operation at that site is complete. If the user forgets to restore the setting of the browser, the browser of the desktop computer at the site cannot be activated. Further, when the cache is to be returned to the original desktop computer, the user must remember the original setting of the browser.

The type of file objects stored in the cache differ from browser to browser. Therefore, the user cannot help but use the same browser at the computer at his destination.

As described above, the method of storing a file object in a movable cache on a desktop computer which is not portable, carrying about the cache and referring to the file object stored in the cache on a network at one's destination means that some necessary components of the browser are moved, and therefore such method has various problems in actual use. Further, the method strongly depends on the browser, and therefore the method is not generally applicable.

Software for automatically down loading a file object on a server computer from a URL to a prescribed layer is referred to as off line reader software (or Auto Pilot software). Among such software, some supports Proxy type. The off line reader software automatically gets a file object and stores it in the cache, when the URL and the depth of the layer are designated.

Operation of such an off line reader software is not very convenient on a mobile computer which is small and has poor display function. Further, it is possible for the off line reader software to transfer the file object of an URL only to a prescribed layer. Therefore, in order to transfer and carry about a file object at a deeper layer, it is necessary to set the URL or the number of layers again in the off line reader software. Therefore, the user who is working using the browser on a desktop computer must stop his or her work. Further, the off line reader software is designed not on the premise that the software is used moving over a plurality of networks. Therefore, it is necessary for the user to designate an upstream gateway computer at every site where the user moves to, which operation is troublesome.

Further, the off line reader software is also used as the Proxy from other computers, and therefore the user of the software cannot be limited to an individual.

Dependent on the network, it is necessary for a downstream gateway computer to designate an upstream gateway computer by Automatic Proxy Configuration Script. Automatic Proxy Configuration Script is a set up file in accordance with an automatic set up script described in Java script language, which indicates, on the basis of a rule, a method of selecting an upstream gateway computer.

If an address of the WWW server storing Automatic Proxy Configuration Script is "http://www.foobar.co.jp/setup.pac", then Proxy server selection rule is written therein. An example of Automatic Proxy Configuration Script at this time is as shown in Table 1. Every time the WWW browser accesses a file object, Find ProxyForURL ( ) selecting function is executed, a Proxy server to be used for a return value is described by a character string, and the browser is controlled.

TABLE 1

```
function FindProxyForURL(url,host)\r\n
{\r\n
    if(shExpMatch(host,"*.com"))\r\n
    return "PROXY Proxy.foobar.co.jp:8080;"+\r\n
        "DIRECT"; \r\n
    else\r\n
    return "PROXY Proxy1.foobar.co.jp:8080;"+\r\n
        "DIRECT"; \r\n
}\r\n
```

The URL name of the file object is passed to a variable "url" and the name of the WWW server is passed to a variable "host", respectively. A 10 character string pattern comparing function referred to as shExpMatch( ) function is used. Here, it is designated that URLs such as "http://www.asahi.com/", that is, those having ".com" at the last part of the host name are designated by port number 8080 of gateway computer Poxy.foobar.co.jp, and others are processed by port number 8080 of gateway computer Proxy1.foobar.co.jp.

More specifically, there are two methods of Proxy server designation, that is, one in which an address and a port number of one Proxy server are designated and one in which an URL address of Automatic Proxy Configurations script is designated. No matter which method is used for designating an address, the Proxy must correctly recognize the upstream gateway computer.

As described above, when the Proxy is operated on a mobile computer as described above, set up allowing use of the Proxy on the mobile computer from a browser on the desktop computer is not possible unless the address and the port number can be readily known from the desktop computer. Therefore, it is necessary that the IP address and the port number of the mobile computer must be indicated on the display of the mobile computer.

As described above, when the Proxy used by the browser of the desktop computer is a mobile Proxy server, it is not possible for the browser to access the network unless there is a mobile computer on which the mobile Proxy server operates. For this reason, when the mobile computer is moved, it is necessary for the user to change the Proxy setting of the browser. Once the Proxy setting is changed, it is necessary for the user to recover the setting when it becomes possible to use the mobile computer again. Such troublesome operation should be avoided.

In a network where information of an upstream Proxy is applied by Automatic Proxy Configuration, it is indispensable for the mobile Proxy server to contain a Java script interpreter to decode Automatic Proxy Configuration script. Implementation of a Java script interpreter, however, generally increases burden on a mobile computer of which speed of processing is generally lower than that of the desk top computer. In some cases, implementation of the interpreter is not desired.

Further, the information of the file object read by the browser, that is, history information identifying what was the URL of the object, is stored and displayed only by the browser of the desktop computer. Therefore, it is not possible to refer to the history information at one's destination. Therefore, it is difficult for a user to refer to the URLs accessed by the desktop computer at a place where the user moves to.

Further, there are file objects which can be referred to only by corresponding networks. One example of such file objects is an information page provided on an internal network (intranet) of a company. Assume that a user works while moving on the intranet. Even if it is possible to display history information, it may not be possible for the user to get a file object if the file object included in the history information is provided only on the intranet. More specifically, it is necessary that the mobile computer is physically connected to the corresponding intranet. Therefore, it is necessary to explicitly indicate which network the URL included in the history information belongs to.

The Proxy server does not store in the cache a page which is dynamically created, such as CGI. Generally, a gateway computer is shared by a plurality of users. A page dynamically created for an individual must not be browsed by others, to protect privacy of the individual.

In a company, for example, telephone book data, book and chit data, address book data, figure data, map data and table data are stored in a WWW server computer connected to the intranet. The information is provided as pages browsable by a browser, whereas the information are dynamic pages created with different attributes added user by user. Therefore, the Proxy does not store the dynamic pages in the cache. Therefore, it is not possible for the user to carry about this useful information.

In a gateway computer of a conventional distributed file system, a file object is relayed for the first time after the user issues an access request to the file object in the server computer. Therefore, it takes time for an access to a file object of a server computer which has never been accessed by the user before.

The following is a solution to this problem. At a time band different from the time when the user actually accesses to a file object of the server computer, a client computer analyzes hypertext information included in the file objects of the server computer. The client computer automatically accesses to a separate file object at a hyperlinked destination in accordance with the result of analysis, and stores the object in a storage of the client computer in advance. Therefore, when the user actually accesses to the file object of the server computer, the user utilizes a replica of the file object stored in the storage of the client computer, and thus the speed of access is improved.

In this method, however, it is necessary to predict a file object of the server computer to which access in the future is expected. Further, the method does not function well in accessing to a file object of a server computer which cannot be predicted by the user (for example, latest information from a news flash). More specifically, a replica of the file object in the server computer is stored in the storage at a time band different from the time of actual access by the user. If the file object is updated in the meantime, the user may undesirably refer to a replica of the old file object.

The above described prefetch is a solution to this problem. According to the method, however, an access to a separate file object takes place parallel to an actual access to a file object of the server computer by the user. Therefore, a high load is applied to the gateway computer relaying the file object and to the client computer (when the client computer is prefetching). Further, file objects which may not be actually accessed by the user are also relayed, which increases network traffic.

When a client computer on a certain network is to be used as a client computer on a different network at a different site where the user moves to, the replica of the file object of the server computer stored in the gateway computer storage of the certain network cannot be used by the different network.

When a mobile computer having a prefetch access function on a certain network is to be used as it is on a different network at a site where the user moves to, communication speed of the circuit differ network by network. This results in different access speed, hindering satisfactory prefetch access.

Among the client computers and gateway computers existing between the client computers and the server computer, when there are a plurality of computers having the function of issuing prefetch access request, these computers may request prefetch access independent from each other, resulting in double prefetch access to one same file object, storage of replicas of one file object in several computers and so on, which are wasteful.

Further, when use of a replica of a file object stored in the storage is inhibited or when only the latest replica of the file object stored in the storage is to be used, in accordance with designation of user access request, such conditions are not reflected on the prefetch access request. Therefore, a latest file object of the server computer may not be obtained by the prefetch access request.

SUMMARY OF THE INVENTION

The present invention was made in view of the foregoing and its object is to provide a method of relaying a file object used in a gateway computer which allows change of various parameters settings dependent on the network in a simple manner, and allows reference of a file object, which was referenced when a client computer was connected to a certain network, even when the client computer is connected to another network, in a simple manner.

An additional object of the present invention is to provide a method of relaying a file object allowing simple network set up of a client computer.

A still further object of the present invention is to provide a method of relaying a file object securing confidentiality of a file object stored in the gateway computer.

A still further object of the present invention is to provide a method of relaying a file object allowing a gateway computer to refer to an address of a file object relayed when a client computer was connected to a certain network, even when the client computer is connected to a different network.

A still further object of the present invention is to provide a method of relaying a file object allowing reference of a file object read in advance based on a hyperlink included in a file object relayed by the gateway computer, even when a client computer is connected to another network.

A still further object of the present invention is to provide a method of relaying a file object allowing prefetching, even when the gateway computer does not relay the file object.

A still further object of the present invention is to provide a distributed file system in which it is unnecessary for the gateway computer to perform a process of switching an upstream computer, in a file object relaying process.

A still further object of the present invention is to provide a distributed file system in which it is unnecessary for the gateway computer to perform switching of an upstream computer, and in which it is unnecessary to implement an interpreter for interpreting a script in the gateway computer.

A still further object of the present invention is to provide a distributed file system allowing efficient file object relay.

A still further object of the present invention is to provide a computer readable recording medium storing a program of a method of relaying a file object used in a gate way computer, which allows change in various parameters settings dependent on the network in a simple manner and which allows reference of a file object referred to when a client computer was connected to a certain network, even when the client computer is connected to another network, in a simple manner.

A still further object of the present invention is to provide a computer readable recording medium storing a program of a method of relaying a file object which secures confidentiality of a file object stored in a gateway computer.

A still further object of the present invention is to provide a computer readable recording medium storing a program of a method of relaying a file object which allows reference of a file object which has been read ahead in accordance with a hyperlink included in a file object relayed by a gateway computer, in a simple manner even when a client computer is connected to a different network.

A still further object of the present invention is to provide a computer readable recording medium storing a program of a method of relaying a file object allowing prefetching, even when a gateway computer does not relay a file object.

A still further object of the present invention is to provide a gateway computer which allows change of various parameters settings dependent on the network and allows reference to a file object which was referred to when a client computer was connected to a certain network, in a simple manner even when the client computer is connected to another network.

A still further object of the present invention is to provide a gateway computer allowing reference to a file object which has been read ahead in accordance with a hyperlink included in a file object relayed by the gateway computer in a simple manner even when a client computer is connected to another network.

A still further object of the present invention is to provide a gateway computer allowing prefetching even when relay of a file object is not performed.

In accordance with an aspect of the present invention, the method of relaying a file object is used in a gateway computer for relaying a file object in accordance with any of a plurality of control structures which correspond to a plurality of networks, respectively. The gateway computer includes a storage for storing file objects. Each of the plurality of control structures has an address of a representative gateway computer to which a client computer is connected. The method of relaying a file object includes the steps of: receiving an event; when the event is a request for switching between the control structures, switching various parameters in accordance with that control structures to which switching is requested; when the event is a request for a file object transmitted from a client computer, reading the file object from either one of an upstream computer and the storage and relaying the read object to the client computer, and storing the relayed file object to the storage.

The gateway computer has a control structure for each network, and based on the control structure to which switching is requested, the gateway computer switches various parameters. Therefore, even when the gateway computer consists of a movable computer, it is possible for a user to change settings of various parameters in a simple manner. Further, file objects stored in the storage of itself can be referenced in a simple manner at a site where the user moves to.

Preferably, the method of relaying a file object further includes the step of displaying network address information of the gateway computer.

The gateway computer displays the network address information. Therefore, it is possible for the user, seeing the network address information, to know the network information of the gateway computer to which the client computer is connected, in a simple manner. Therefore, it is possible for the user to perform network set up of the client computer in a simple manner.

More preferably, each of the plurality of control structures further has a permission address pattern. The above described step of relaying includes the steps of determining, when the event is a request for getting a file object, whether the address of the client computer transmitting the request matches the permission address pattern, and when it matches the permission address pattern, reading the file object from the upstream computer or the storage and relaying the read object to the client computer.

The gateway computer relays a file object only in accordance with a request for the file object from a client computer which matches the permission address pattern determined for each of the networks to be connected. Therefore, even when different networks have one address system, it is possible to designate a client computer which is capable of requesting a file object for every network, and therefore confidentiality of the file object stored in the gate computer is secured.

More preferably, each of the plurality of control structures further has a permission user name and a password. The above described step of relaying includes the steps of asking a user using that client computer which has transmitted a request for getting a file object to input a user name and a password, receiving the user name and the password transmitted from the client computer, comparing the user name and the password received from the client computer with the user name and the password stored in the control structure, and when these match, reading the file object from either an upstream computer or the storage and relaying the read object to the client computer.

The gateway computer relays a file object only in accordance with a request for getting a file object from a specific user. Therefore, confidentiality of the file object stored in the gateway computer is secured.

More preferably, the method of relaying a file object further includes the step of history display for displaying, when the event is a request for displaying history, an address of the file object relayed in the above described step of relaying.

The gateway computer displays the address of the relayed file object in accordance with a history display request. Therefore, an address of the file object which was relayed when the gateway computer was connected to a certain network can be referred to when a client computer is connected to another network.

More preferably, the above described step of relaying further includes a user access request relay step for reading, when the event is a request for a file object, the file object from an upstream computer or the storage and relaying the read object to the client computer, and a prefetch step for further reading, based on a hyperlink included in the relayed file object, the file object from an upstream computer or the storage and storing the further read object in the storage.

It is possible to read a file object ahead based on a hyperlink included in the file object relayed by the gateway computer. Therefore, it is possible to refer to the file object read in advance even when a client computer is connected to a different network, in a simple manner.

More preferably, the method of relaying a file object includes the steps of reading, when the event is a response designating use of a file object stored in the client computer, a file object which is the same as the file object stored in the client computer designated by the response, and based on the hyperlink included in the read file object, further reading a file object from an upstream computer or the storage, and storing the further read object in the storage.

The gateway computer prefetches and stores a file object in the storage even when there is not a request for a file object from the client computer. Therefore, even when the file object is already stored in the client computer and the gateway computer does not relay any file object, prefetching is possible.

According to another aspect of the present invention, the distributed file system includes a plurality of upstream computers, a gateway computer and a client computer. The gateway computer includes a plurality of Proxy server threads corresponding to the plurality of upstream computers respectively, each receiving a request for getting a file object from the client computer, reading a file object from respective ones of the plurality of upstream computers and relaying the read object to the client computer. The client computer includes a first unit for transmitting a request for getting a file object to any of the plurality of Proxy server threads in accordance with the type of the file object to be requested, and for receiving the file object from any of the plurality of Proxy server threads.

The client computer selects any of the plurality of Proxy server threads in accordance with the type of the file object and transmits a request for getting the file object. Each of the plurality of Proxy server threads receives the request for getting the file object, gets the file object from an upstream computer and relays the object to the client computer. Therefore, it is unnecessary for the gateway computer to perform switching of the upstream computers.

Preferably, the gateway computer further includes a unit for generating a script to establish correspondence between a file object and any of the plurality of upstream computers in accordance with the type of the file object and transmitting the script to the client computer. The above described first unit includes a unit for transmitting a request for getting the file object to any of the plurality of Proxy server threads determined from the script in accordance with the type of the file object to be requested, and for receiving the file object to any of the plurality of Proxy server threads.

The client computer selects any of the plurality of Proxy server threads determined from the script in accordance with the type of the file object, and transmits a request for getting the file object. Each of the plurality of Proxy server threads receives a request for getting the file object, gets the file object from an upstream computer and relays the object to the client computer. Therefore, it is unnecessary for the gateway computer to perform switching between the upstream computers, and therefore it is unnecessary to implement an interpreter for interpreting the script in the gateway computer.

In accordance with a still further aspect of the present invention, the distributed file system includes a client computer, a first gateway computer connected to the client computer, a second gateway computer connected to the first gateway computer, and an upstream computer connected to the second gateway computer. The first gateway computer includes a first instruction adding unit receiving a request for getting a file object from the client computer, adding an instruction for executing a prefetch access request and transmitting the resulting request to the second gateway computer. The second gateway computer includes a second instruction analyzing unit receiving the request for a file object with the instruction for executing a prefetch access request added by the first instruction adding unit, for interpreting an instruction for executing the prefetch access request, a second storage storing the file object, and a second prefetch processing unit connected to the second instruction analyzing unit, reading the file object from either the upstream computer or the second storage based on a hyperlink included in the prefetch access request, and storing the read object in the second storage.

As the prefetch request is transmitted from serially connected first gateway computer to the second gateway computer, double prefetching of one same file object can be avoided. This enables efficient relay of the file object.

The computer readable recording medium in accordance with a still further aspect of the present invention records a program of a method of relaying a file object used in a gateway computer relaying a file object, in accordance with any of a plurality of control structures which correspond to a plurality of networks, respectively. The gateway computer has a storage for storing file objects. Each of the plurality of control structures has an address of a representative gateway computer to which a client computer is connected. The method of relaying a file object includes the steps of receiving an event, when the event is a request for switching between control structures, switching various parameters in accordance with that control structure to which switching is requested, and when the event is a request for getting a file object transmitted from the client computer, reading the file object from either an upstream computer or the storage and relaying the read object to the client computer, and storing the relayed file object in the storage.

The gateway computer has control structures for respective networks, and switches various parameters based on that one of the control structures to which switching is requested. Therefore, even when the gateway computer is provided as a movable computer, it is possible for the user to easily change settings of various parameters. Further, it is possible for the user to refer to the file object stored in the storage of itself even at a site where the user moves to in a simple manner.

More preferably, each of the plurality of control structures further has a permission address pattern. The above described step of relaying includes the steps of, when the event is a request for getting a file object, determining whether an address of the client computer transmitting the request matches the permission address pattern, and when the address matches the permission address pattern, reading the file object from either an upstream computer or the storage and relaying the read object to the client computer.

The gateway computer relays a file object only in accordance with a request for getting the file object from that client computer which matches the permission address pattern determined for every network to be connected. Therefore, even when different networks have the same address system, it is possible to designate a client computer which is allowed to request a file object for each network, and therefore confidentiality of the file object stored in the gateway computer is secured.

More preferably, each of the control structures further has a permission user name and a password. The above described step of relaying includes the steps of asking the user using the client computer transmitting a request for getting the file object to input a user name and a password, receiving the user name and the password transmitted from the client computer, comparing the user name and the password received from the client computer with the user name and the password stored in the control structure, and when these match, reading the file object from either an upstream computer or the storage and relaying the read object to the client computer.

The gateway computer relays a file object only in accordance with a request for the file object from a specific user. Therefore, confidentiality of the file object stored in the gateway computer is secured.

More preferably, the above described step of relaying includes a user access request relaying step for reading, when the event is a request for a file object, the file object from either an upstream computer or the storage and relaying the read object to the client computer, and a prefetch step for further reading, based on a hyperlink included in the relayed file object, a file object from either the upstream computer or the storage, and storing the further read object in the storage.

It is possible to read a file object in advance based on the hyperlink included in the file object relayed by the gateway computer. Therefore, the file object read in advance can be referred to in a simple manner even when the client computer is connected to a different network.

More preferably, the above described method of relaying a file object further includes the steps of reading, when the event is a response designating use of a file object stored in the client computer, a file object which is the same as the file object stored in the client computer designated by the response, and further reading a file object from either the upstream computer or the storage based on a hyperlink included in the read file object and storing the further read object in the storage.

The gateway computer prefetches even when there is no request for a file object from the client computer, and stores the file object in the storage. Therefore, even when the file object is already stored in the client computer and the gateway computer does not relay any file object, prefetching is possible.

The gateway computer in accordance with a still further aspect of the present invention includes a storage for storing a file object and a plurality of control structures corresponding to a plurality of networks, respectively, a unit for receiving an event from a client computer, a unit for switching various parameters in accordance with that one of the control structures to which switching is requested when the event is a request for switching between the control structures, a relay unit for reading, when the event is a request for getting a file object, the file object from either an upstream computer or the gateway computer and relaying the read object to the client computer, and a storing unit for storing the relayed file object in the storage. Each of the plurality of control structures has an address of a representative gateway computer to which the client computer is connected.

The gateway computer has a control structure for each network, and switches various parameters based on the control structure to which switching is requested. Therefore, even when the gateway computer is provided as a movable computer, it is possible for the user to change settings of various parameters in a simple manner. Further, it is possible for the user to refer to the file objects stored in the storage of its own at a site where the user moves to.

More preferably, the relay unit includes a user access request relaying unit for reading, when the event is a request for getting a file object, the file object from either the upstream computer or the gateway computer and relaying the read object to the client computer, and a prefetch unit for further reading a file object from either the upstream computer or the gateway computer based on a hyperlink included in the relayed file object and storing the further read object in the storage.

It is possible to read a file object in advance based on the hyperlink included in the file object relayed by the gateway computer. Therefore, the file object read in advance can be readily referenced even when the client computer is connected to a different network.

Preferably, the relay unit includes a unit for reading, when the event is a response designating use of a file object stored in the client computer, the file object which is the same as the file object stored in the client computer designated by the response from the storage, and a unit for further reading, based on a hyperlink included in the read file object, a file object from either the upstream computer or the storage and storing the further read object in the storage.

The gateway computer prefetches even when there is no request for getting a file object from the client computer, and stores the file object in the storage. Therefore, even when the file object is already stored in the client computer and the gateway computer does not relay any file object, prefetching is possible.

BRIEF DESCRIPTION OF THE DRAWINGS

The foregoing and other objects, features, aspects and advantages of the present invention will become more apparent from the following detailed description of the present invention when taken in conjunction with the accompanying drawings.

FIG. 20 shows an example of a Proxy control structure.

DESCRIPTION OF THE PREFERRED EMBODIMENTS

Figure 1:
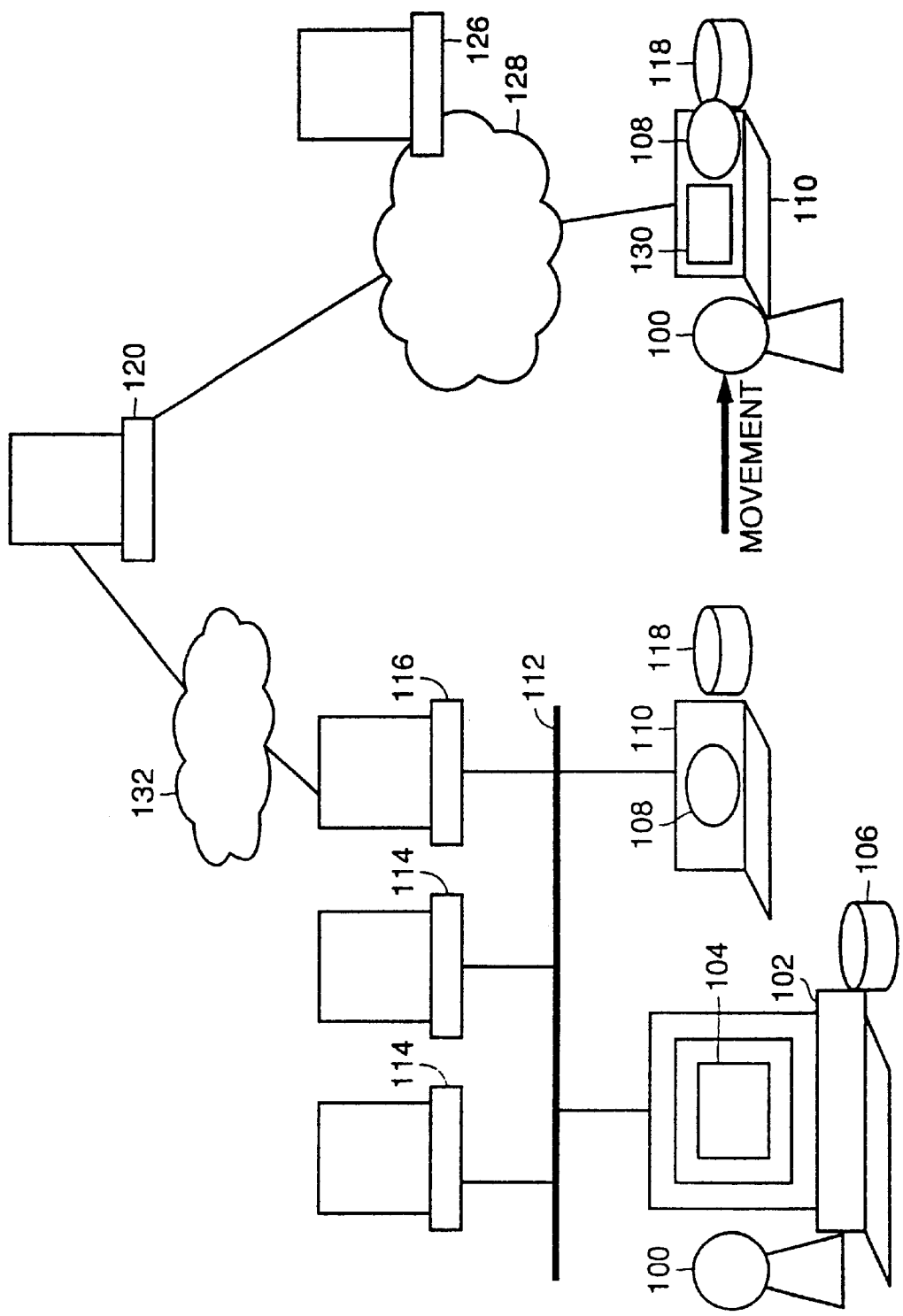
FIG. 1 shows a configuration of a distributed file system in accordance with a first embodiment.

A distributed file system which is one of the embodiments of the present invention will be described with reference to the figures. In the following description, the same components are denoted by the same reference characters. The names and functions are also the same. Therefore, description thereof is not repeated.

First Embodiment

Referring to FIG. 1, the distributed file system in accordance with the first embodiment includes a server computer 120, a representative gateway computer 116, local server computers 114, a gateway computer 110, a client computer 102, a representative gateway computer 126, a local network 112, a network 128 and a global network 132. To global network 132, server computer 120 and representative gateway computer 116 are connected. To local network 112, representative gateway computer 116, local server computers 114, client computer 102 and gateway computer 110 are connected. To network 128, representative gateway computer 126, server computer 120 and gateway computer 110 after moving are connected. On gateway computer 110, a Proxy 108 is in operation. On client computer 102, a browser 104 is in operation.

In the distributed file system in accordance with the first embodiment, gateway computer 110 is connected to local network 112, and Proxy 108 with a cache operates therein. Browser 104 of client computer 102 gets a file object via Proxy 108 of gateway computer 110.

Client computer 102 is a computer including a CPU, a memory, a hard disk, an I/O interface, a keyboard, a display device and a network I/F (interface).

The information browsed by client computer 102 is cached in gateway computer 110. Therefore, even when gateway computer 110 is moved, it is possible for the user to get the information not through the network, but by accessing a mobile Proxy cache 118 from browser 104 in gateway computer 110. Therefore, it is expected that the access time is reduced.

As will be described with reference to FIG. 4 later, it is possible for the user to access to the information through Proxy 108 from a desktop computer at a site where the user moves to.

Recently, a storage (disk device) of a personal computer generally has a storage capacity of 1 GB or more. Though an OS (Operating System) and application softwares are stored in the disk device at the time of shipment, there is still an unavailable area of 500MB or more.

Therefore, in the distributed file system in accordance with the first embodiment, Proxy 108 is always kept in operation in gateway computer 110. A part of a free area of the disk device is used as a mobile Proxy cache 118. For the network I/F, an Ethernet card, which is one type of a PCMCIA card, is used.

Client computer 102 accessed Proxy 108 of gateway computer 110 through local network 112, and accesses local server computer 114 through Proxy 108. When an outside server computer 120 (outside of the user's company) is to be accessed, client computer 102 accesses representative gateway computer 116 through Proxy 108, and representative gateway computer 116 accesses server computer 120 which is connected to global network 132.

A basic operation of the distributed file system in accordance with a first embodiment will be described in the following.

Proxy 108 performs a process in accordance with an instruction transmitted from browser 104 or an instruction input through an input device such as a keyboard.

Figure 2:
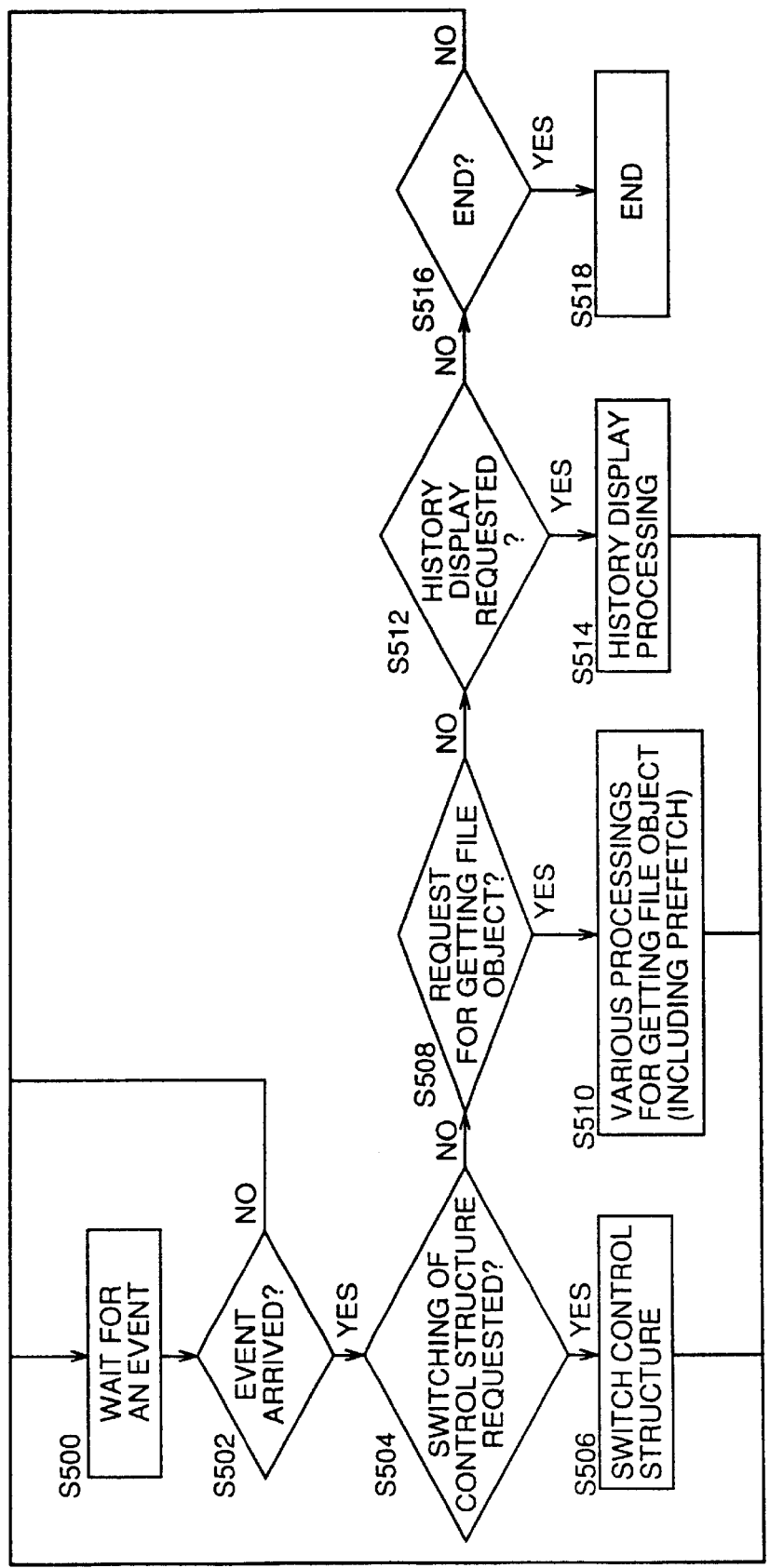
FIGS. 2 and 3 are flow charts related to an operation of the Proxy.

Referring to FIG. 2, Proxy 108 waits for arrival of an instruction (event) (S500). Proxy 108 determines whether an event has arrived (S502). If an event has not yet arrived (NO in S502), Proxy 108 waits for the arrival of the event (S500). If an event arrives (YES in S502), Proxy 108 performs various processings (S504 to S514), dependent on what the event is. If the event requires switching between Proxy control structures (YES in S504), Proxy 108 performs a process for switching the Proxy control structures (S506), which will be described later, and again waits for an arrival of an event (S500). If the event is a request for getting a file object (YES in S508), Proxy 108 performs various processings (including prefetching) for getting the file object, as will be described later (S510), and again waits for an arrival of an event (S500). If the event requests display of a history (YES in S512), Proxy 108 performs a process of history display, which will be described later (S514), and again waits for an arrival of an event (S500). If the event is an end event (YES in S516), Proxy 108 ends processings (S518). If the event is not any of the four events mentioned above (NO in S516), Proxy 108 again waits for an arrival of an event (S500).

Again referring to FIG. 1, an operation when a user 100 accesses local server computer 114 using browser 104 operating on client computer 102 will be described.

1. In accordance with a designation by user 100, browser 104 transmits a request for a file object.
2. Proxy 108 receives the request for a file object transmitted from browser 104, and accesses local server computer 114 "intranet.foobar.co.jp" through representative gateway computer 116 in the company. Proxy 108 gets the file object and stores it in a Web server 106.
3. Proxy 108 transfers the file object to browser 104. Thus, a replica of the file object is made (cached) in gateway computer 110. The same applies to an access to a server computer 120 "www.sharp.co.jp" outside the company.

Next, an operation when user 100 moves carrying gateway computer 110 will be described.

First, an operation when user 100 accesses local server computer 114 "intranet.foobar.co.jp" utilizing browser 130 inside gateway computer 110 will be described. Browser 130 provides a set up for getting a file object through Proxy 108. When the file object for which request has been transmitted by the user is stored in mobile Proxy cache 118, Proxy 108 returns the file object to browser 130. Therefore, it is possible for the user to refer to the information of local server computer 114 through network 128 at the site where the user has moved to and is staying.

Next, an operation when a file object stored in server computer 120 and not stored in cache 118 is to be obtained through network 128 will be described. Here, it is assumed that gateway computer 110 does not pass through representative gateway computer 126.

1. User 100 asks Proxy 108 to get a file object on server computer 120 "www.sharp.co.jp" using browser 130 operating on gateway computer 110.
2. In response to the asking, Proxy 108 inspects mobile Proxy cache 118. When the file object is not cached, Proxy 108 accesses server computer 120 through network 128 and gets the file object. Proxy 108 caches the file object in mobile Proxy cache 118.
3. The file object is also transferred from Proxy 108 to browser 130.

An operation when gateway computer 110 gets a file object not stored in mobile Proxy cache 118 through an upstream representative gateway computer 126 will now be described.

1. User 100 asks Proxy 108 to get a file object on server computer 120 using browser 130 operating on gateway computer 110.
2. In response to the asking, Proxy 108 inspects mobile Proxy cache 118. If the file object is not cached, Proxy 108 accesses server computer 120 through upstream representative gateway computer 126 and gets the file object. Proxy 108 stores the file object in mobile Proxy cache 118.
3. The file object is also transferred from Proxy 108 to browser 130.

Figure 3:
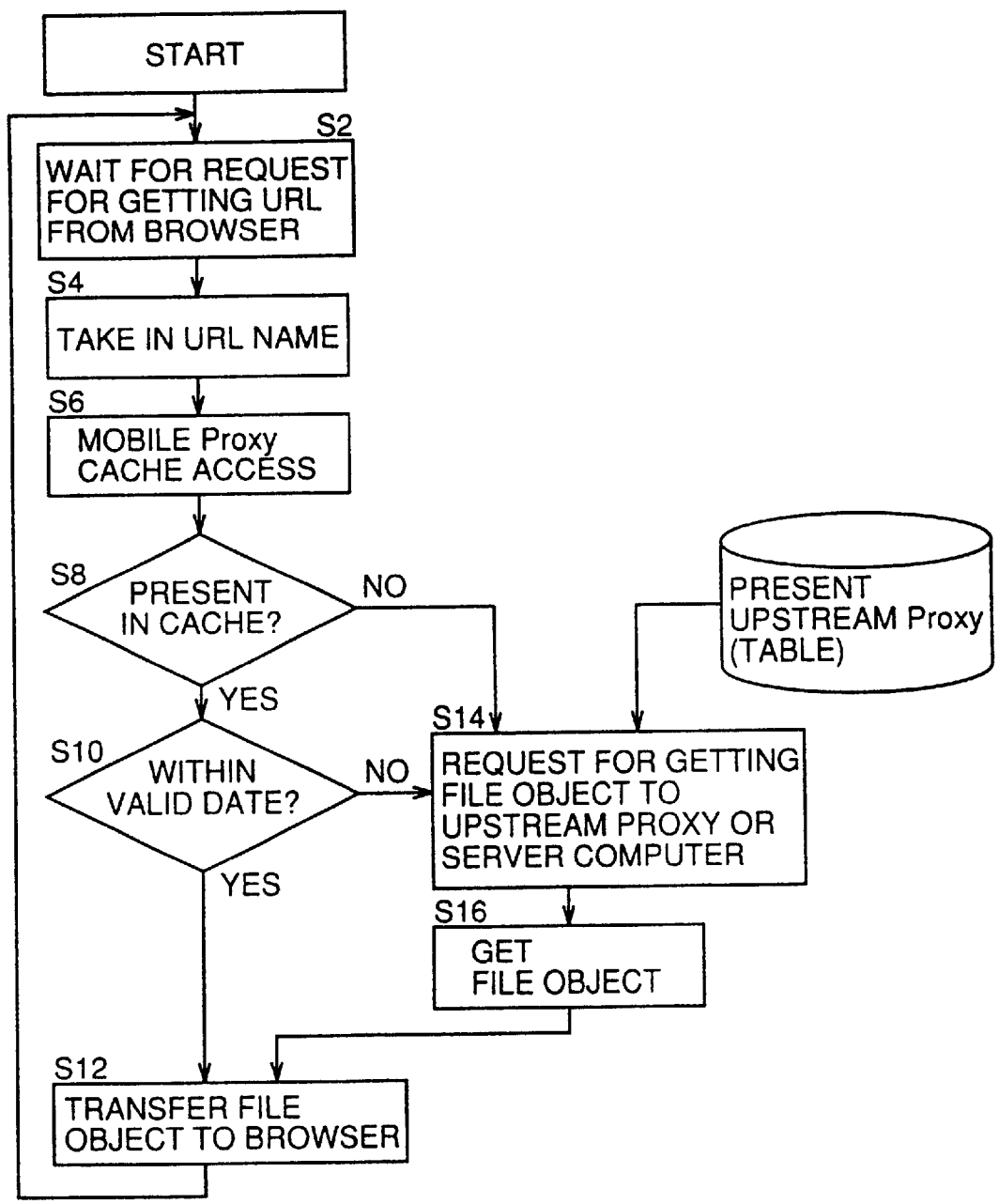

An operation of Proxy 108 used in the distributed file system operating in the above described manner will be described with reference to FIG. 3.

Proxy 108 waits for transmission of a request for getting a file object (URL) from browser 104 (130) (S2). When the request for getting a file object is transmitted, Proxy 108 takes the URL name from the request (S4). In order to search for a file object corresponding to the taken URL name, Proxy 108 accesses mobile Proxy cache 118 (S6). Proxy 108 determines whether the file object exists in mobile Proxy cache 118 (S8). If it is in the mobile Proxy cache 118 (YES in S8), Proxy 108 determines whether the valid date of the file object has expired or not (S10). If the file object is within the valid date (YES in S10), Proxy 108 takes out the file object from mobile Proxy cache 118 and transfers the file object to browser 104 (130) (S12). Thereafter, the flow returns to the process of S2.

When the requested file object does not exist in the mobile Proxy cache 118 (NO in S8), or when the requested file object exists in the mobile Proxy cache 118 but the valid date of the file object has already expired (YES in S8 and NO in S10), the following process takes place. More specifically, in accordance with information as to whether connection to a Proxy server computer is to be made or not, and if the connection is to be made, information of to which Proxy server computer connection is to be made, Proxy 108 transmits a request for the file object to the upstream representative gateway computer 126 or server computer 120 (S14). Proxy 108 gets the file object from the corresponding computer (S16), and transfers the file object to browser 104 (130) (S12).

As described above, browser 104 of client computer 102 gets a file object through Proxy 108 of gateway computer 110. Accordingly, information of access request of user 100 is cached in gateway computer 110. Therefore, it is possible for user 100 to refer to the file object at a site where the user has moved to and is staying.

Figure 4:
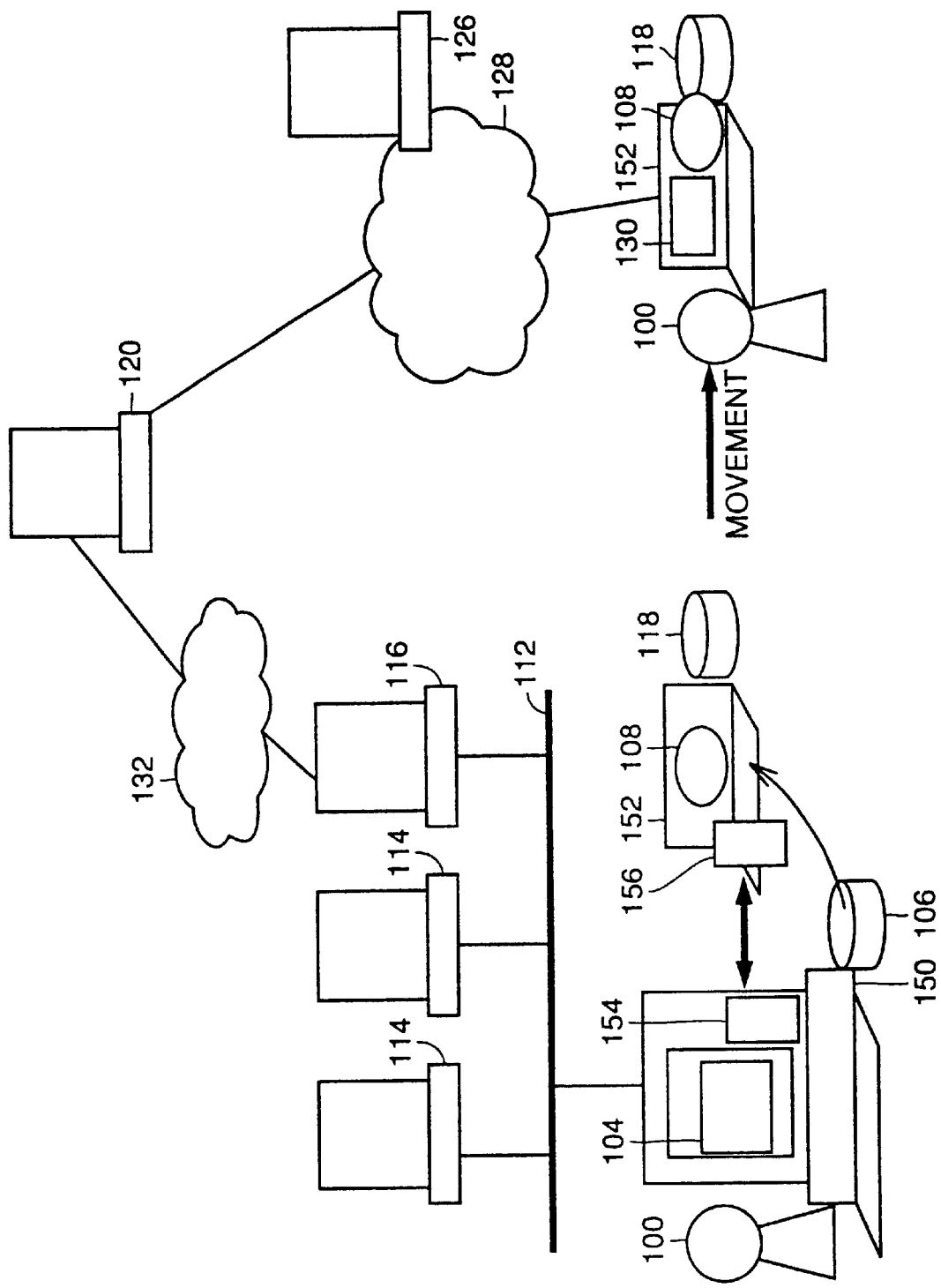
FIG. 4 shows a configuration of the distributed file system in accordance with the first embodiment.

IrDA LAN interfaces 154 and 156 may be provided for client computer 150 and gateway computer 152, respectively, as shown in FIG. 4. The IrDA LAN interface is a data communication interface utilizing infrared ray, of which standardization is being studied by IrDA consortium. IrDA LAN interfaces have been popular among recent note type computers and mobile terminals. Browser 104 of client computer 150 accesses Proxy 108 through IrDA LAN interfaces 154 and 156. Proxy 108 is connected to local network 112 through client computer 150. In this manner, it becomes unnecessary to connect gateway computer 152 directly to local network 112 through an LAN interface (such as Ethernet), and hence the cost of the distributed file system can be reduced.

Second Embodiment

Figure 5:
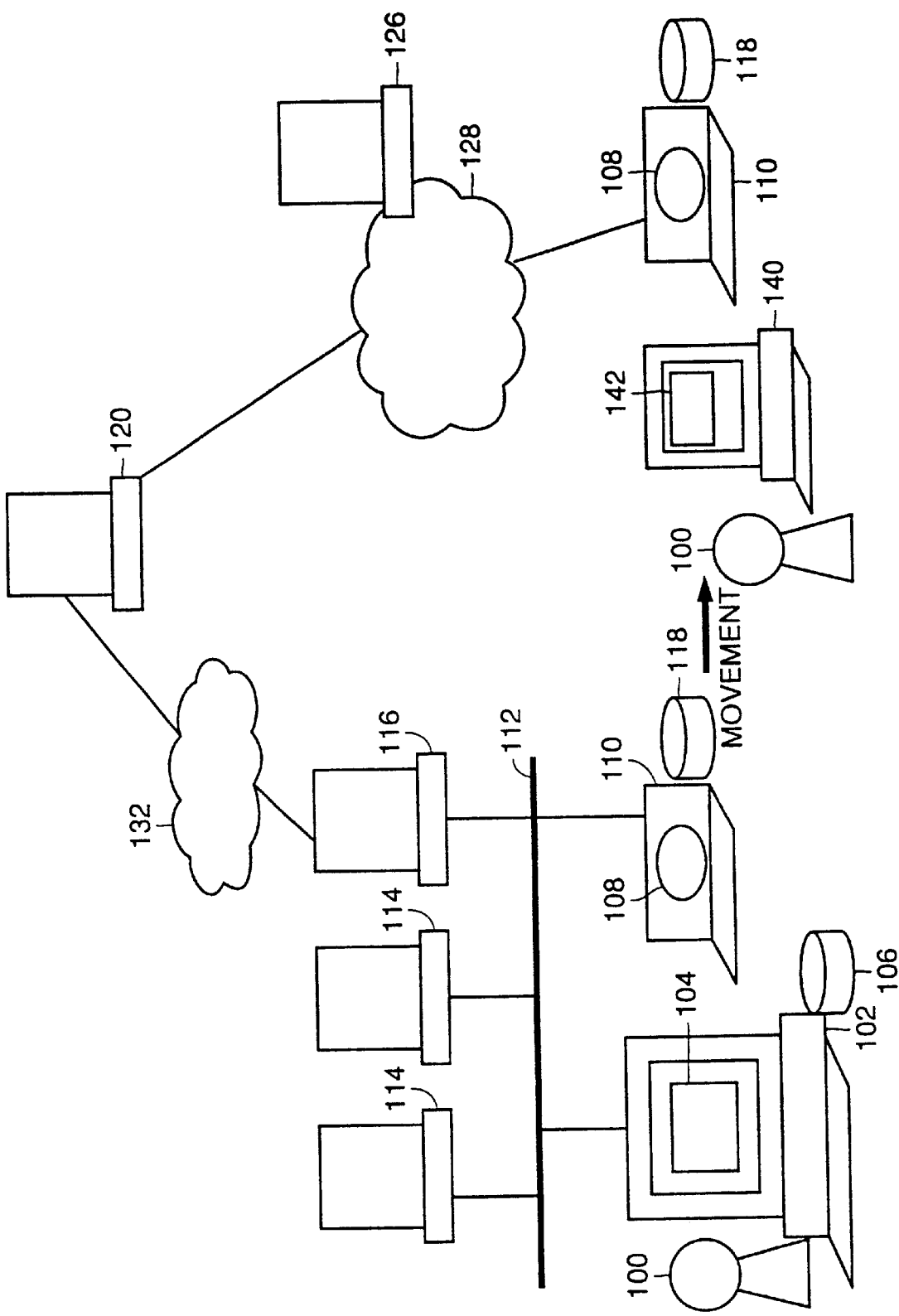
FIG. 5 shows a configuration of a distributed file system in accordance with a second embodiment.

Referring to FIG. 5, the distributed file system in accordance with the second embodiment of the present invention includes a client computer 140 additionally connected to gateway computer 110 connected to network 128 in the configuration of the distributed file system in accordance with the first embodiment described with reference to FIG. 1. Further, on client computer 140, a browser 142 is in operation.

As in the distributed file system in accordance with the first embodiment, user 100 accesses local server computer 114 through Proxy 108 from client computer 102. Thereafter, user 100 moves carrying gateway computer 110, operates browser 142 of client computer 140 at the site where the user moves to, and gets a file object. The series of operations will be described in the following. It is assumed that the browser 142 is so set as to access Proxy 108 of gateway computer 110 as a Proxy connection destination.

1. The user operates browser 140 and requests getting a file object stored in local server computer 114 "intranet.foobar.co.jp" through Proxy 108.
2. Proxy 108 inspects whether the file object is stored in mobile Proxy cache 118 or not. If the file object is stored, Proxy 108 reads the file object from mobile Proxy cache 118 and transmits the read object to browser 142.

It is understood that information of local server computer 114 connected to local network 112 which was used before movement, can be transparently referred to from client computer 140 at the site where the user has moved, in this manner. Therefore, it is not always necessary to operate a browser on gateway computer 110. This means that gateway computer 110 may not have a display device.

Next, a process in the distributed file system when user 100 requests a file object stored in server computer 120 "www.sharp.co.jp" not existing in mobile Proxy cache118 will be described.

1. First, user 100 operates browser 142 and requests Proxy 108 to get a file object stored in server computer 120 "www.sharp.co.jp".

2. Proxy 108 inspects whether the file object is stored in mobile Proxy cache 118. As the file object is not stored in mobile Proxy cache 118, Proxy 108 transmits a file request to server computer 120 through network 128.
3. Proxy 108 gets the file object, stores the file object in mobile Proxy cache 118, and returns the file object to browser 142.

As described above, it is possible for the user 100 to transparently refer to the file object information stored in sever computer 120 from client computer 140 at the site where the user 100 has moved to and is staying. Further, it is also possible for the user 100 to get a file object stored in server computer 120 through representative gateway computer 126. The process in the distributed file system in this case is the same as that described with reference to the first embodiment. Therefore, its description will not be repeated here.

Every time the user 100 moves, gateway computer 110 is connected to a network at a site where the user 100 moves to. Therefore, gateway computer 110 stores an arrangement of mobile Proxy control structures which correspond to the respective networks. Mobile Proxy 108 performs various operations based on control parameters stored in the Proxy control structures. Referring to Table 2, a Proxy control structure includes a network name, a dial up telephone number, port numbers of three upstream Proxy server computers, Proxy permission IP address pattern, Proxy permission user name and password, and a network description command.

TABLE 2

| Name of Structure Member | Element Example |
| --- | --- |
| Network Name (string) | "Via Internal Network LAN" |
| Dial Up Telephone Number (string) | "03-3456-7890" |
| Upstream Proxy Name: 1st Port Number (string) | "Proxy.foobar.co.jp:8080" |
| Upstream Proxy Name: 2nd Port Number (string) | "Proxy1.foobar.co.jp:8080" |
| Upstream Proxy Name: 3rd Port Number (string) | "Proxy2.foobar.co.jp:8080" |
| Proxy Permission IP Address Pattern | "123,45.67.1,123.45.67.2" |
| Proxy Permission User Name: Password | "mobile-kun:himitsu1234" |
| Network Description Comment | "LAN Connection to Company Network" |

Gateway computer 110 presents network names described in mobile Proxy control structure to user 100. User 100 selects one from the presented network names. Gateway computer 110 switches control parameters such as settings of upstream Proxy, based on the mobile Proxy control structure corresponding to the selected network name.

Figure 6A:
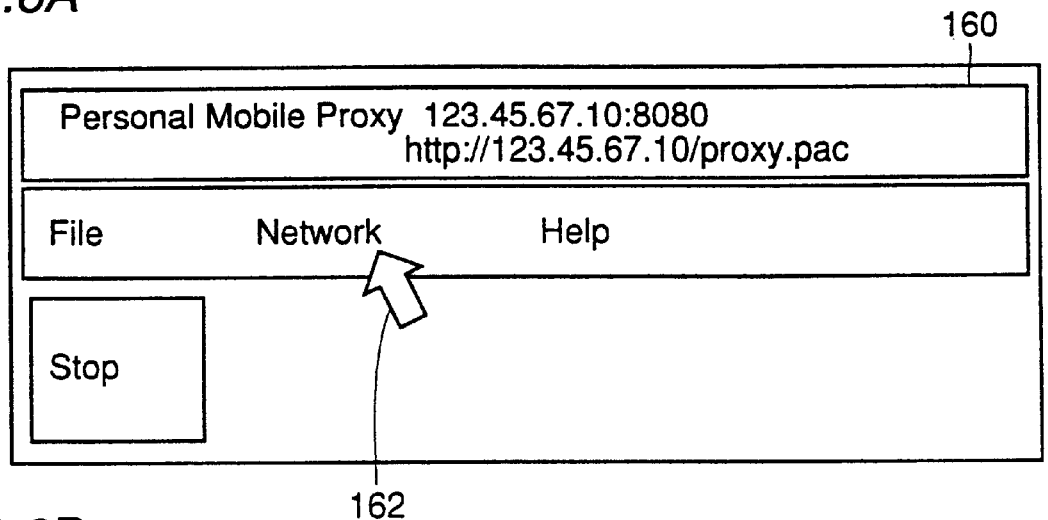
FIGS. 6A and 6B are illustrations showing the control screen of the Proxy.
Figure 6B:
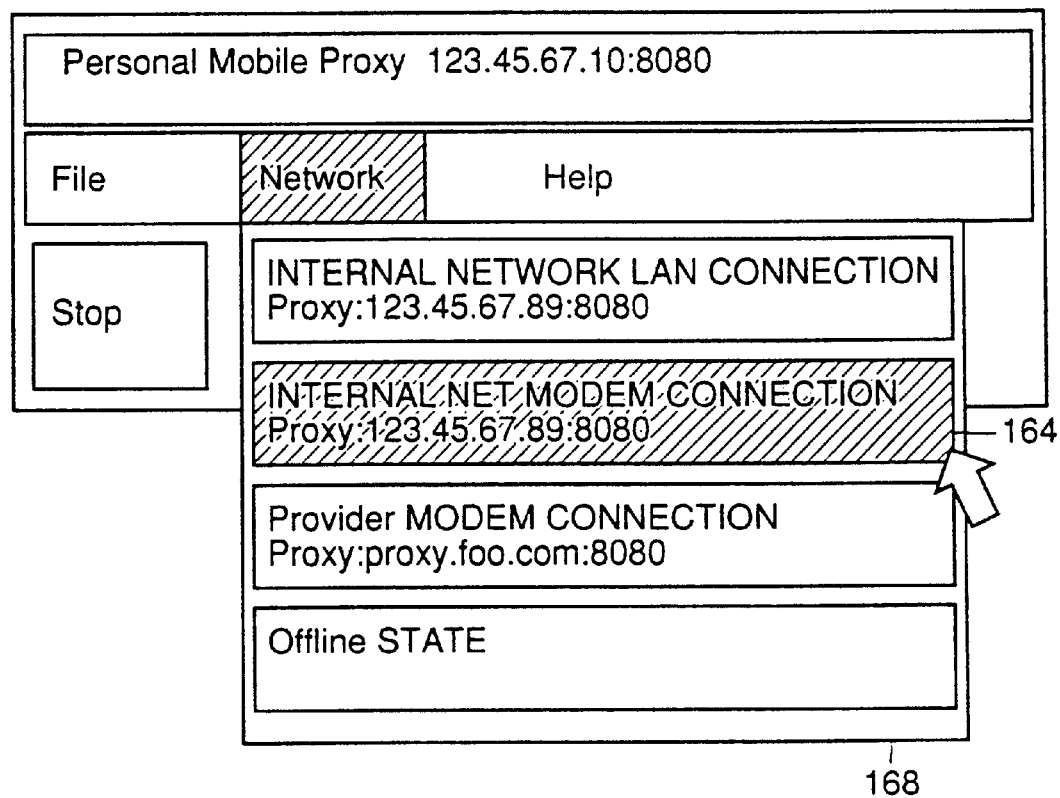

As shown in FIGS. 6A and 6B, Proxy 108 has a control screen. At a title portion 106 of the control screen, an IP address and an operation port of gateway computer 110 are indicated.

User 100 readily obtains information for Proxy set up at client computer 140, by looking at the IP address and the operation port displayed on title portion 160.

User 100 moves a cursor 162 to a portion of control screen where there is a label "Network" and selects that portion. In this manner, one of the network names and upstream Proxy names is displayed as a menu display. When a cell "Off line state" 168 is selected from the menu display, Proxy 108 is not connected to the network and it returns only a file object stored in mobile Proxy cache 118 to client computer 140.

When the second cell 164 is selected from the menu display, Proxy 108 uses a computer having the IP address of "123.45.67.89" as an upstream Proxy server computer, and makes an attempt to connect to port No. 8080 of that computer.

In this manner, gateway computer 110 has means for collectively storing attributes of respective networks in mobile Proxy control structures to allow user selection, and the user can easily switch network attribute at a site where the user moves to.

Access control of Proxy 108 will be described in the following.

Generally, a Proxy server checks an IP address of a browser which issues a request for relay, and permits use if the IP address matches the Proxy permission IP address pattern. Here, the Proxy server is designed on the premise that the server is used fixed on the network. Therefore, every time it moves to a different network, the user must rewrite the Proxy permission IP address pattern.

Referring to FIG. 5, assume that local network 112 and network 128 each adopts Private IP address 192.168.168.XXX (where XXX is an arbitrary integer from 0 to 255). The Private IP address is a private address system which can be adopted only in a network which is not connected to the internet. Therefore, computers having the same address may exist in separate networks, respectively. Assume that IP address of client computer 102 connected to local network 112 is "192.168.168.3" and the IP address of client computer 140 connected to network 128 is "192.168.168.4". Further, it is assumed that only client computers 102 and 140 can access to Proxy 108.

Here, when "192.168.168.3" and "192.168.168.4" are simply set as Proxy permission IP address patterns, there would be a problem that it is possible for a computer having the IP address "192.168.168.4" to which permission should not essentially be given, to be connected to local network 112 to use Proxy 108.

Such a problem is solved if the mobile Proxy control structure is switched every time a connection to a different network is made and the Proxy permission IP address pattern is also switched accordingly.

When the IP address of client computer 102 is not included in the Proxy permission IP address pattern, determination is made as to whether an access request from client computer 102 is to be granted or not. For this determination, Proxy authorization is utilized. Proxy authorization refers to determination as to whether the user 100 using browser 104 of client computer 102 is a user authorized to make an access, based on the Proxy permission user name and the password of the mobile Proxy control structure. More specifically, authorization protocol specified in the standard of HTTP/1.0 is used as it is.

As described above, an authorization data bus is stored in gateway computer 110 as Proxy control structure. Therefore, even when the mobile computer changes its destination of network connection, Proxy authorization is possible.

Figure 7:
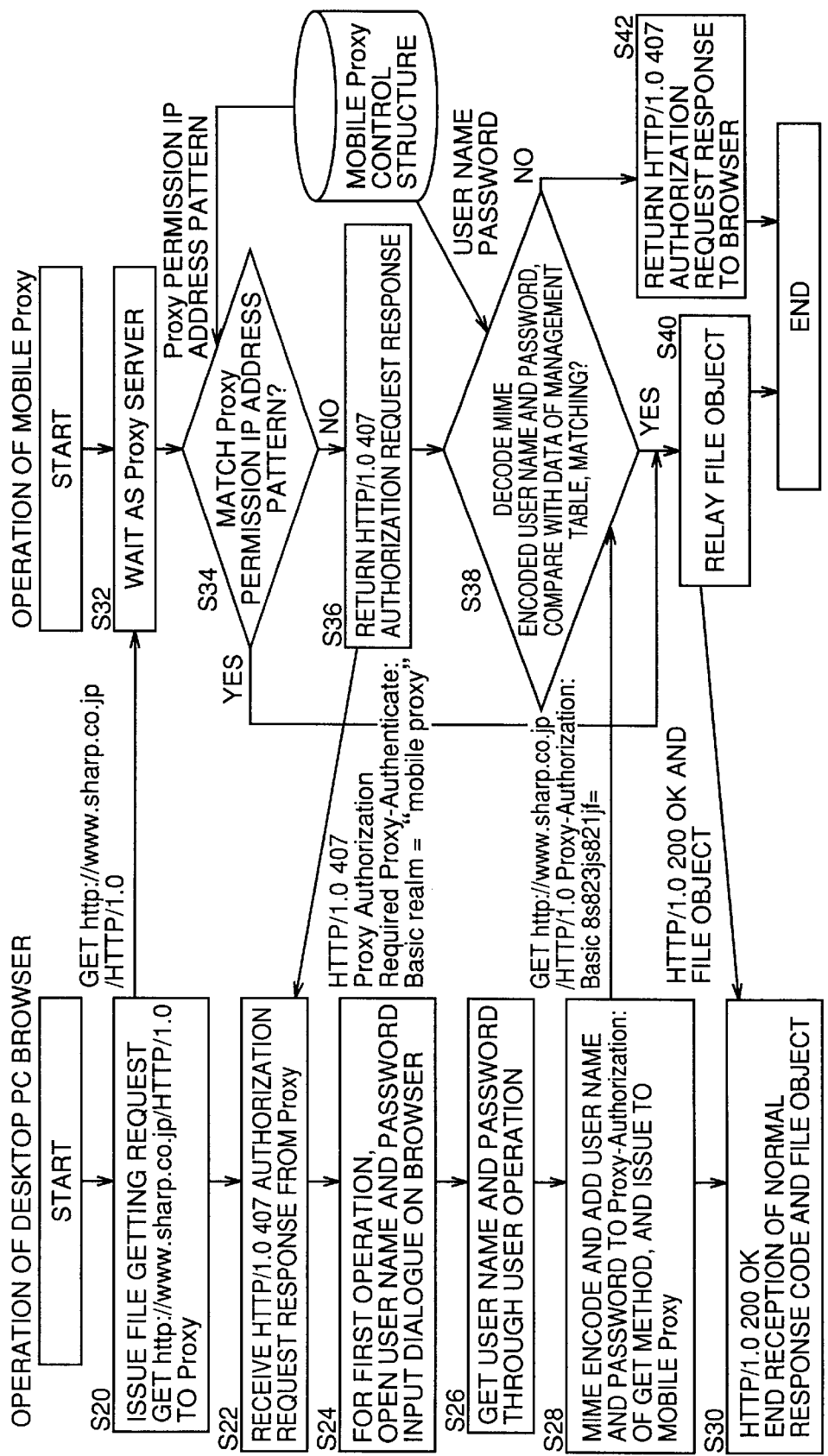
FIG. 7 is a flow chart related to Proxy authorization.

Proxy authorization when user 100 operates browser 104 to get a file object of server computer 120, will now be described with reference to FIG. 7.

First, a process performed by browser 104 on client computer 102 will be described.

Browser 104 establishes connection with Proxy 108. Thereafter, browser 104 transmits to mobile Proxy 108 a request for getting a file object stored in server computer 120, shown in Table 3 (S20).

TABLE 3

GET http://www.sharp.co.jp/HTTP/1.0\r\n
\r\n   (\r\n represents line feed code 0x0d,0x0a)

Browser 104 receives an authorization request response shown in Table 4 from Proxy 108 (S22).

TABLE 4

GET http://www.sharp.co.jp/HTTP/1.0\r\n
Proxy-Authorization: Basic realm="mobile Proxy"
\r\n Browser 104 displays a dialog screen for inputting a password on the display of client computer 102 (S24), asking user 100 to input the user name and the password (S26).

Upon receiving the user name and the password, browser 104 generates a string in the order of "user name: password." Browser 104 encodes the string in MIME format, stores it in the storage of client computer 102, and transmits such a string as shown in Table 5 to Proxy 108 (S28). Here, the string "Basic" represents that the method of authorization request is the basic method of authorization.

TABLE 5

GET http://www.sharp.co.jp/HTTP/1.0\r\n
Proxy-Authorization: Basic 8s823js821jf=\r\n
\r\n Proxy 108 receives the encoded user name and the password, and when these match the mobile Proxy control structure, relays a file object and transmits the file object to browser 104. Browser 104 receives the file object (S30).

The process performed by Proxy 108 will now be described.

Proxy 108 receives a request for a file object from browser 104 (S32).

Proxy 108 determines whether the IP address of client computer 102 which is the source of transmission of the request for a file object matches the Proxy permission IP address pattern stored in the mobile Proxy control structure (S34).

If the IP address of client computer 102 matches the Proxy permission IP address pattern (YES in S32), Proxy 108 transfers data to browser 104 in the format such as shown in Table 6, that is, relays the file object (S40).

TABLE 6

HTTP/1.0 200 Ok\r\n
\r\n
File Object follows

When the address does not match (NO in S32), Proxy 108 transmits a header such as that shown in Table 7 to browser 104, notifying that authorization is necessary (S36).

TABLE 7

HTTP/1.0 407 Proxy Authorization Required\r\n
Proxy-Authenticate: Basic realm="mobile Proxy"\r\n
\r\n In response to the authorization request response transmitted in S36, browser 104 transmits encoded string in the process of S28 and Proxy 108 receives the encoded string. Proxy 108 decodes the string, compares the encoded string with the Proxy permission user name and the password stored in mobile Proxy control structure, and determines whether these match with each other (S38).

If the string matches the Proxy permission user name and the password (YES in S38), Proxy 108 relays the above described file object (S40). If not (NO in S38), Proxy 108 transmits an authorization request response "HTTP/1.0 407" to browser 104, informing that authorization is dismissed (S42).

Once authorized, browser 104 functions as a common browser in the processes thereafter, and repeats processes of steps of S28 and S30. As the Proxy-Authorization: header transmitted as authorization data in the process of S28, the character string stored in the process of S28 is used. Accordingly, access to Proxy 108 is always permitted thereafter.

When Proxy 108 is to be accessed from browser 142 of client computer 140 connected to network 128, whether an access by the user 100 is to be permitted or not is determined based on the similar Proxy authorization. The user name and the password of user 100 whose access is permitted may be common in all the networks.

In the conventional Proxy server, if the size of the file object to be relayed and transferred is unknown, the file object is not stored in mobile Proxy cache 118. The reason for this is that the file object may be a page or the like created dynamically from a data base, which contains much information which should not be shared by a number of users inherently.

The distributed file system in accordance with the present embodiment is on the premise that gateway computer 110 is used personally. Therefore, Proxy 108 stores the relayed dynamic file object in mobile Proxy cache 118.

Third Embodiment

Figure 8:
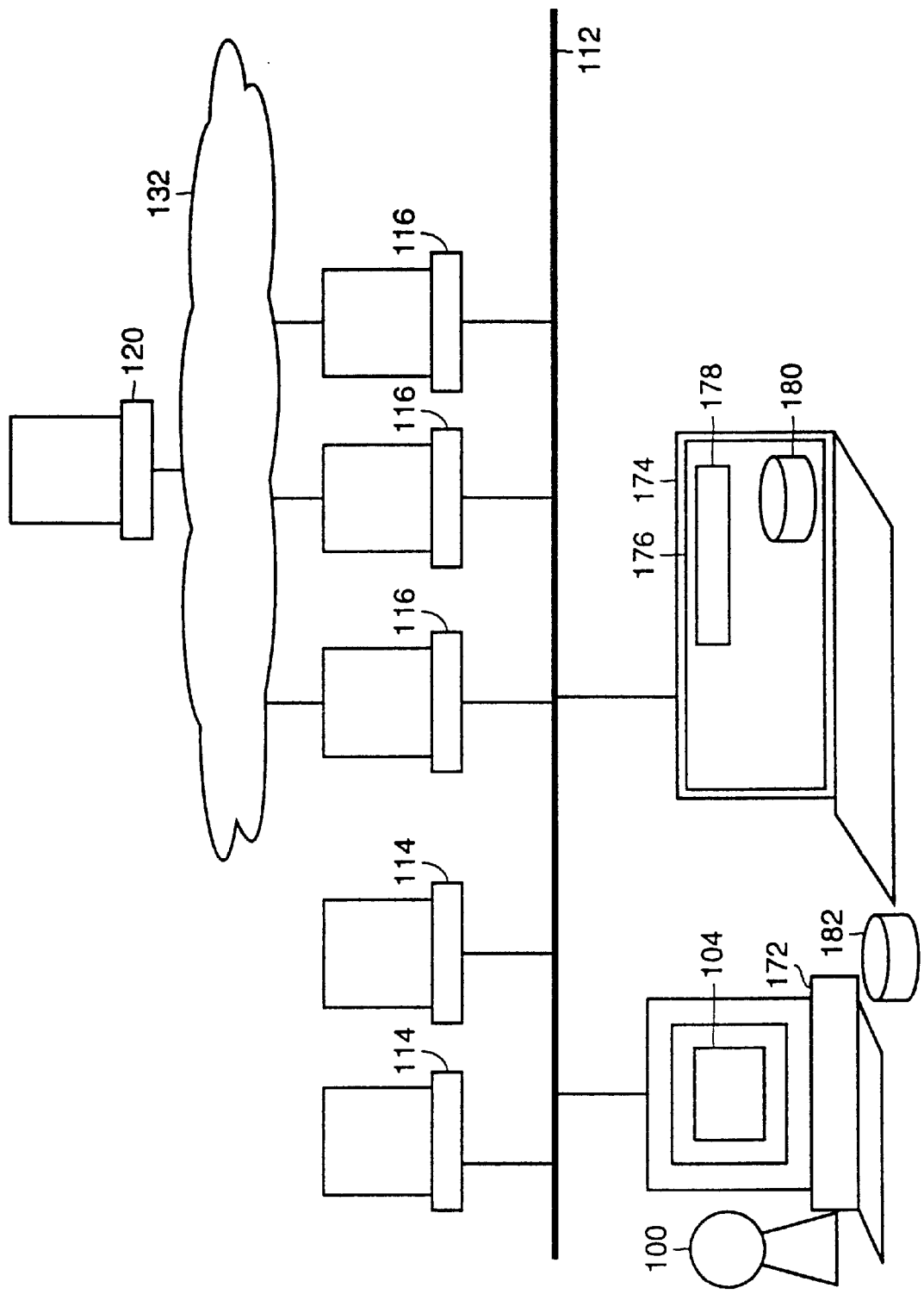
FIG. 8 shows a configuration of a distributed file system in accordance with a third embodiment.

Referring to FIG. 8, the distributed file system in accordance with the third embodiment includes a server computer 120, three representative gateway computers 116, local server computers 114, a client computer 172, a gateway computer 174, a global network 132 and a local network 112.

To global network 132, server computer 120 and three representative gateway computers 116 are connected. To local network 112, three representative gateway computers 116, local server computers 114, client computer 172 and gateway computer 174 are connected.

On gateway computer 174, Proxy 176 is being executed. Proxy 176 includes a script generating unit 178, which will be described later. In gateway computer 174, mobile Proxy control structure 180 described with respect to the second embodiment are stored.

The method of getting a file object and user authorization are similar to those of the distributed file system described with respect to the first and second embodiments. Therefore, its description will not be repeated here.

Here, Automatic Proxy Configuration Script will be described. The Automatic Proxy Configuration Script refers to a mechanism for automatically determining a gateway computer to which browser 104 is to be connected.

Proxy 176 generates such an Automatic Proxy Configuration Script as shown in Table 8 based on the upstream Proxy name stored in mobile Proxy control structure 180 in accordance with a request from browser 104 and transmits the generated script to browser 104. The Automatic Proxy Configuration Script is described in Java script language.

Browser 104 stores the Automatic Proxy Configuration Script in browser cache 182. Browser 104 requests at an activation thereafter, getting of Automatic Proxy Configuration Script to Proxy 176. When the request is dismissed because of halt or the like of Proxy 176, browser 104 reads the Automatic Proxy Configuration script from browser cache 182 and selects a Proxy server.

An example of the Automatic Proxy Configuration Script is as shown in Table 8. In the return value of a function FindProxyForURL(url,host), used Proxy servers are listed.

TABLE 8

```
function FindProxyForURL(url,host)
{
    return "PROXY Proxy.foobar.co.jp:8080;"+
        "PROXY Proxy1.foobar.co.jp:8080;"+
        "DIRECT";
}
```

In accordance with the Script, browser 104 makes an attempt to access a Proxy server providing service at port number 8080 of representative gateway computer 116 "Proxy.foobar.co.jp" at first. If the Proxy server does not respond after a prescribed wait time (for example, 1 minute), browser 104 makes an attempt to access a Proxy providing service at port number 8080 of representative gateway computer 116 "Proxy1.foobar.co.jp". If the Proxy does not respond after the prescribed wait time, either, browser 104 makes an attempt to connect directly to server computer 120 not through any Proxy.

Figure 9:
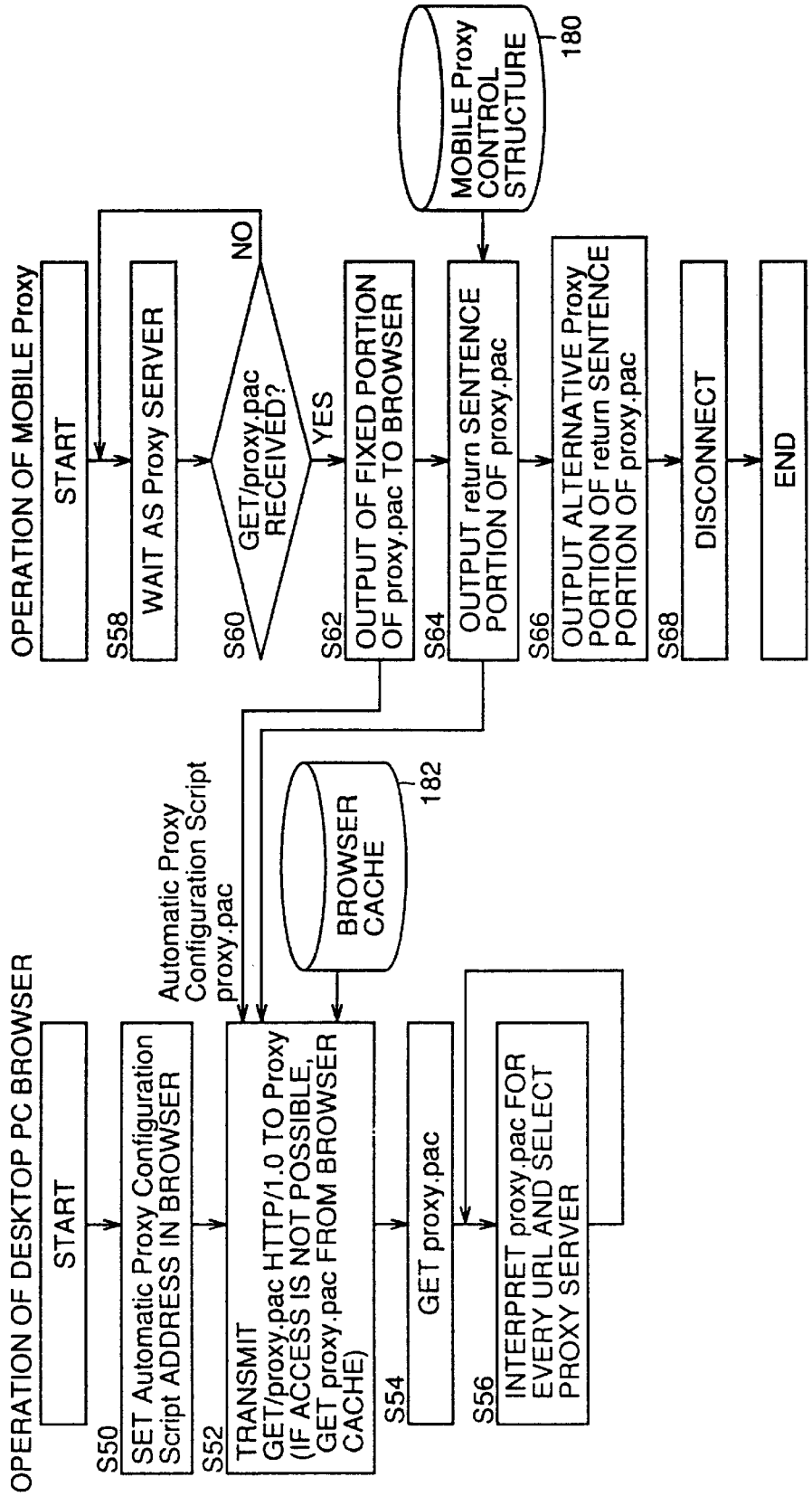
FIG. 9 is a flow chart related to the method of generating Automatic Proxy Configuration Script.

The method of generating the Automatic Proxy Configuration Script will be described with reference to FIG. 9.

First, a process performed by browser 104 operating on client computer 172 will be described. Assume that the IP address of the gateway computer is 123.45.67.10 and Proxy 176 provides service at port No. 8080 of that computer.

Browser 104 sets URL "http://123.45.67.10:8080/proxy.pac" at which the Automatic Proxy Configuration Script is obtained (S50). The URL is displayed on title portion 160 of the control screen of Proxy 176 described above with reference to FIG. 6A. Therefore, the user 100 can readily set the destination at which the Automatic Proxy Configuration is obtained.

Browser 104 makes an attempt to get the Automatic Proxy Configuration Script when activated (S62). More specifically, browser 104 establishes TCP/IP connection with the port No. 8080 of Proxy 176 operating on gateway computer 174 (IP address 123.45.67.10) using an interface called "socket." After the connection is established, browser 104 transmits such a command as shown in Table 9 to Proxy 176, and requests transmission of proxy pac file. This request is in accordance with HTTP.

TABLE 9

```
GET /proxy.pac HTTP/1.0\r\n
\r\n
```

Browser 104 receives such a text as shown in Table 10 from Proxy 176 (S54). "HTTP/1.0 200 OK" on the first line means that a response from Proxy 176 as an HTTP server is normal. "Content-type: x-ns-proxy-autoconfig" on the third line means that the text following the fourth line is the Automatic Proxy Configuration Script. Here, "function FindProxyForURL(url, host)" is the Automatic Proxy Configuration Script generated from mobile Proxy control structure 180.

The symbol "+" means coupling of character strings. The return value represents a designation that first an attempt to connect Proxy 176 (123.45.67.10:8080) should be made. Further, it means a designation that if Proxy 176 does not respond, an attempt to connect successively to upstream representative gateway computer 116 described in mobile Proxy control structure 180 should be made. Further, "DIRECT" represents a designation that if all the representative gateway computers 116 do not respond, an attempt at direct connection should be made.

TABLE 10

```
HTTP/1.0 200 OK\r\n
Server: Mobile-Proxy\r\n
Content-type: x-ns-proxy-autoconfig\r\n
\r\n
function FindProxyForURL(url,host) \r\n
{\r\n
    return "PROXY 123.45.67.10:8080;"+\r\n
        "PROXY Proxy.foobar.co.jp:8080;"+\r\n
        "PROXY Proxy1.foobar.co.jp:8080;"+\r\n
        "PROXY Proxy2.foobar.co.jp:8080;"+\r\n
        "DIRECT"; \r\n
```

Thereafter, every time a request for a getting a file object is transmitted, browser 104 interprets the Automatic Proxy Configuration Script and determines an upstream Proxy server (S56).

The Automatic Proxy Configuration Script is stored in browser cache 182. Therefore, if Proxy 176 is not available, the Automatic Proxy Configuration Script obtained when the browser 104 was activated last time is used.

This is advantageous in that even when Proxy 176 is not in operation or even when gateway computer 174 is disconnected from local network 112, it is not necessary for the user to manually switch the setting of the Proxy used by browser 104.

The operation of Proxy 176 will be described in the following. Especially, the operation is related to the behavior of script generating unit 178 which reads information from mobile Proxy control structure 180 and generates proxy.pac.

Proxy 176 waits as a Proxy server (S58). Whether a request for getting an Automatic Proxy Configuration Script "GET/proxy.pacHTTP/1.0" is received from browser 104 or not is determined (S60). If the request is not received (NO in S60), it waits as a Proxy server until there is a request (S58). If the request is received (YES in S60), script generating unit 178 transmits a fixed portion of the Automatic Proxy Configuration Script such as shown in Table 11 to browser 104 (S62).

TABLE 11

```
HTTP/1.0 200 Ok\r\n
Server: Mobile-Proxy\r\n
Content-type: x-ns-proxy-autoconfig\r\n
\r\n
function FindProxyForURL(url,host)\r\n
{\r\n
```

Thereafter, script generating unit 178 transmits a first line of a return sentence of the Automatic Proxy Configuration Script such as shown in Table 12 to browser 104 (S64). The return sentence is a combination of the name and port number of Proxy 176 stored in mobile Proxy control structure 180.

TABLE 12

```
return "PROXY 123.45.67.10:8080;"+\r\n
```

Script generating unit 178 transmits a remaining part of the return sentence such as shown in Table 13 to browser 104

(S66). This portion designates use of another upstream Proxy, when Proxy 176 is not in operation. This is prepared by taking out the combination of the name and the port number of a Proxy from mobile Proxy control structure 180, to which a character string "DIRECT" is added.

The character string "DIRECT" means a designation that an attempt to connect directly to server computer 120 should be made if all the Proxys described in the mobile Proxy control structure do not respond.

TABLE 13

"PROXY Proxy.foobar.co.jp:8080;"+\r\n
"PROXY Proxy1.foobar.co.jp:8080;"+\r\n
"PROXY Proxy2.foobar.co.jp:8080;"+\r\n
"DIRECT";\r\n
}\r\n Finally, Proxy 176 disconnects connection with browser 104 (S68).

In this manner, as the Automatic Proxy Configuration Script is generated based on the upstream Proxy information set in mobile Proxy control structure 180, it is possible for browser 104 to use another upstream Proxy even when Proxy 176 is halted. Therefore, it is possible for browser 104 to continue its operation without changing its setting, regardless of the state of operation of Proxy 176. Therefore, introduction of Proxy 176 is facilitated.

When there are a plurality of upstream Proxys set at mobile Proxy control structure 180, browser 104 makes an attempt of connection to the set upstream Proxys one by one in order. Therefore, the distributed file system of the present embodiment is strong against any fault of the upstream Proxy.

Further, the Automatic Proxy Configuration Script is stored in browser cache 182. Therefore, even when the Automatic Proxy Configuration script cannot be read from Proxy 176 at the time of activation of browser 104, it is possible for browser 104 to use the Automatic Proxy Configuration Script stored in browser cache 182.

Fourth Embodiment

Referring to FIG. 8, in local network 112, the information of the upstream Proxy, that is, the name and the port number of representative gateway computer 116 may sometimes be described in the Automatic Proxy Configuration Script. It is assumed that the Automatic Proxy Configuration Script is applied from server computer 120, and its file name is "http://www.foobar.co.jp/setup.pac". An example of the Automatic Proxy Configuration Script is as shown in Table 14.

TABLE 14 function FindProxyForURL(url,host) \r\n
{\r\n
    if(shExpMatch(host,"*.com"))\r\n
    return "PROXY Proxy.foobar.co.jp:8080;"+\r\n
        "DIRECT";\r\n
    else\r\n
    return "PROXY Proxy1.foobar.co.jp:8080;"+\r\n
        "DIRECT"; \r\n
}r\n The Automatic Proxy Configuration Script will now be described. Here, shExpMatch (host, "*.com") is a function which is true when the last portion of the host name of the URL is ".com." Therefore, the Automatic Proxy Configuration Script instructs browser 104 to connect to "Proxy.foobar.co.jp:8080" as an upstream Proxy when the last portion of the host name of the URL of the file object which is requested by user 100 matches ".com", and instructs browser 104 to make a direct connection with server computer 120 ("DIRECT") if connection to "Proxy.foobar.co.jp:8080" fails. Further, the Automatic Proxy Configuration Script instructs browser 104 to connect to "Proxy1.foobar.co.jp:8080" as an upstream Proxy if the last portion of the host name does not match ".com", and instructs browser 104 to make a direct contact with server computer 120 ("DIRECT") if connection to "Proxy1.foobar.co.jp:8080" fails. For example, a file object stored in a server computer 120 which is in a com domain such as "www.cnn.com" is obtained via Proxy "Proxy1.foobar.co.jp:8080."

In the Automatic Proxy Configuration Script, it is possible to express Proxy connection in a flexible manner by using Java script. Proxy 176, however, is an upstream Proxy when viewed from client computer 172. Therefore, in order to interpret the script and to connect to the upstream Proxy, a Java script interpreter is necessary. Implementation of the interpreter increases load on gateway computer 174.

Figure 10:
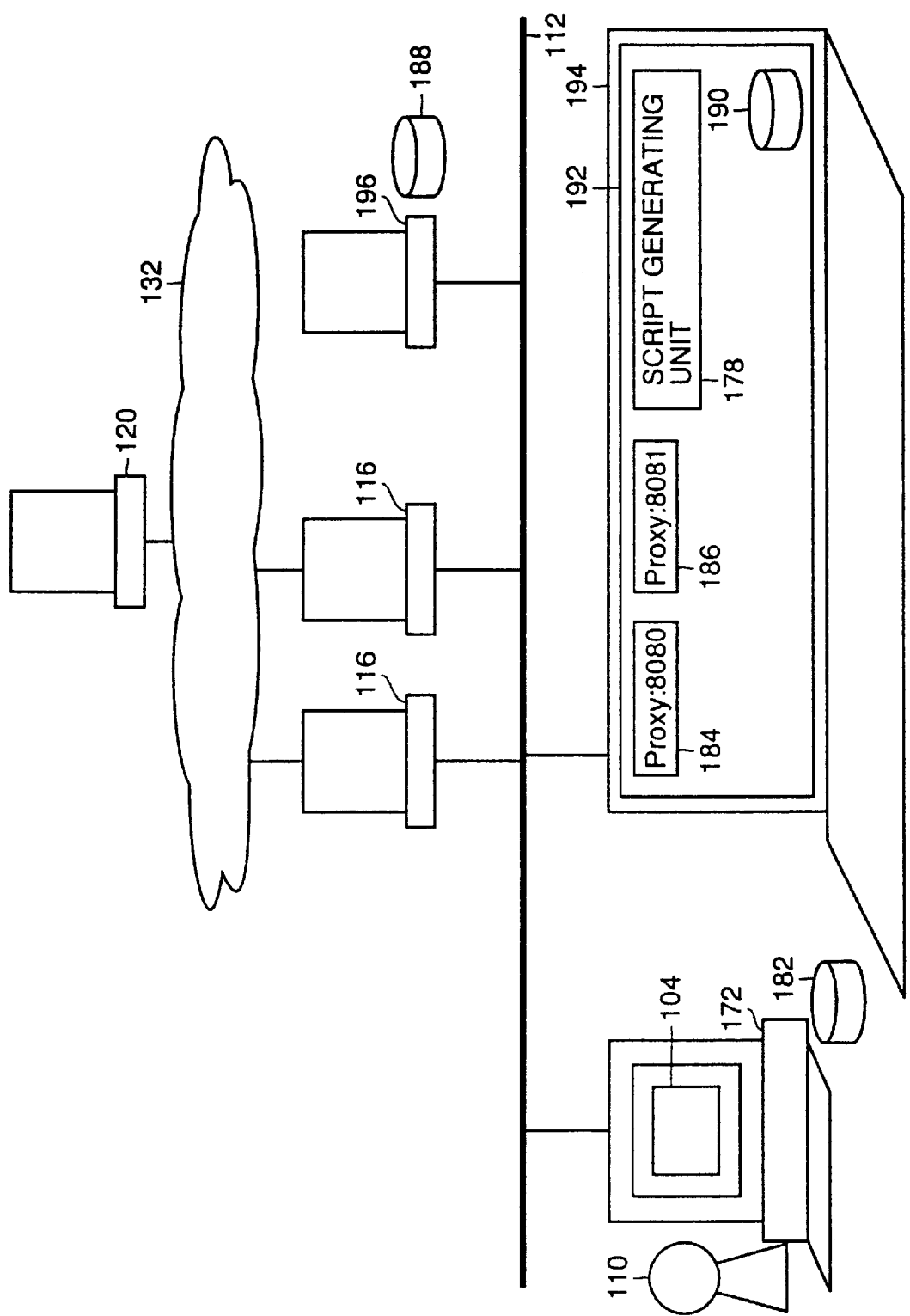
FIG. 10 shows a configuration of a distributed file system in accordance with a fourth embodiment.

Referring to FIG. 10, the distributed file system in accordance with the fourth embodiment includes a server computer 120, two representative gateway computers 116, a local server computer 196, a gateway computer 194, a client computer 172, a global network 132 and a local network 112. To global network 132, server computer 120, two representative gateway computers 116 and local server computer 196 are connected. To local network 112, gateway computer 194 and client computer 172 are connected.

A browser cache 182 is connected to client computer 172, and browser 104 is in operation. An upstream Automatic Proxy Configuration Script 188, which will be described later, is stored in local server computer 196. On gateway computer 194, Proxy 192 is in operation, and an address of the upstream Automatic Proxy Configuration Script is stored as an upstream proxy name of the mobile Proxy control structure. Proxy 192 includes a script generating unit 178 and Proxy server threads 184 and 186, which will be described later.

Figure 11:
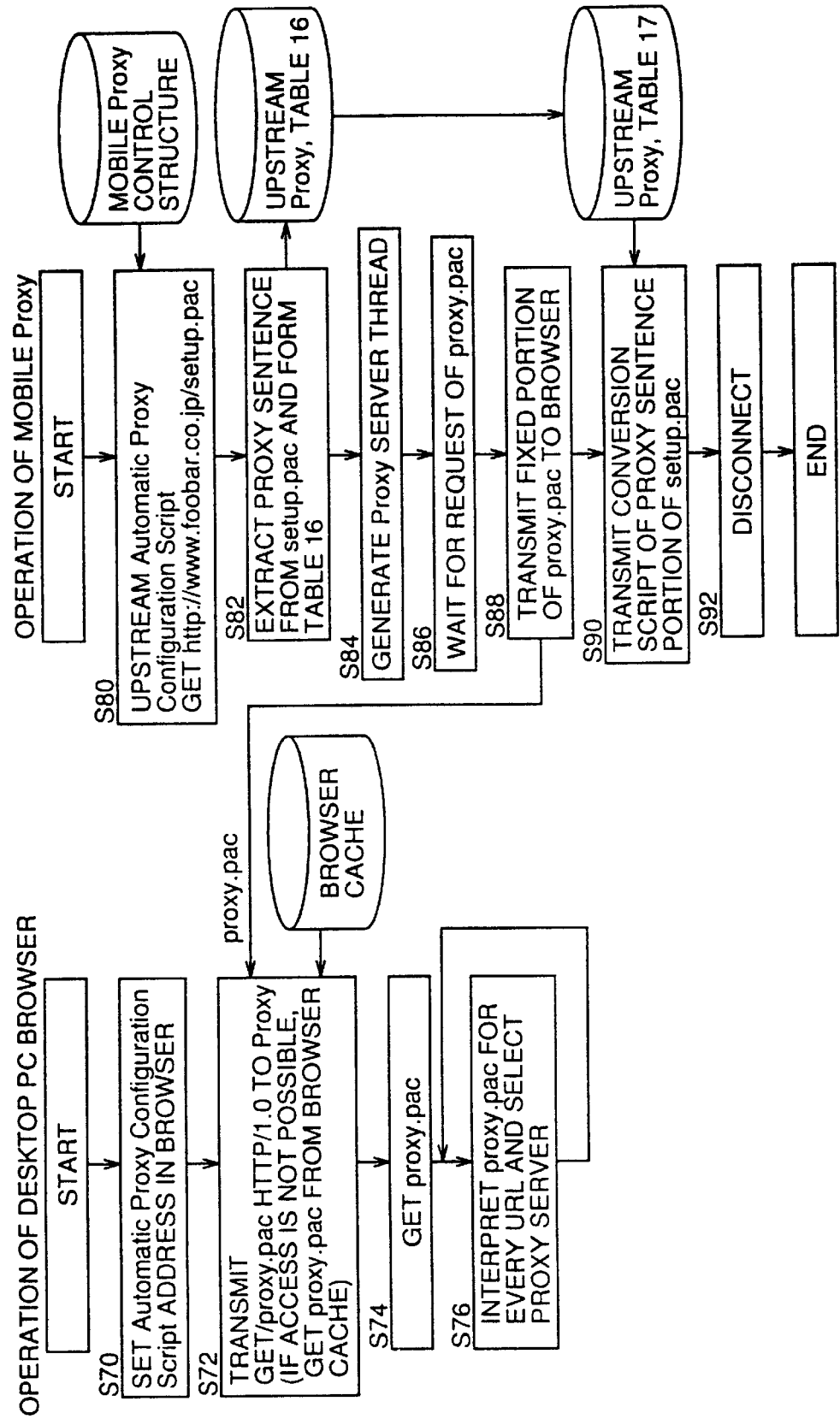
FIG. 11 is a flow chart related to operations of various portions of the distributed file system in accordance with the fourth embodiment.

Referring to FIG. 11, respective units of the distributed file system in accordance with the present embodiment operate in the following manner. The operation of client computer 172 (S70–S76) is the same as the operation (S50–S56) of client computer 172 of the third embodiment described with reference to FIG. 9. Therefore, its description will not be repeated here.

The process performed by Proxy 192 will now be described.

Proxy 192 establishes connection with local server computer 196 and transmits a command such as shown in Table 15. Proxy 192 gets an upstream Automatic Proxy Configuration Script 188 ("http://www.foobar.co.jp/setup.pac"), and stores it as an upstream Automatic Proxy Configuration Script 190 (S80). The content of the upstream Automatic Proxy Configuration Script 190 is assumed to be the same as that shown in Table 14.

TABLE 15

GET /setup.pac HTTP/1.0\r\n
\r\n

Script generating unit 178 extracts a return sentence from the upstream Automatic Proxy Configuration Script 190. From the PROXY sentence described in the return sentence, a list of Proxy servers such as shown in Table 16 is formed (S82). If the combination of the server name and the port number is the same, the Proxy is one and the same Proxy.

Therefore, such overlapping combination are deleted from the table.

TABLE 16

| Upstream Proxy Server Name (or IP address) | Upstream Proxy Port No. |
| --- | --- |
| 1 Proxy.foobar.co.jp | 8080 |
| 2 Proxy1.foobar.co.jp. | 8080 |

Proxy server threads 184 and 186 are activated by the same number as the number of extracted Proxy servers (S84). Here, port number of Proxy server thread 186 is set to be the port number (8080) of the Proxy server thread 184 plus 1 (8081). Correspondence between the Proxy server threads 184 and 186 to the upstream Proxys is as shown in Table 17. It is assumed that the gateway computer 194 has an IP address 123.45.67.10. Proxy server threads 184 and 186 regard respective representative gateway computers 116 ("Proxy.foobar.co.jp", "Proxy1.foobar.co.jp") as respective upstream Proxy servers. The names and the port numbers of the representative gateway computers 116 are stored in mobile control structure (not shown).

TABLE 17

| Mobile Proxy IP address | Port No. | Upstream Proxy | Upstream Port No. |
| --- | --- | --- | --- |
| 1 123.45.67.10 | 8080 | Proxy.foobar.co.jp | 8080 |
| 2 123.45.67.10 | 8081 | Proxy1.foobar.co.jp | 8080 |

The following process is performed dynamically when a request for getting Automatic Proxy configuration script is received from browser 104.

Proxy 192 waits for such a request as shown in Table 18 from browser 104 (S86).

TABLE 18

GET/proxy.pac HTTP/1.0

When there is a request, a fixed portion of the Automatic Proxy Configuration Script such as shown in Table 19 is transmitted to browser 104 (S88).

TABLE 19

HTTP/1.0 200 OK\r\n
Server: Mobile-Proxy \r\n
Content-type: x-ns-proxy-autoconfig\r\n
\r\n Referring to Table 20, the portion of the upstream Proxy in the PROXY sentence in the upstream Automatic Proxy Configuration Script 190 is substituted in accordance with the correspondence Table 17, and the result is transmitted to browser 104 (S90). More specifically, the portion of the upstream Proxy is replaced by Proxy server threads 184 and 186.

TABLE 20 function FindProxyForURL(url,host)\r\n
{\r\n
    if (shExpMatch(host,"*.com"))\r\n
        return "PROXY 123.45.67.10:8080;"+\r\n
          "DIRECT":\r\n
    else\r\n
        return "PROXY 123.45.67.10:8081;"+\r\n
          "DIRECT":\r\n
}\r\n Finally, connection with browser 104 is disconnected (S92).

Referring to Table 21, by using the Automatic Proxy Configuration Script generated in accordance with the above described process, it is possible for browser 104 to disperse paths to upstream Proxys utilizing mobile Proxy.

More specifically, browser 104 interprets Automatic Proxy Configuration Script. When the URL of which file object is requested matches the com domain, browser 104, accesses the Proxy ("Proxy.foobar.co.jp:8080") through Proxy server thread 184 ("123.45.67.10:8080"), and further accesses to server computer 120. If the URL of which file object is requested belongs to another domain, browser 104 accesses the Proxy ("Proxy1.foobar.co.jp:8080") through Proxy server thread 186 ("123.45.67.8081"), and further accesses to server computer 120.

TABLE 21

HTTP/1.0 200 OK\r\n
Server: Mobile-Proxy \r\n
Content-type: x-ns-proxy-autoconfif\r\n
\r\n
function FindProxyForURL(url,host)\r\n
{\r\n
    if(shExpMatch(host,"*.com"))\r\n
        return "PROXY 123.45.67.10:8080;"+\r\n
          "DIRECT";\r\n
    else\r\n
        return "PROXY 123.45.67.10:8081;"+\r\n
          "DIRECT":\r\n
}\r\n In this manner, the Proxy server threads 184 and 186 are operated by the same number as the number of upstream representative gateway computers 116 on gateway computer 194. Browser 104 determines a destination of connection of Proxy server threads 184 and 186 in accordance with such an Automatic Proxy Configuration Script as shown in Table 21. Therefore, switching of the representative gateway computer 116 becomes possible without implementing the same Java script interpreter as browser 104, in Proxy 192.

Fifth Embodiment

Figure 12:
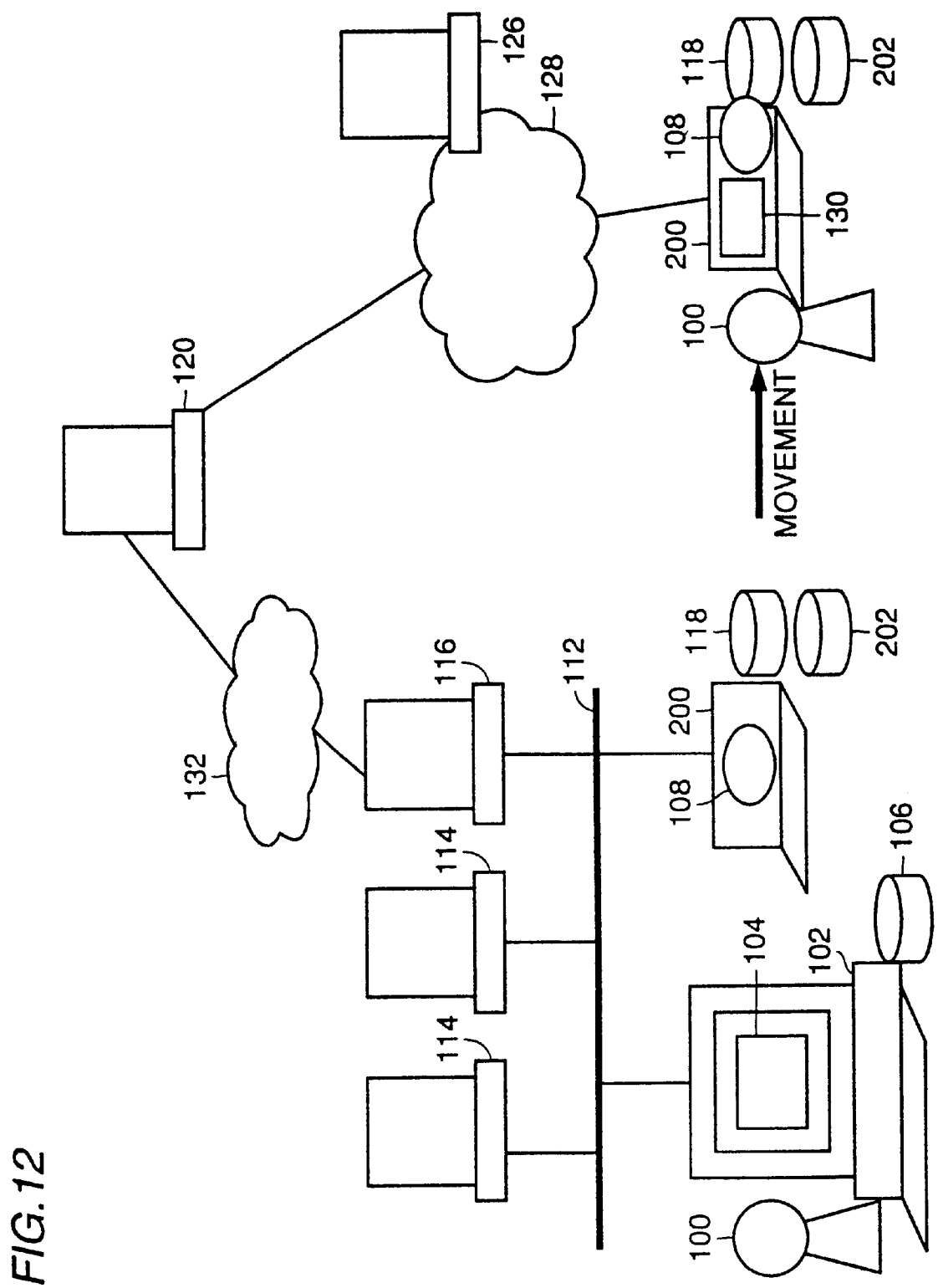
FIG. 12 shows a configuration of a distributed file system in accordance with a fifth embodiment.

Referring to FIG. 12, the distributed file system in accordance with the fifth embodiment includes a server computer 120, local server computers 114, a representative gateway computer 116, a client computer 102, a gateway computer 200, a representative gateway computer 126, a global network 132, a local network 112 and a network 128. To global network 132, server computer 120 and representative gateway computer 116 are connected. To local network 112, representative gateway computer 116, local server computers 114, gateway computer 200 (before movement), and client computer 102 are connected. To network 128, server computer 120, representative gateway computer 126 and gateway computer 200 (after movement) are connected. To client computer 102, Web server 106 is connected, and on client computer 102, browser 104 is in operation. To gateway computer 200, a mobile Proxy cache 118 and a history 202 for storing a history page are connected. On gateway computer 200, Proxy 108 is in operation.

Of the operations of the distributed file system in accordance with the present embodiment, getting of a file object is the same as that described with respect to the first embodiment. Therefore, its description will not be repeated here.

Proxy 108 creates a history page at the time of relay of the file object, and stores the history page in history 202. Proxy 108 stores the name of the relayed file object and the time of relay, in the history page together with the mobile Proxy control structure (not shown). The history page is described in HTML (Hypertext Markup Language), and history information is described in the order shown in Table 22. A prescribed number (for example, 50) of such pieces of history information are stored in a retroactive manner. Table 23 is an example of a history page.

TABLE 22

{Serial No., Title, Access Time, Network Name (Arrangement No. of Mobile Proxy Control Structure), URL}

TABLE 23

345 "Internal Telephone Book", Referenced Aug. 23, 1997, 18:23, Network 2
htt://www.foobar.com/phone/lab.html
344 "XXX News New Products Information", Referenced Aug. 23, 1997 15:23 Network 2
http://news.news.com/new/products/index.html
343 "XXX QandA", Referenced Aug. 23, 1997, 12:23, Network 1
http://www.foobar.co.jp/intranet/qanda.html
342 "Help desk info", Referenced Aug. 22 1997 10:30 Network 1
http://intranet.foobar.co.jp/helpdesk/index.html The history page is managed by mobile Proxy 108. Therefore, the history page can be referred to from browser 104 as a Web page "http:/localhost:8080/history/8080.html." Here, "localhost" designates the computer of IP address 127.0.0.1, that is, the IP address of gateway computer 200. Therefore, when history 202 is moved together with gateway computer 200, it is possible to refer to the history page at a site where the user moves to.

Further, the history page has a description of the network name. Therefore, it can be known at one sight at which network the file object related by Proxy 108 was referred to.

By Proxy authorization described with respect to the second embodiment, it is possible to limit access to the history page "http:/localhost:8080/history/8080.html" to specific users only, securing privacy.

Sixth Embodiment

Figure 13:
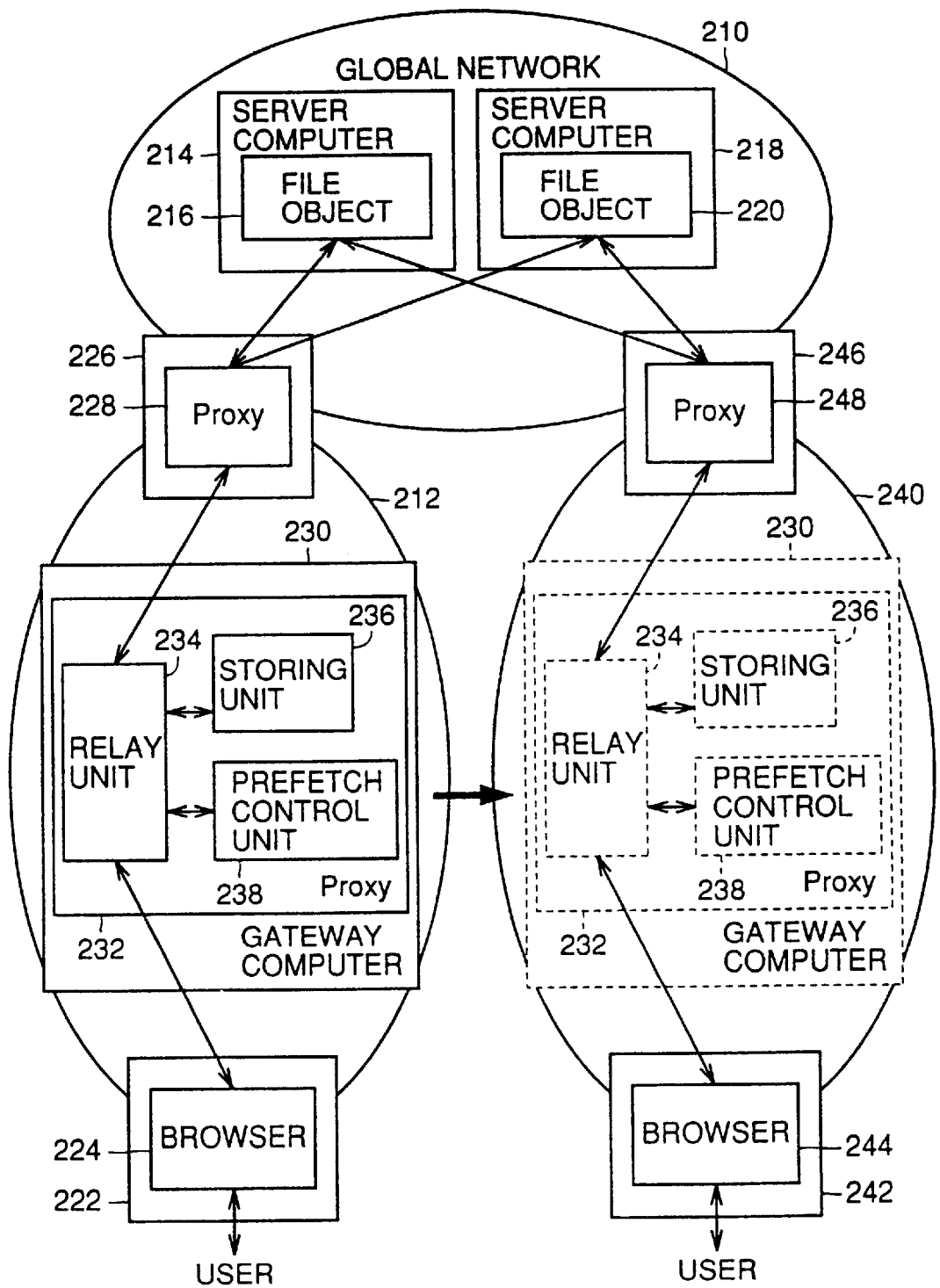
FIGS. 13 and 14 show configurations of a distributed file system in accordance with a sixth embodiment.

Referring to FIG. 13, the distributed file system in accordance with the sixth embodiment includes a global network 210, a local network 212 and a local network 240.

To global network 210, server computers 214, 218, representative gateway computers 226, 246 and so on are connected. To local network 212, a client computer 222, a representative gateway computer 226, a gateway computer 230 and so on are connected. An actual example of global network 210 is the internet configured utilizing TCP/IP protocol. An actual example of local network 212 includes an intranet connected to the internet (global network 210) through a firewall machine (representative gateway computer 226).

Server computers 214 and 218 provide file objects 216 and 220 which are in hypertext format, respectively. When global network 210 is the internet, the distributed file system consisting of file objects in the hypertext format is referred to as a WWW system, and server computers 214 and 218 are each referred to as a WWW server or an HTTP server. There may be a plurality of server computers 214, 218 on global network 210. In server computers 214 and 218, there may be a plurality of file objects 216 and 220, respectively. In the following, server computer 214 and file object 216 will be referred to as representative examples for convenience of description.

A software (browser) 224 allowing the user to browse file objects 216 in the hypertext format is prepared in client computer 222. When local network 212 is an intranet, the client computer 222 may be a work station, a personal computer or a portable terminal. There may be a plurality of client computers on the network. In the following, client computer 222 will be referred to as a representative example for convenience of description.

Representative gateway computer 226 has a function of relaying file object 216 of server computer 214 on global network 210 to local network 212. For this purpose, a software (Proxy) 228 for relaying file object 216 is executed in representative gateway computer 226. Representative gateway computer 226 serves to enhance security of local network 212 by separating global network 210 from local network 212. When global network 210 and local network 212 are the internet and an intranet, respectively, representative gateway computer 226 is referred to as a firewall machine.

Gateway computer 230 serves to relay file object 216 of server computer 214 relayed by representative gateway computer 226 to browser 224 of client computer 222. For this purpose, Proxy 232 for relaying file object 216 is also being executed in gateway computer 230. There may be a plurality of gateway computers on local network 212. In the following, gateway computer 230 will be referred to as a representative example for convenience of description.

Depending on the form of local network 212, there may not be a representative gateway computer 226. In that case, there is not a strict distinction between global network 210 and local network 212, and Proxy 232 of gateway computer 230 directly relays file object 216 of server computer 214 to browser 224 of client computer 222. In the following, a description will be given assuming that representative gateway computer 226 exists.

Proxy 232 executed in gateway computer 230 includes a relay unit 234, a storing unit 236 and a prefetch control unit 238. Generally, a Proxy has the function of relay unit 234 and (if necessary) the function of storing unit 236. The same applies to Proxy 228 executed in representative gateway computer 226.

Relay unit 234 relays an access request (hereinafter referred to as a ("user access request") for file object 216 in server computer 214 transmitted from the user through browser 224 of client computer 222 to Proxy 228 of representative gateway computer 226. At the same time, the relay unit 234 relays file object 216 corresponding to the user access request transmitted from Proxy 228 to browser 224.

Storing unit 236 stores a replica of the relayed file object 216 in a storage such as a hard disk or a flash memory. When a replica of file object 216 corresponding to the user access request has already been stored in the storage and is available, the storing unit relays the replica to browser 224 through relay unit 234. Therefore, when the user wishes to browse file object 216 which has been browsed before, the replica stored in the storing unit 236 is utilized. This allows high speed access. Generally, the storing unit 236 is referred to as a cache.

Prefetch control unit 238 analyzes the relayed file object 216. A file object utilized on the WWW system on the internet is described in hypertext format. Prefetch control unit 238 analyzes hypertext information of file object 216, and extracts address information to another file object (for example, file object 220 of server computer 218) at a destination of a hyperlink contained therein. Prefetch control unit 238 transmits an access request (hereinafter referred to as "prefetch access request") for file object 220 to relay unit 234.

Relay unit 234 relays the prefetch access request for file object 220 transmitted from prefetch control unit 238 to Proxy 228 of representative gateway computer 226, in the similar manner as that of a user access request. The file object 220 corresponding to the prefetch access request returned from Proxy 228, however, is not relayed to a specific client computer, and only a replica of the object is stored in storing unit 236. Further, relayed file object 220 is transmitted to prefetch control unit 238 and subjected to analysis for a new prefetch access request.

In the distributed file system, gateway computer 230 is a movable computer (mobile computer).

To local network 240 which is different from local network 212, a client computer 242, a representative gateway computer 246 and so on are connected. An actual example of local network 240 includes an intranet connected to the internet (global network 210) through firewall machine (representative gateway computer 246). Functions of client computer 242, browser 244, representative gateway computer 246 and Proxy 248 of local network 240 are the same as those of client computer 222, browser 224, representative gateway computer 226 and Proxy 228 of local network 212, respectively.

Mobile computer 230 connected to local network 212 and utilized for user access request, prefetch access request and relaying of file object between client computer 222 and representative gateway computer 226 is connected to local network 240. Thus, mobile computer 230 is utilized for user access request, prefetch access request and relaying of file objects between client computer 242 and representative gateway computer 246.

When the user browses file object 216 of server computer 214 through browser 224 on local network 212, a replica thereof is stored in storing unit 236 of Proxy 232 of mobile computer 230. When the user makes an attempt to browse the file object 216 through browser 244 on local network 240 at the site where the user moves to, the replica of the file object stored in storing unit 236 is utilized. This enables high speed access.

When prefetch control unit 238 makes a prefetch access request for a file object 220 of server computer 218 which has not yet been browsed by the user on local network 212, a replica of the object is stored in storing unit 236. When the user tries to browse file object 220 of server computer 218 through browser 244 on local network 240 at the site where the user has moved to, the replica stored in the storing unit 236 is utilized. This allows high speed access.

Figure 14:
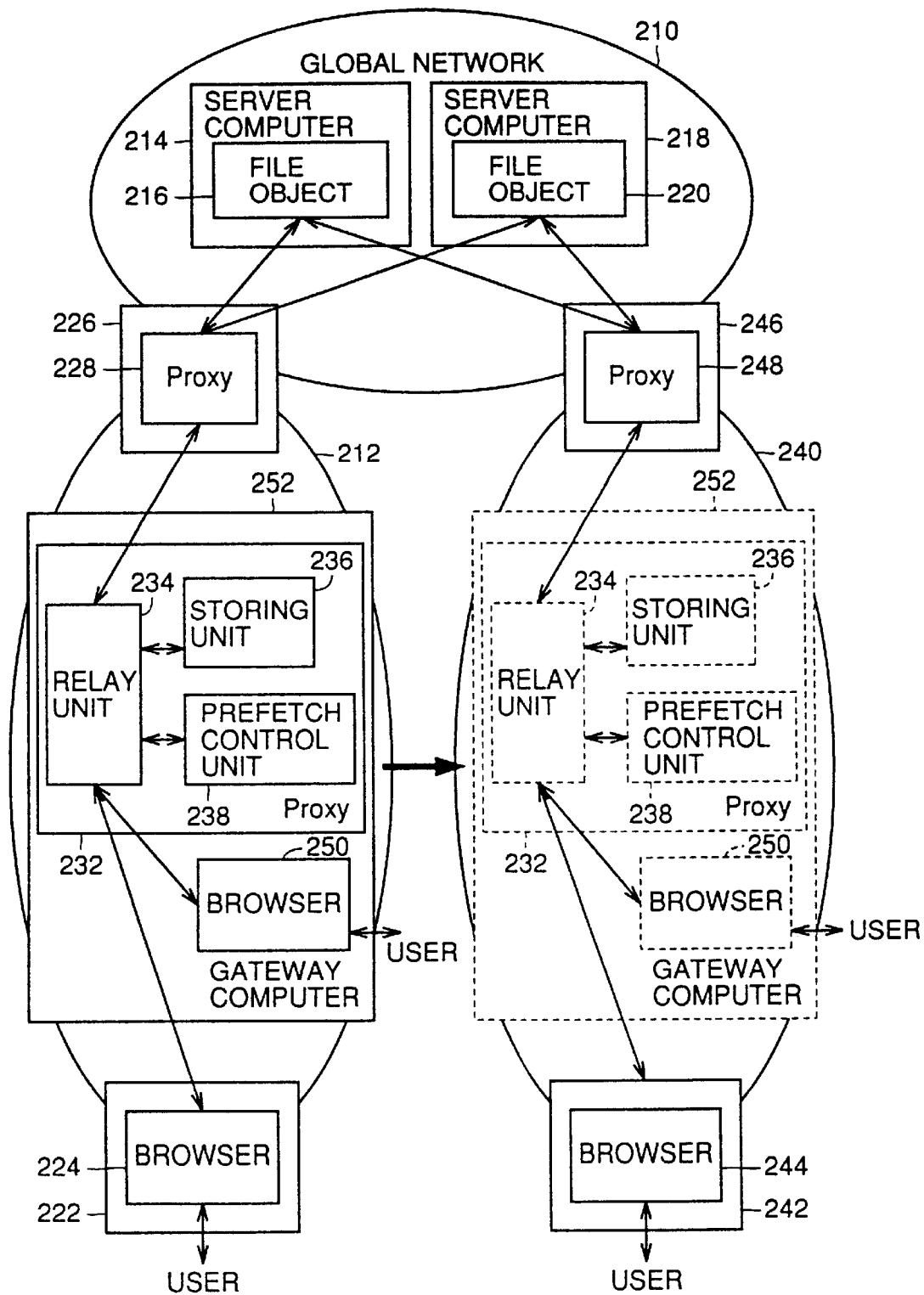

Referring to FIG. 14, the gateway computer (mobile computer) used in the distributed file system may be a gateway computer (mobile computer) 252 including a browser 250 allowing the user to browse file objects in the hypertext format, in addition to Proxy 232.

Therefore, even in a situation where client computer 222 is not available on local network 212, it is possible for the user to browse file object 216 of server computer 214, file object 220 of server computer 218 and replicas of these objects stored in storing unit 236 of gateway computer (mobile computer) through browser 250 of gateway computer (mobile computer) 252. The same applies to a situation where client computer 222 is not available on local network 240.

Figure 15:
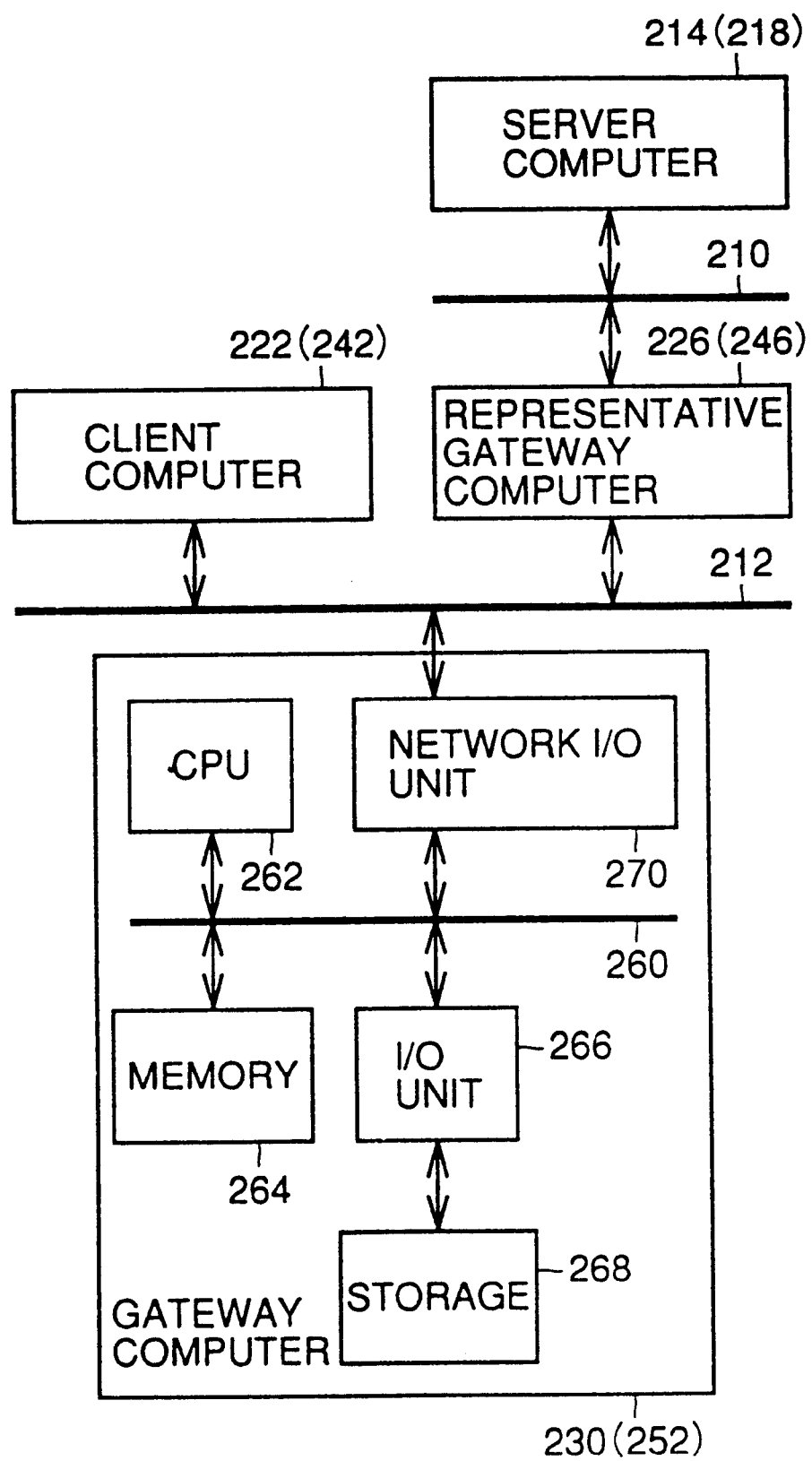
FIGS. 15 and 16 are block diagrams showing a configuration of a gateway computer.

Referring to FIG. 15, gateway computer (mobile computer) 230/252 includes a CPU 262, a memory 264, an I/O unit 266 and a network I/O unit 270 connected to each other by an internal bus 260. At I/O unit 266, storage 268 such as a hard disk or a flash memory is connected. Network I/O unit 270 is network-connected to local network 212.

To local network 212, the aforementioned gateway computer (mobile computer) 230/252, client computer 222/242 and representative gateway computer 226/246 are network-connected. To global network 210, server computer 214/218, the aforementioned representative gateway computer 226/246 and so on are network-connected.

Figure 16:
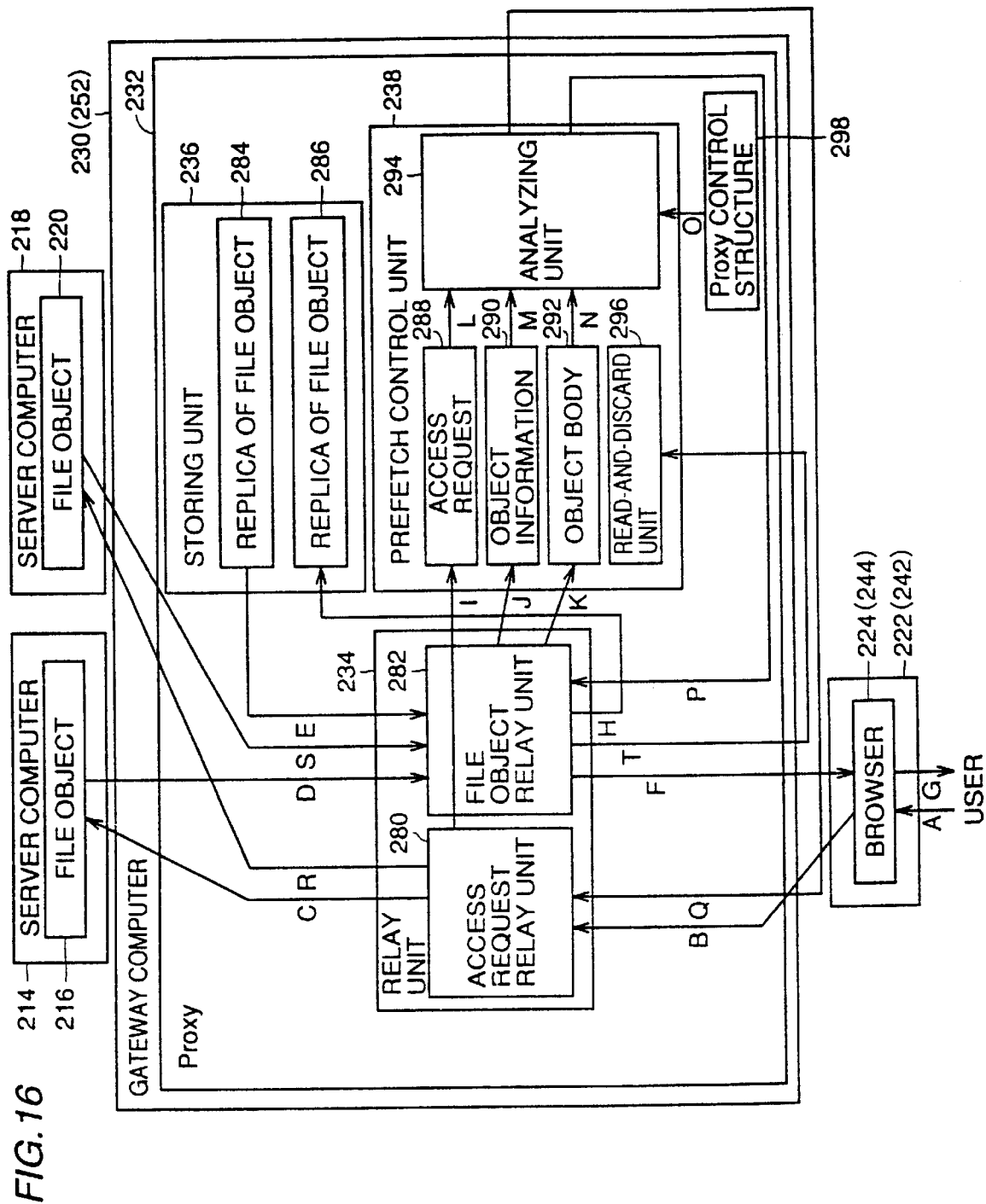

Referring to FIG. 16, the configuration and operation of gateway computer (mobile computer) 230/252 in accordance with the sixth embodiment will be described. Relay unit 234 includes an access request relay unit 280 and a file object relay unit 282. Prefetch control unit 238 includes an analyzing unit 294 and a read-and-discard unit 296. Storing unit 236 stores replicas 284 and 286 of file objects.

The terms will be described. The user access request and the prefetch access request are each generally referred to as an access request (in the WWW system, "request header"). An access request includes address information of the requested file object (in the WWW system, URL (Uniform Resource Locator)), an instruction inhibiting use of a replica of a file object stored in storage 268 (in the WWW system, Pragma: no-cache field, in the following, referred to as "absolute getting instruction"), an instruction designating use of a replica of the file object stored in the storage only when the replica is the latest (in the WWW system, If-Modified-Since field, in the following referred to as "conditional getting instruction") and so on.

Table 24 shows (a part of) an exemplary request header in the WWW system.

TABLE 24

GET http://www.foobar.co.jp/HTTP/1.0\r\n
Pragma: no-cache\r\n
If-Modified-Since: Wed, 01 Oct 1997 07:15:40 GMT\r\n
:
(\r\n represents carriage return and line feed code)

A file object returned by the server computer in response to an access request consists of object information (in the WWW system, "response header") and object body (in the WWW system, "response body"). Object information includes latest date and time of update of the object body (in the WWW system, "last-modified field"), type of the object body (in the WWW system, "Content-Type field"), and size of the object body (in the WWW system, "Content-Length field") and so on.

Table 25 shows (a part of) an exemplary response header in the WWW system.

TABLE 25

HTTP/1.0 200 Document OK\r\n
Last-Modified: Wed, 01 Oct 1997 07:15:40 GMT\r\n
Content-Type: text/html \r\n
Content-Length: 8096\r\n
:
(\r\n represents carriage return and line feed code)

In the following, details of the process content of Proxy 232 will be described along the flow represented by arrows A to T. In FIG. 16, representative gateway computer 226/246 is omitted, and gateway computer 230/252 is directly network-connected to server computers 214 and 218. The contents of processing by Proxy 232 is not different even when representative gateway computer 226/246 exists between gateway computer 230/252 and server computer 214 or 218.

First, the user makes an access request for file object 216 of server computer 214 (hereinafter referred to as "user access request") through browser 224/244 of client computer 222/242. This process in the WWW system corresponds to selection of one of the hyperlinks displayed on the browser (arrow A).

Browser 224/244 transmits the user access request to access request relay unit 280 (arrow B).

Access request relay unit 280 transmits the user access request to server computer 214 (arrow C).

Server computer 214 returns file object 216 requested by the user access request to file object relay unit 282 (arrow D).

When a replica 284 of file object 216 has already been stored in storing unit 236 and is available, the process represented by the arrows C and D described above are not performed, and replica 284 of file object 216 is transmitted to file object relay unit 282 (arrow E). Even when replica 284 of file object 216 is not available (valid date has already been expired, for example), if file object 216 returned from the direction of the arrow D contains only such object information that designates use of replica 284 of file object 216 (in the WWW system, only the response header of which response code value is "304"), then replica 284 of file object 216 is transmitted to file object relay unit 282 (arrow E).

File object relay unit 282 returns file object 216 returning from the direction of the arrow D or replica 284 of file object 216 transmitted from the direction of the arrow E to browser 224/244 (arrow F).

Browser 224/244 presents to the user the file object 216 or replica 284 of the file object returning from the direction of the arrow F (arrow G).

Parallel to the process represented by the arrow F, file object relay unit 282 stores file object 216 in storing unit 236 as a replica 286 of file object 216, if file object 216 returning from the direction of the arrow D is reusable (arrow H).

Parallel to the process of the arrow F, access request relay unit 280 transmits the user access request transmitted from the direction of the arrow B to prefetch control unit 238, as access request 288 (arrow I).

Parallel to the process of the arrow F, file object relay unit 282 transmits object information of file object 216 returning from the direction of the arrow D or object information of replica 284 of the file object transmitted from the direction of the arrow E, as object information 290 to prefetch control unit 238 (arrow J).

Parallel to the process of the arrow F, file object relay unit 282 transmits the object body of file object 216 returning from the direction of the arrow D or object body of replica 284 of the file object transmitted from the direction of the arrow E, as object body 292 to prefetch control unit 238 (arrow K).

Prefetch control unit 238 transmits access request 288 transmitted from the direction of the arrow I to analyzing unit 294 (arrow L). Prefetch control unit 238 transmits object information 290 transmitted from the direction of the arrow J to analyzing unit 294 (arrow M). Prefetch control unit 238 transmits object body 292 transmitted from the direction of the arrow K to analyzing unit 294 (arrow N).

Prefetch control unit 238 transmits various parameters for prefetch access set in Proxy control structure 298 to analyzing unit 294 (arrow O). Details of various parameters of the prefetch access set in the Proxy control structure will be described later.

Utilizing access request 288 transmitted from the direction of the arrow L, object information 290 transmitted from the direction of the arrow M and various parameters for the prefetch access set in Proxy control structure 298 transmitted from the direction of the arrow O, analyzing unit 294 analyzes hypertext information of object body 292 transmitted from the direction of the arrow N. Details of the process procedure performed by analyzing unit 294 will be described later with reference to FIGS. 18 and 19.

When it is determined by the analyzing unit 294 that relay of the file object 216 returning from the direction of the arrow D is to be stopped, a notice is given to file object relay unit 282 to stop relaying of file object 216 (arrow P).

By the analysis of hypertext information of object body 292 transmitted from the direction of the arrow N, when analyzing unit 294 extracts another file object (for example, file object 220 of server computer 218) which is at a destination of a hyperlink, an access request (in the following, referred to as a "prefetch access request") for file object 220 is made to access request relay unit 280 (arrow Q).

Access request relay unit 280 transmits the prefetch access request transmitted from the direction of the arrow Q to server computer 218 (arrow R).

Server computer 218 returns the file object 220 corresponding to the prefetch access request transmitted from the direction of the arrow R to file object relay unit 282 (arrow S).

File object relay unit 282 transmits the file object 220 returning from the direction of the arrow S to read-and-discard unit 296 of prefetch control unit 238 (arrow T). Read-and-discard unit 296 performs simply the process of receiving file object 220.

Parallel to the process of the arrow T, if file object 220 returning from the direction of the arrow S is reusable, file object relay unit 282 stores file object 220 as a replica 286 of file object 220 in storing unit 236. This is the same as the process represented by the arrow H in the user access request.

Parallel to the process of the arrow T, access request relay unit 280 transmits the prefetch access request transmitted from the direction of the arrow Q as access request 288 to prefetch control unit 238. This is the same as the process represented by the arrow I related to the user access request.

Parallel to the process of the arrow T, file object relay unit 282 transmits the object information of file object 220 returning from the direction of the arrow S as object information 290 to prefetch control unit 238. This is the same as the process represented by the arrow J related to the user access request.

Parallel to the process represented by the arrow T, file object relay unit 282 transmits the object body of file object 220 returning from the direction of the arrow S to prefetch control unit 238 as object body 292. This is similar to the process represented by the arrow K related to the user access request.

Prefetch control unit 238 transmits access request 288 transmitted from the direction of the arrow I, object information 290 transmitted from the direction of the arrow J, object body 292 transmitted from the direction of the arrow K and various parameters of the prefetch access set in the Proxy control structure 298 to analyzing unit 294, where analysis for a new prefetch access request takes place.

Thereafter, the above described processes are repeated.

Figure 17:
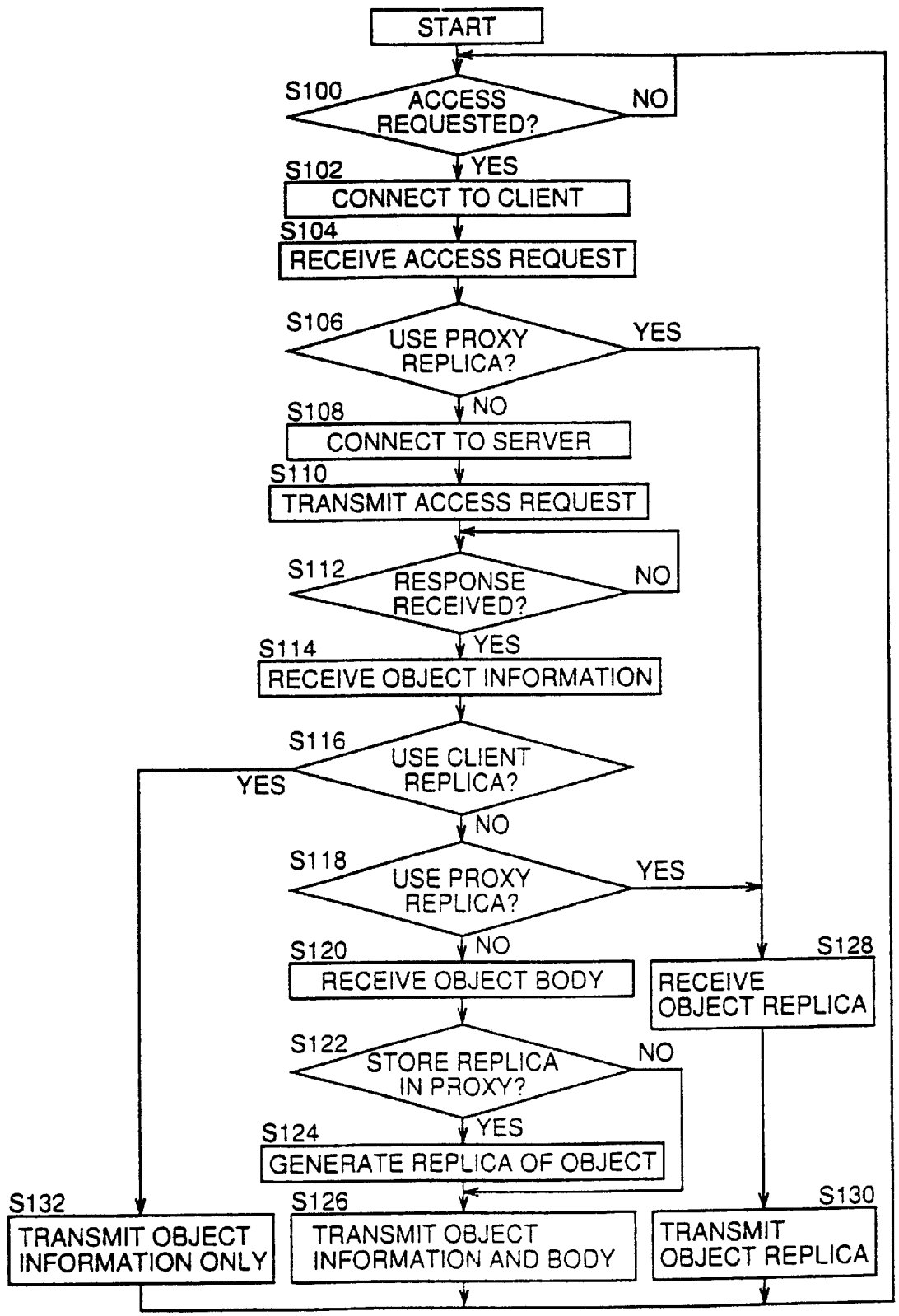
FIG. 17 is a flow chart related to a processing by the Proxy.

Referring to FIG. 17, the process procedure of Proxy 232 of gateway computer 230/252 will be described. Relay unit 234 of Proxy 232 receives user access request (arrow B) and prefetch access request (arrow Q). The process procedure is not different for different access requests.

Relay unit 234 waits for an access request, for file object 216 of server computer 214 or for a file object 220 of server computer 218, from browser 224/244 of client computer 222/244 or from prefetch control unit 238 of itself (gateway computer 230/252) (S100).

When there is an access request (arrow B or Q) (YES in S100), relay unit 234 establishes a network-connection to client computer 222/242 which has transmitted the access request (when access request comes from the direction of the arrow B) or to itself (gateway computer) 230/252 (if access request comes from the direction of the arrow Q) (S102).

Relay unit 234 receives the access request (arrow B, Q) from the network-connected client computer (client computer 224/244 or, itself 230/252, which is also referred to as a client computer here) (S104).

Thereafter, whether there is a replica of the file object of the server computer for which the access request is made (arrow B, Q) stored as replica 284 of the file object in storing unit 236 of Proxy 232 is determined. Further, it is determined as to whether use of replica 284 of the file object is permitted by the access request (arrow B, Q) or storing unit 236 (S106).

If use of the replica 284 of the file object is not permitted in S106, relay unit 234 establishes a network-connection with server computer 214/218 for which access request (arrow B, Q) is made (S108). Thereafter, relay unit 234 transmits the access request to the network-connected server computer 214/218 (arrow C or R, S110).

Relay unit 234 waits for a response from server computer 214/218 to which the access request has been transmitted (arrow C, R) (S112). When there is a response (YES in S112), relay unit 234 receives file object information from server computer 214/218 which returned the response (arrow D or S, S114).

Relay unit 234 determines whether the file object information (arrow D, S) requires use of local file object replica of the client computer (client computer 222/244 or gateway computer 230/252) (S116).

When the file object information does not require use of the local file object replica of the client computer (client computer 222/244 or gateway computer 230/252) (NO in S116), relay unit 234 determines whether the file object information (arrow D, S) requires use of replica 284 of the file object in storing unit 236 (S118).

If the file object information does not require use of replica 284 of the file object (NO in S118), relay unit 234 gets the file object body from server computer 214/218 which returned the file object information (arrow D or S, S120).

Relay unit 234 determines whether the file object information and the file object body obtained from server computer 214/218 may be stored as replica 286 of the file object in storing unit 236 (S122). If it is determined that these may be stored as replica 286 of the file object (YES in S122), relay unit 234 stores the file object information and the file object body as replica 286 of the file object (arrow H, S124).

If these are not to be stored as replica 286 of the file object (NO in S122), or after the process of step S124, relay unit 234 transmits the file object information and the file object body to that client computer which has transmitted the access request (arrow B or Q) (client computer 222/242 or gateway computer 230/252) (arrow F or T). If the client computer is gateway computer 230/252 (arrow T), the file object is transmitted to read-and-discard unit 296 of prefetch control unit 238 and it is not subjected to any processing. Further, relay unit 234 transmits the access request relayed by the arrow B or Q and the file object information and the file object body relayed as represented by the arrow F or T to prefetch control unit 238, respectively (arrows I, J, K), and analysis for a new prefetch access request takes place in analyzing unit 294 (S126).

When it is possible to use replica 284 of the file object (YES in S106), or when the file object information requires use of replica 284 of the file object (YES in S118), replica 284 of the file object is transmitted to relay unit 234 (arrow E, S128).

The replica of the file object obtained in the process of S128 is transmitted to the client computer (client computer 222/242 or gateway computer 230/252) (arrow F or T). When the client computer is gateway computer 230/252 (arrow T), the file object is transmitted to read-and-discard unit 296 of prefetch control unit 238 and it is not subjected to any processing. Further, relay unit 234 transmits the relayed access request represented by the arrow B or Q and the replica of the relay file object represented by the arrow F or T (that is, the file object information and the file object body contained in the replica) to prefetch control unit 238 (arrows I, J, K). Analyzing unit 294 analyzes for a new prefetch access request (S130).

If the file object information requires use of local file object replica of the client computer (client computer 222/242 or gateway computer 230/252) (YES in S116), only the file object information is transmitted to the client computer (client computer 222/242 or gateway computer 230/252) (arrow F, T). If the client computer is the gateway computer 230/252 (arrow T), the file object information is transmitted to read-and-discard unit 296 of prefetch control unit 238, and it is not subjected to any processing. In this case, the file object body is not relayed. Therefore, the file object body is not transmitted to prefetch control unit 238 either (arrow K), and analysis for making a new prefetch access request is not performed (S132).

Finally, in S126, S130 or S132, the file object, the replica of the file object or only the file object information is transmitted to the client computer (client computer 222/242 or gateway computer 230/252), thereafter, the flow returns to the start of the process procedure (S100), and the relay unit 234 waits for the next access request.

Figure 18:
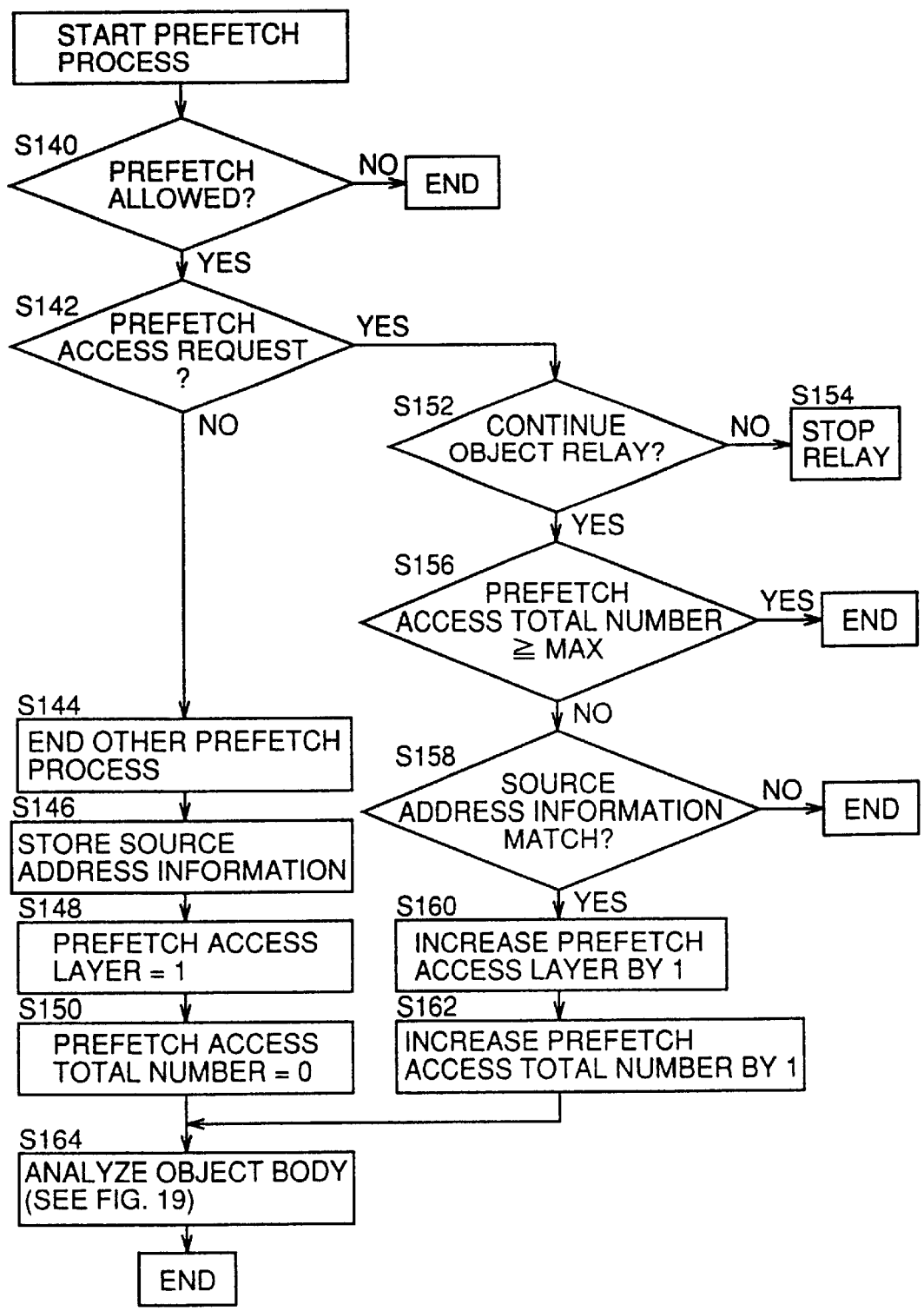
FIG. 18 is a flow chart related to a processing by an analyzing unit.

Referring to FIG. 18, the process procedure of analyzing unit 294 will be described. The prefetch process executed by analyzing unit 294 is a separate process executed independent from and parallel to the access request and the relay of file object. Therefore, even if the process procedure of the prefetch process is interrupted by a loop process, for example, the access request and relay of the file object are not affected.

First, analyzing unit 294 analyzes an object body transmitted through the arrow N (hereinafter referred to as "object body") utilizing an access request transmitted from the arrow L (hereinafter referred to as "access request"), object information transmitted through the arrow M (hereinafter referred to as "object information") and various parameters for the prefetch access set in Proxy control structure transmitted through the arrow O (hereinafter referred to as "Proxy control structure"), and determines whether a prefetch access request may be made or not (S140). The prefetch access request may be made when the type of the object body included in the object information is hypertext (in the WWW system, when "text/html" or the like is described in Content-Type field of the response header) and "true" is set at a prefetch access permission of the Proxy control structure. If it is determined that a prefetch access request should not be made (NO in S140), analyzing unit 294 ends the processing.

When it is determined that a prefetch access request may be made (YES in S140), analyzing unit 294 determines whether the access request is a user access request or a prefetch access request (S142). If the access request is a prefetch access request, the access request includes address information of the file object requested by the user access request based on which the prefetch access request is made (hereinafter referred to as "source address information of prefetch access request") and information of the layer of the prefetch access request. These pieces of information are added when the prefetch access request is made in the process of S184, which will be described later with reference to FIG. 19.

Table 26 shows (only a part of) an exemplary request header which is a prefetch access request in the WWW system. The line starting from X-Prefetch represents information included only in the prefetch access request. The URL "http://www.foobar.co.jp/" described in the X-Prefetch-URL field represents the source address information of the prefetch access request. The numerical value "1" described in the X-Prefetch-Level field represents the layer of the prefetch access request. The line starting from X-Prefetch is a unique extension of the present invention not defined by the WWW system. The row starting from X-Prefetch is deleted when access request relay unit 280 relays the prefetch access request (arrow R).

TABLE 26

GET http://www.foobar.co.jp/menu.html HTTP/1.0\r\n
Pragma: no-cache\r\n
If-Modjfied-Since: Wed, 01 Oct 1997 07:15:40 GMT\r\n
X-Prefetch-URL: http://www.foobar.co.jp/\r\n
X-Prefetch-Level: 1\r\n
    :
(\r\n represents carriage return and line feed code)

When it is determined that the access request is a user access request (NO in S142), analyzing unit 294 ends all the other prefetch processes which are being in process generated in response to previous user access request (S144).

After the process of S144, analyzing unit 294 stores the address information of the file object requested by the user access request (in the WWW system, the URL described on the first line of the request header) as the source address information of the prefetch access request (S146). After the process of S146, analyzing unit 294 initializes the layer of the prefetch access request to 1 (S148). After S148, analyzing unit 294 initializes the total number of prefetch access request to 0 (S150).

If it is determined that the access request is the prefetch access request (YES in S142), analyzing unit 294 determines as to whether relay of the file object which is being performed in file object relay unit 282 (arrow D, E, F) is to be continued or not (S152). The file object relay is continued when the size of the object body contained in the object information (in the WWW system, a numerical value described in the Content-Length field of the response header) is not larger than a numerical value set in the file object size limit of the Proxy control structure.

If it is determined that relay of the file object should not be continued (NO in S152), analyzing unit 294 transmits a notice to file object relay unit 282 to stop relay of the file object (arrow P), and ends processing (S154).

If it is determined that relay of the file object is to be continued (YES in S152), then analyzing unit 294 determines whether the total number of prefetch access requests up to the immediately preceding another prefetch process is not smaller than a numerical value MAX set as the prefetch access total number of the Proxy control structure (S156). If the total number of prefetch access request is equal to or larger than the numerical value MAX (YES in S156), analyzing unit 294 ends processing.

When the total number of prefetch access request is smaller than the numerical value MAX (NO in S156), analyzing unit 294 determines whether the source address information of the prefetch access request included in the prefetch access request (in the WWW system, the URL described in the X-Prefetch-URL field) matches the source address information of the prefetch access request stored in the process S146 of the previous prefetch process (S158). If the source address information of the prefetch access request does not match (NO in S158), the prefetch access request which is the object of the present prefetch process is a prefetch access request based on an old user access request made previously, and therefore analyzing unit 294 ends processing.

When the source address information of the prefetch access request matches (YES in S158), analyzing unit 294 increases the layer of the prefetch access request by 1 (S160). Further, the analyzing unit 294 increases the total number of prefetch access request by 1 (S162).

After the process of S150 or S162, analyzing unit 294 analyzes the object body and ends its processing (S164).

Figure 19:
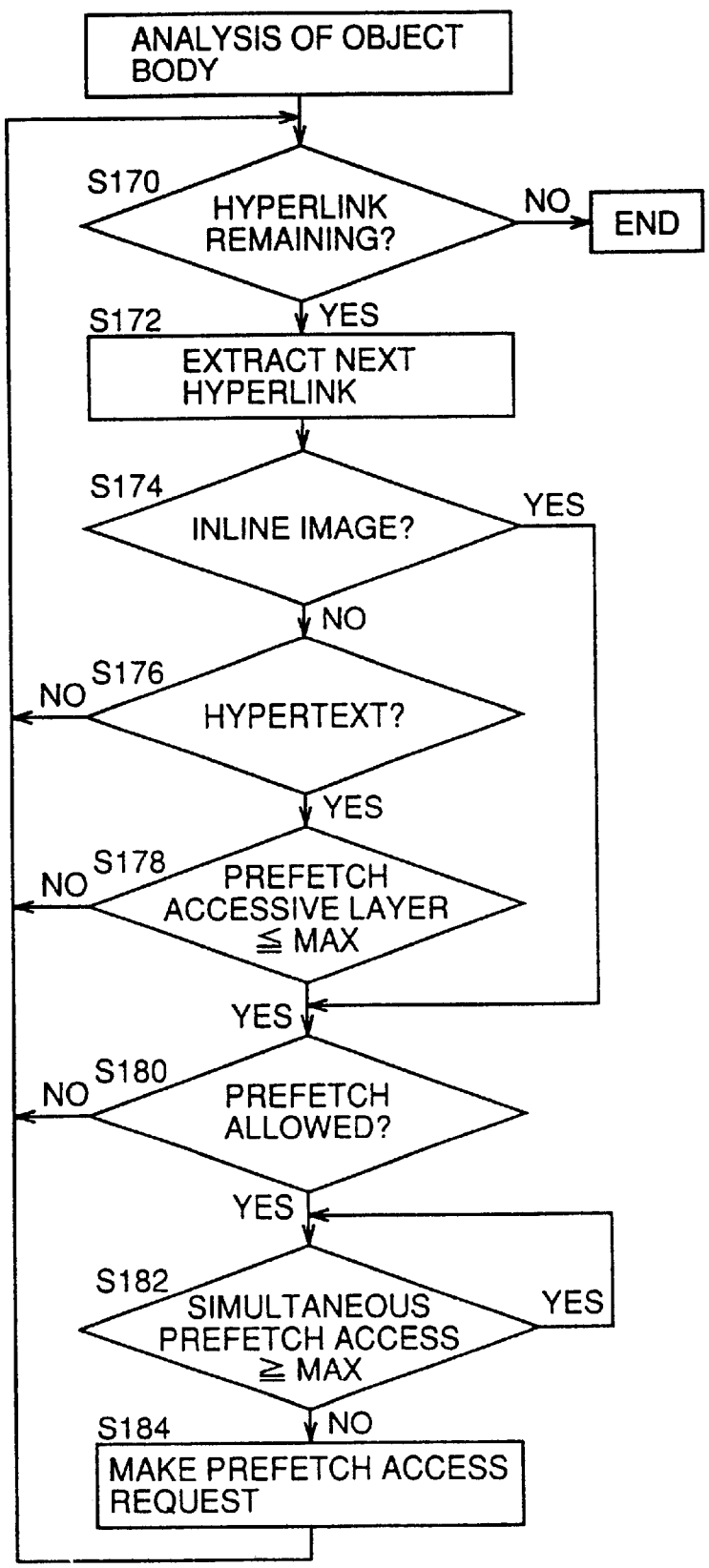
FIG. 19 is a flow chart showing analysis of an object body.

The process of step S164 will be described in detail with reference to FIG. 19.

Analyzing unit 294 analyzes the object body and determines whether there is a hyperlink which is not yet processed (S170). If there is not any hyperlink which is not yet processed (NO in S170), the analyzing unit 294 ends processing. In the following description, address information for an image file object (in the following, referred to as "in line image") referred to only when the file object is displayed is also referred to as a hyperlink for convenience of description.

Table 27 shows an example of a hyperlink in the hypertext (HTML) in the WWW system. Here, one designating a URL by a tag <a href=" . . . "> . . . </a> is an example of a common hyperlink, and one designating a URL by the tag <img src=" . . . "> is an example of a hyperlink for an in line image (for convenience).

TABLE 27

<a href="http://www.foobar.co.jp/menu.html">Menu</a>
<img src="http://www.foobar.co.jp/images/logo.gif">

When there is a hyperlink which has not yet been processed (YES in S17), analyzing unit 294 extracts the hyperlink, and gets address information of another file object at the destination of the hyperlink (S172).

After the process of S172, analyzing unit 294 determines whether the aforementioned another file object at the destination of the extracted hyperlink is an in line image or not (S174). In the WWW system, an in line image is designated by the tag <img src=" . . . ">, and therefore it can be easily distinguished.

If it is determined that the aforementioned another file object at the destination of the hyperlink is not an in line image (NO in S174), analyzing unit 294 determines whether the aforementioned another file object at the destination of the hyperlink is a hypertext (S176). For determination of the hypertext, an extension included in the address information of the file object is utilized. In the WWW system, a file object having the URL extension of ".html", ".htm" or the like is determined to be hypertext. If it is determined that the aforementioned another file object at the destination of the hyperlink is not the hypertext (NO in S176), analyzing unit 294 returns to S170 and extracts a next hyperlink.

When it is determined that the aforementioned another file object at the destination of the hyperlink is in hypertext (YES in S176), analyzing unit 294 determines whether the layer of the prefetch access request set in the process of S148 or S160 is equal to or larger than the number of maximum prefetch access layers MAX of the Proxy control structure (S178). If the layer of the prefetch access request is smaller than the maximum number of prefetch access layers (NO in S178), analyzing unit 294 returns to S170 and extracts a next hyperlink.

If it is determined that the aforementioned another file object at the destination of the hyperlink is an in line image (YES in S174) or if the layer of the prefetch access request is smaller than the maximum number of prefetch access layers (YES in S178), analyzing unit 294 determines whether a prefetch access request may be made to the file object (S180). The prefetch access request may be made when the extension contained in the address information of the file object does not match the extension set in the file object type limitation of the proxy control structure and the name of the server computer contained in the address information of the file object does not match the name of the server computer set in a prefetch access inhibition server computer of the Proxy control structure. In the WWW system, the extension contained in the address information of the file object corresponds to the URL extension "gif", "gpg", "jpeg" or the like. The name of the server computer contained in the address information of the file object corresponds to the URL host name portion such as "www-.foobar.co.jp" or "123.45.67.89". When it is determined that the prefetch access request should not be made (NO in S180), analyzing unit 294 returns to S170 and extracts a next hyperlink.

When it is determined that the prefetch access request may be made (YES in S180), analyzing unit 294 determines whether the total number of prefetch access request which are being executed at present is equal to or higher than a value representing the number of simultaneous prefetch access requests of the Proxy control structure (S182). If the total number of prefetch access requests is larger than the value of the number of simultaneous prefetch access request (YES in S182), analyzing unit 294 repeats this step until the total number of prefetch access requests which are being executed at present attains equal to or smaller than the value set as the number of simultaneous prefetch access request.

If it is determined that the total number of prefetch access requests is not larger than the value of the number of simultaneous prefetch access requests (NO in S182), analyzing unit 294 generates an access request containing address information of the aforementioned another file object obtained in the process of S172, source address information of the prefetch access request, and layers of the prefetch access request set in the process of S148 and S150. Analyzing unit 294 makes a new prefetch access request to access request relay unit 280 (arrow Q, S184). Thereafter, analyzing unit 294 returns to S170 and extracts a next hyperlink.

Referring again to Table 26, (a part of) an exemplary request header of a prefetch access request in the WWW system will be described. The URL described in the first line, "http://www.foobar.co.jp/menu.html" represents address information of the separate file object, that is, the aforementioned another file object, obtained in the process of S172. Further, the URL "http://www.foobar.co.jp/" described in the X-Prefetch-URL field is the source address information of the prefetch access request. The numerical value "1" described in X-Prefetch-Level field represents the layer of the prefetch access request set in the process of S148.

In the process of S184, when an instruction inhibiting use of a replica of the file object stored in the storage (in the following, referred to as "absolute getting instruction") is contained in the access request, analyzing unit 294 may add the absolute getting instruction when the prefetch access request is generated.

Table 28 shows (only part of) an exemplary request header which is the prefetch access request in the WWW system. Here, the Pragma:no-cache field described in the second line is the absolute getting instruction.

TABLE 28

GET http://www.foobar.co.jp/menu.htm/HTTP/1.0\r\n
Pragma: no-cache \r\n
X-Prefetch-URL: http://www.foobar.co.jp/\r\n
X-Prefetch-Level: 1\r\n
:
(\r\n represents carriage return and line feed code)

The Proxy control structure will be described.

In the distributed file system in which a movable mobile computer is used as a gateway computer, it is desired that various parameters of the Proxy of gateway computer 230/252 are set in the Proxy control structure. Further, a method is desired in which different Proxy control structures are prepared for different networks and the structures are switched in accordance with the network to which the gateway computer 230/252 belongs at a time point. The Proxy control structure is similar to that described with reference to the second embodiment. Therefore, its description will not be repeated here.

In the distributed file system in accordance with the present embodiment, various parameters related to the prefetch access are also set by proxy 232 of gateway computer 230/252 in the Proxy control structure. Proxy control structures allowing appropriate prefetch access for respective networks to which gateway computer 230/252 belongs at the time of prefetch access are prepared and switched for use.

Referring to FIG. 20, parameters of Proxy control structures 310, 312 and 314 provided for respective networks may possibly include network name, dial up telephone number, host name and port number of representative gateway computer 1, host name and port number of representative gateway computer 2, host name and port number of representative gateway computer 3, and so on.

In addition to the above described various parameters, various parameters for enabling appropriate prefetch access for each network to which gateway computer 230/252 belongs at that time point are set in Proxy control structures 310, 312 and 314. Gateway computer 230/252 switches and uses the Proxy control structure.

In the following, various parameters will be described.

In the wait time for a prefetch access, a wait time, which will be described later with respect to the second embodiment, is set in advance. Gateway computer 230/252 switches to Proxy control structure 310, 312 or 314 dependent on the network to which it belongs at that time point, and utilizes the wait time for the prefetch access. The prefetch access wait time is utilized in the determination of step S143 in the process procedure shown in FIG. 21, which will be described later.

A wait time determined by a wait time determining unit 302, which will be described later with reference to the eighth embodiment, may be stored as the prefetch access wait time for each of Proxy control structures 310, 312 and 314 related to the network to which the gateway computer 230/252 belongs. The prefetch access wait time determined by the wait time determining unit, which will be described later, is utilized in the determination of step S143 in the process procedure of FIG. 21, which will be described later.

Therefore, it becomes possible to shift the relay of a file object in accordance with a request for getting the file object from the start time of prefetch processing, and therefore increasing the load on gateway computer 230/252 can be avoided. Further, the frequency of relay of file objects which are not expected to be accessed by the user is reduced, and therefore unwanted increases in network traffic can be prevented.

In a prefetch access permission, whether Proxy 232 permits a prefetch access (Boolean value "true") or inhibits (Boolean value "false") is set. Gateway computer 230/252 uses the prefetch access permission, by switching to the Proxy control structure 310, 312 or 314 of the network to which it belongs at the time of prefetch. The prefetch access permission is utilized in determination of step S140 in the process procedure of FIG. 18.

Accordingly, it is possible for gateway computer 230/252 to set whether prefetch is to be performed or not, network by network. More specifically, it is possible for gateway computer 230/252 to perform appropriate prefetching for each network in the following manner. For example, if the gateway computer is connected to a high speed access network such as global network 210, the computer allows prefetching, and if it is connected to a low speed access network such as local network 240, prefetch is not allowed.

As a value representing the number of simultaneous prefetch access requests, the number of prefetch access requests which can be simultaneously performed by Proxy 232 is set. Gateway computer 230/252 utilizes the number of simultaneous prefetch access requests by switching to the Proxy control structure 310, 312 or 314 for the network it belongs to at the time of prefetch. The value of the number of simultaneous prefetch access request is utilized in the determination of S182 in the process procedure of FIG. 19.

Therefore, it is possible for gateway computer 230/252 to set the number of possible simultaneous prefetch requests network by network. More specifically, when gateway computer 230/252 is connected to a high speed access network, for example, the number of simultaneous prefetch requests is increased, and if the gateway computer is connected to a low speed access network, the number of simultaneous prefetch requests may be reduced.

As a value representing the number of maximum prefetch access layers, the number of maximum layers of prefetch access request which can be made by Proxy 232 in response to a user access request is set. Gateway computer 230/252 utilizes the maximum number of prefetch access layers by switching to the Proxy control structure 310, 312 or 314 corresponding to the network to which it belongs at the time of prefetch. The value of the maximum number of prefetch access layers is utilized in the determination of S178 in the process procedure of FIG. 19.

Therefore, it is possible for gateway computer 230/252 to perform appropriate prefetching network by network, by appropriately determining the maximum number of prefetch access layers in accordance with the access speed of the network to which it is connected.

As a value representing the prefetch access total number, the total number of prefetch access requests which may be made by Proxy 232 in response to a user access request is set. Gateway computer 230/252 utilizes the prefetch access total number by switching to the Proxy control structure 310, 312 or 314 for the network to which the gateway computer belongs at the time of prefetch. The value of the prefetch access total number is utilized in determination of S156 in the process procedure of FIG. 18.

Therefore, the total number of prefetch accesses is determined in accordance with the access speed of the network to which the gateway computer 230/252 is connected. Therefore, appropriate prefetch network by network can be performed by gateway computer 230/252.

As the file object size limit, the maximum size (in units of KB) of the file object of server computer 214/218 which may be relayed by Proxy 232 in response to the prefetch access request is set. Gateway computer 230/252 utilizes the file object size limit by switching to the Proxy control structure 310, 312 or 314 corresponding to the network to which the gateway computer belongs at the time of prefetching. The file object size limit is utilize in the determination of S152 in the process procedure of FIG. 18.

Therefore, it is possible for gateway computer 230/252 to set a large file object size limit when it is connected to a high speed access network, so as to enable prefetching of a file object of a large size such as an image file. Further, it is possible for gateway computer 230/252 to set a small file object size limit when it is connected to a low speed network, so as to allow prefetching of only small size file objects such as text files. Accordingly, it is possible for the gateway computer 230/252 to perform appropriate prefetch network by network.

As the file object type limit, the type of a file object (image, text or the like) of server computer 214/218 which should not be relayed by Proxy 232 in response to a prefetch access request is set by an extension contained in the address information of the file object. The mobile computer utilizes the file object type limit by switching to the Proxy control structure 310, 312 or 314 for the corresponding network to which it belongs at that time. In the WWW system, the extension contained in the address information of the file object corresponds to the URL extension of "gif", "jpg", "jpeg" or the like. The file object type limit is utilized in the determination of S180 in the process procedure of FIG. 19.

Therefore, it is possible for the gateway computer 230/252 to set the file object type limit such that prefetching of a file object having large size such as an image file is not performed when it is connected to a low speed access network, for example. Therefore, it is possible for gateway computer 230/252 to perform appropriate prefetching network by network.

As the prefetch access inhibition server computer, the name of server computer 214/218 for which prefetch access request is inhibited by Proxy 232 is set. Gateway computer 230/252 utilizes the prefetch access inhibition server computer by switching to the Proxy control structure 310, 312 or 314 for the network to which it belongs at the time of prefetching. In the WWW system, the name of the server computer contained in the address information of the file object corresponds to the URL host name portion such as "www.foobar.co.jp" or "123.45.67.89". The prefetch access inhibition server computer is used in the determination of S180 in the process procedure of FIG. 19.

Therefore, when the gateway computer 230/252 is connected to a low speed access network, prefetching for the server 214/218 computer of which response is poor because of concentrated access from a client computer connected to a different network is inhibited. In this manner, it is possible for gateway computer 230/252 not to prevent prefetching of different server computer 214/218 with high response. Therefore, it is possible for gateway computer 230/252 to perform appropriate prefetching network by network.

As the prefetch access inhibition server computer, a pattern file describing the name of the server computer may be set. Table 29 shows an example of a pattern file describing the name of the server computer.

TABLE 29

| | |
|---|---|
| www.foobar.co.jp | |
| *.foobar.co.jp | # all belonging to foo.bar.co.jp |
| www*.foobar.co.jp | # all belonging to foobar.co.jp starting with www |
| 123.45.67.89 | |
| 123.45.67.* | # all belonging to 123.45.67 |
| 123.45.67.1-123.45.67.123 | # all belonging to |
| 123.45.67.1~123.45.67.123 | |
| : | |
| | (comment follows #) |

Seventh Embodiment

The distributed file system in accordance with the seventh embodiment has a similar configuration as the distributed file system according to the sixth embodiment. Therefore, description thereof is not repeated. In the distributed file system, analyzing unit 294 of Proxy 232 is different.

Figure 21:
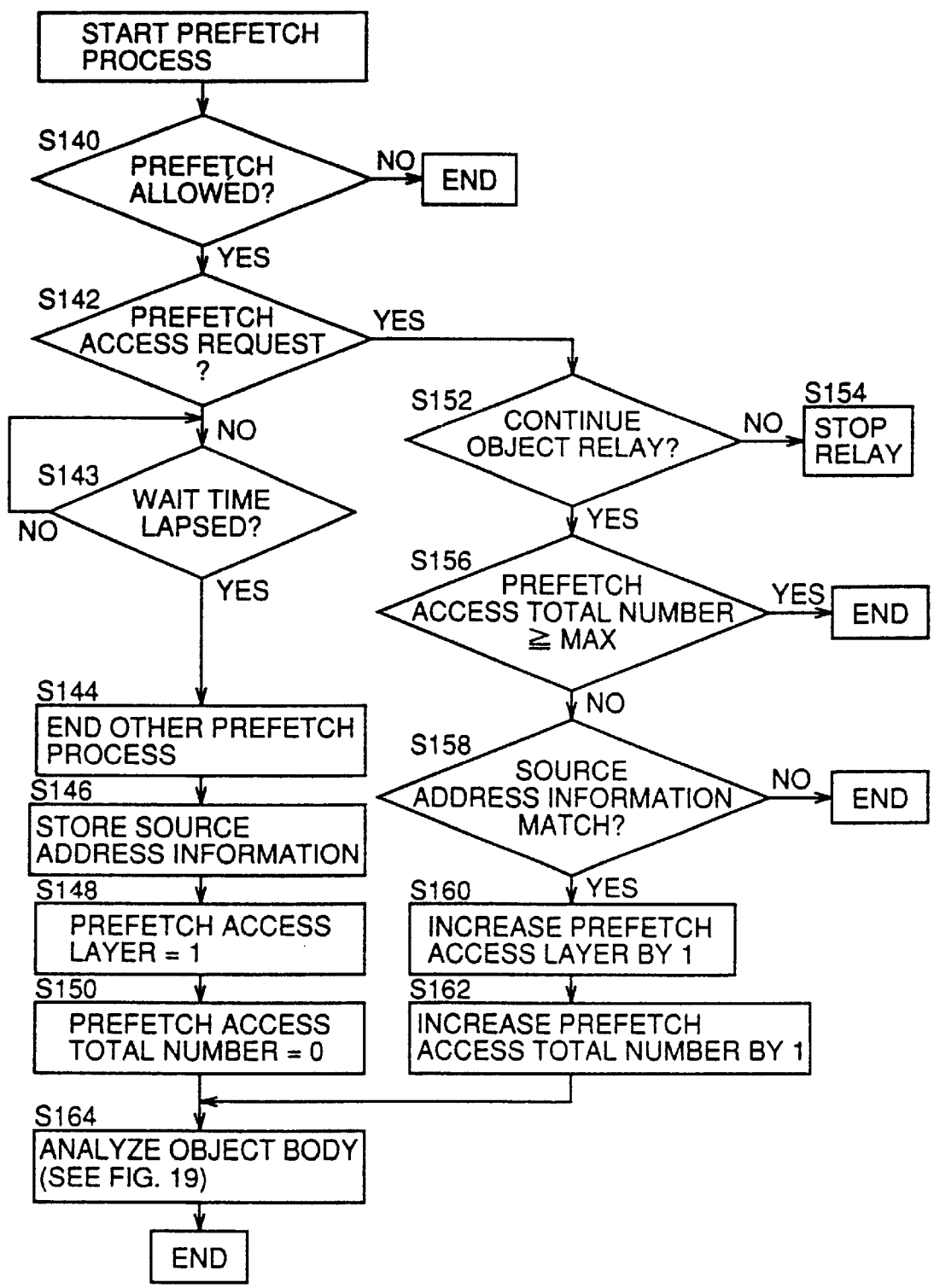
FIG. 21 is a flow chart related to a processing by the analyzing unit.

Referring to FIG. 21, process procedure of analyzing unit 294 will be described. The process executed by analyzing unit 294 corresponds to the process executed by analyzing unit 239 of the sixth embodiment described with reference to FIG. 18, with a step S143 added between steps S142 and S144. Therefore, only the process step S143 will be described, and the other steps or portions will not be repeated here.

When it is determined that the access request is a user access request (NO in S142), analyzing unit 294 determines whether the wait time set as the prefetch access wait time of the Proxy control structure lapsed or not (S143). If the wait time has not lapsed (NO in S143), analyzing unit 294 repeats this step until the wait time expires (until it becomes YES in S143).

When the wait time lapses (YES in S143), analyzing unit 294 ends all other prefetch processes, for which the determination of S143 is performed, generated in response to a previous user access request (S144).

This prevents increase of load on the gateway computer caused by overlapping relay of a file object in response to a user access request and a relay of a file object in response to a prefetch access request.

That new user access request is relayed before the lapse of the wait time set as the prefetch access wait time in Proxy control structure 298 means that the user means that the user is not interested in the file object which corresponds to the old user access request. Namely, there is low possibility that the user accesses a different file object at a destination of the hyperlink contained in the file object. Therefore, increases in network traffic caused by wasteful prefetch access requests can be prevented.

Eighth Embodiment

Figure 22:
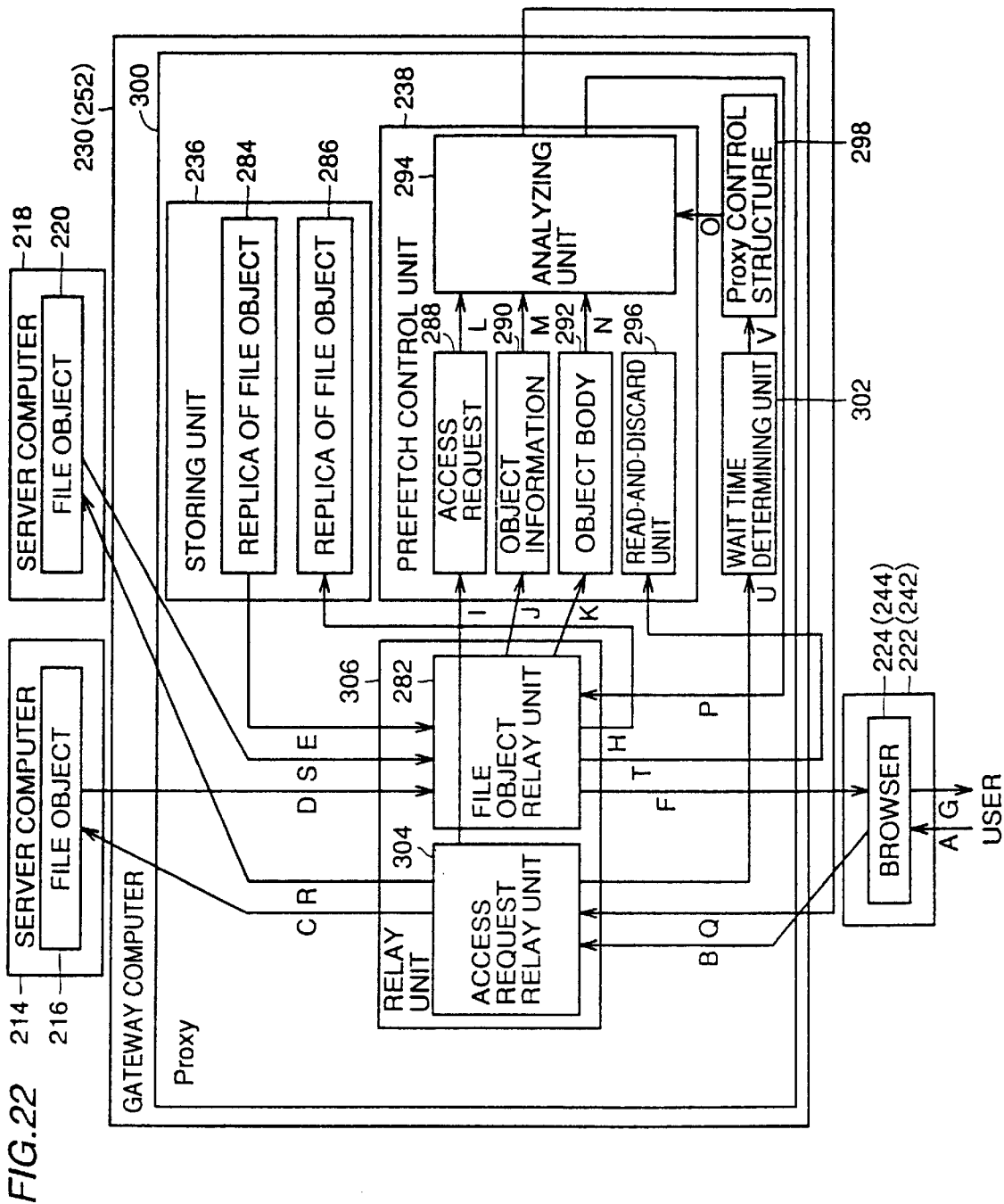
FIG. 22 shows configurations of a distributed file system and a gateway computer in accordance with an eighth embodiment.

Referring to FIG. 22, the distributed file system according to the eighth embodiment uses Proxy 300 in place of Proxy 232 used on gateway computer 230/252 in the distributed file system in accordance with the sixth embodiment. Therefore, the description of other common components will not be repeated here. Proxy 300 includes, in addition to the component of Proxy 232, a wait time determining unit 302.

The details of the contents of the process performed by Proxy 300 will be described, following the flow represented by arrows A to V. The processes represented by arrows A to T are similar to those of Proxy 232 described with reference to FIG. 16. Therefore, their description will not be repeated here.

Access request relay unit 304 transmits time of relay of a user access request transmitted from the direction of the arrow B to wait time determining unit 302 (arrow U).

Wait time determining unit 302 measures an interval between relay times of continuous two user access requests transmitted from the direction of the arrow U. Wait time determining unit 302 determines an appropriate user access wait time, and changes the setting of the user access wait time of Proxy control structure 298 (arrow V).

An example of a method of determining an appropriate user access wait time will be described. Wait time determining unit 302 stores those of the relay intervals which are shorter than a minimum relay interval (for example, 1 minute) set in advance. Wait time determining unit 302 calculates an average of a prescribed number of past relay intervals stored (for example, 100 times), and determines the average multiplied by a prescribed number (for example 5) as the user access wait time.

Figure 23:
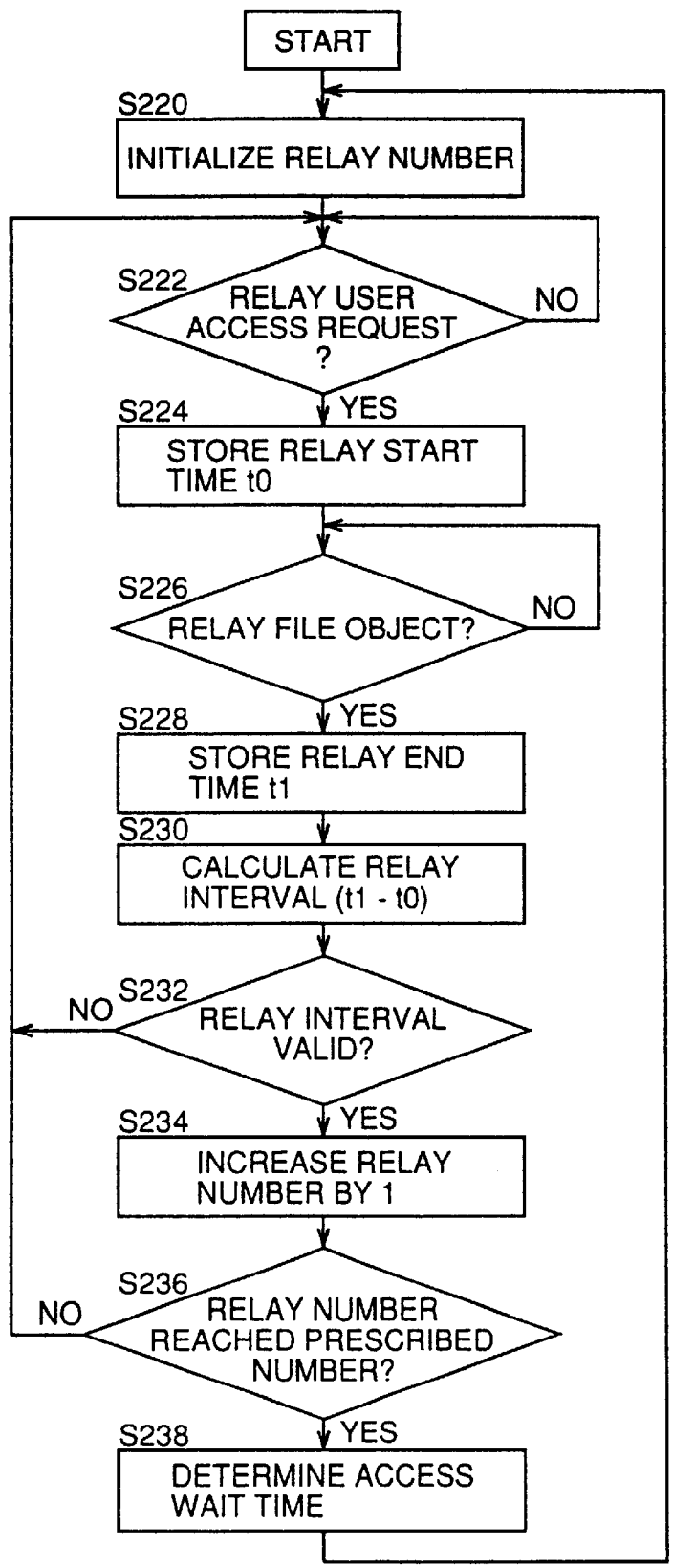
FIG. 23 is a flow chart related to a process executed by a wait time determining unit.

Referring to FIG. 23, the process performed by the wait time determining unit 302 will be described. The process of the wait time determining unit 302 is executed as a different process, independent from the process by relay unit 306 or the process performed by the analyzing unit 294 of prefetch control unit 238.

Wait time determining unit 302 initializes the number of user access requests relayed by relay unit 306 to 0 (S220).

Then, wait time determining unit 302 waits for a relay of a user access request by relay unit 306 (S222).

When a relay of a user access request is detected (YES in S222), wait time determining unit 302 stores the time at that point as relay start time t0 (S224).

Wait time determining unit 302 waits until the file object corresponding to the user access request relayed by relay unit 306 is relayed (S226).

When the relay of the file object is detected (YES in S226), wait time determining unit 302 stores the time at that point as relay end time t1 (S228).

Wait time determining unit 302 calculates and stores a relay interval, from the relay start time t0 and the relay end time t1 stored in the steps S224 and S228, respectively (S230).

Wait time determining unit 302 determines whether the relay interval is valid or not in determining a prefetch access wait time (S232). The relay interval is valid if it is shorter than the minimum relay interval (for example, 1 minute) set in advance, as described above, for example. If the relay interval is determined to be invalid (NO in S232), the flow returns to S222. If it is determined that the relay interval is valid (YES is S232), wait time determining unit 302 increases the number of relaying user access requests by 1 (S234).

Wait time determining unit 302 determines whether the number of relaying user access requests reach a prescribed number (in the above described example, 100 times) (S236). If the number of relays has not yet reached the prescribed number (NO in S236), the flow returns to S222. If the number of relays has reached the prescribed number (YES in S236), wait time determining unit 302 determines the prefetch access wait time, and changes the corresponding portion of Proxy control structure 298 (S238). Thereafter, the flow returns to S220. As a method of determining the prefetch access wait time, an average relay interval among a prescribed number of relays may be found and multiplied by a prescribed number, as described above.

The user access request which is made with the interval shorter than the minimum relay interval set in advance is considered to be an access request the file object corresponding to which is not interesting to the user. As the user access wait time is determined based on the actual relay interval when the user was not interested, it is possible to prevent increase in network traffic caused by relaying file objects which may not be accessed by the user.

Ninth Embodiment

The distributed file system in accordance with the ninth embodiment has similar configuration as the distributed file system described with respect to the sixth embodiment. Therefore, its description will not be repeated here.

Referring to FIG. 16, operation of the gateway computer (mobile computer) 230/252 in accordance with the ninth embodiment will be described.

Generally, browser 224/244 of a client computer 222/242 often uses a local cache (hereinafter referred to as "client storing unit") provided inside client computer 222/242. When a replica of file object 216 of server computer 214 which corresponds to the user access request is stored in the client storing unit, browser 224/244 utilizes the replica. Therefore, the user access request is not transmitted to Proxy 232 of gateway computer 230/252.

If there is a possibility that file object 216 of server computer 214 has been updated, sometimes the user makes a user access request, instructing that the replica of file object 216 stored in the client storing unit should be used only when the replica is the latest (hereinafter referred to as that "conditional getting instruction"). This process corresponds to pushing of a reload button of the browser by the user in the WWW system.

When a user access request including the conditional getting instruction is transmitted through Proxy 232 of gateway of computer 230/252 to server computer 214 (arrow B, C), server computer 214 analyzes the conditional getting instruction contained in the user access request.

If the file object 216 has been updated, server computer 214 returns file object 216 through Proxy 232 of gateway computer 230/252 to browser 224/244 of client computer 222/242 (arrow D or F).

In this case, the object body of file object 216 passes through file object relay unit 282. Therefore, the object body is transmitted as object body 292 to prefetch control unit 238 (arrow K), and analysis for making a prefetch access request is performed in analyzing unit 294.

If the file object 216 has not been updated, server computer 214 returns only the object information (in the WWW system, response header of which response code value is "304") instructing use of the replica of file object 216 stored in the client storing unit through Proxy 232 of gateway computer 230/252 to browser 224/244 of client computer 222/242 (arrow D, F).

In this case, the object body of file object 216 is not passed through file object relay unit 282 of relay unit 234 in Proxy 232 of gateway computer 230/252. Therefore, object body 292 is not transmitted to prefetch control unit 238, and therefore analysis for making a prefetch access request is not performed in analyzing unit 294.

Therefore, in the distributed file system in accordance with the ninth embodiment, when only the object information instructing use of the replica of file object 216 stored in the client storing unit has passed through file object relay unit 282, gateway computer 230/252 transmits replica 284 of file object 216 which has been stored in storing unit 236 in response to a previous access to read-and-discard unit 296 through file object relay unit 282 (arrow E, T). Further, gateway computer 230/252 transmits the object body of replica 284 of the file object as object body 292 to prefetch control unit 238 (arrow K). Analyzing unit 294 performs analysis for making a prefetch access request.

Figure 24:
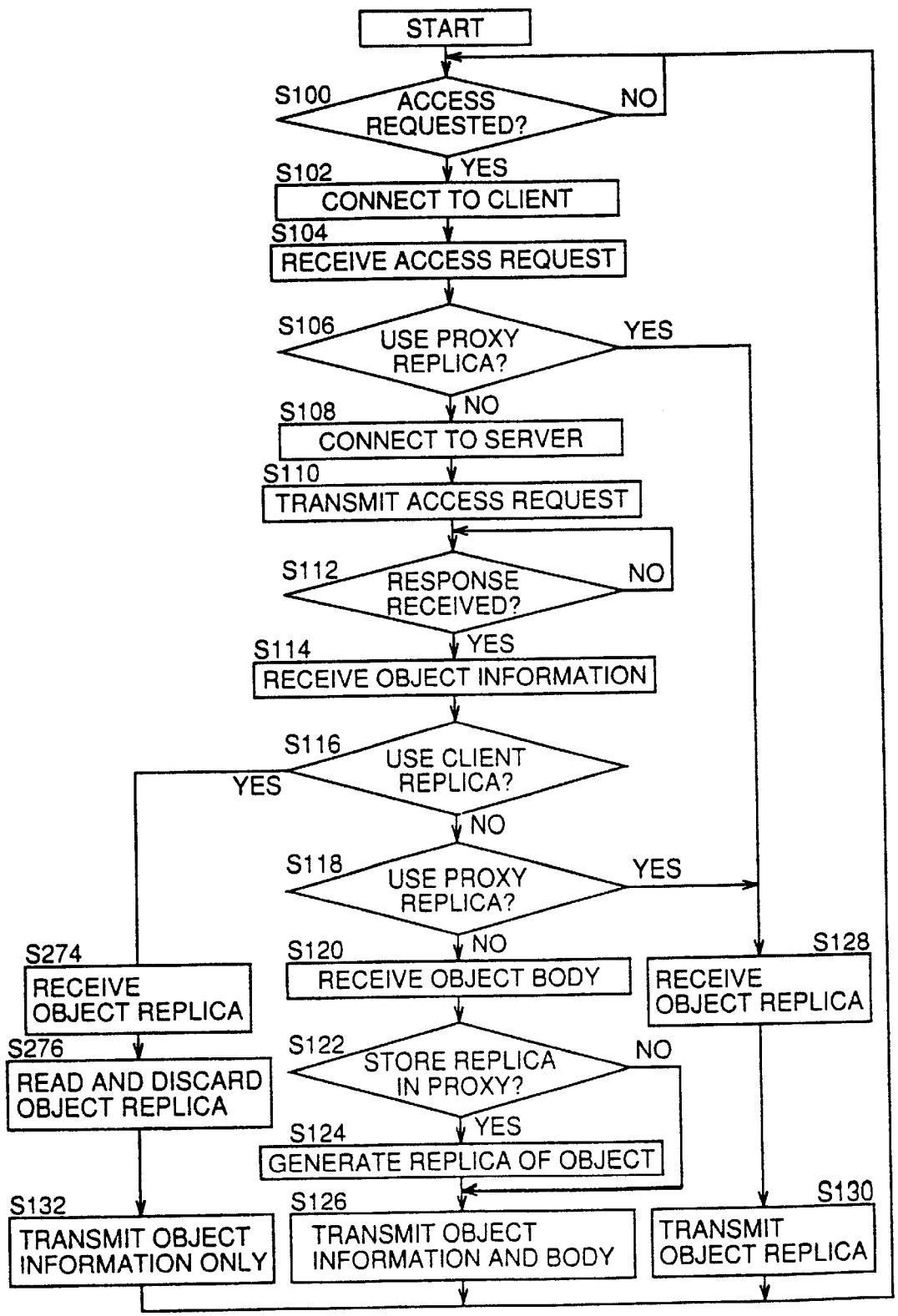
FIG. 24 is a flow chart showing a processing by the Proxy.

Referring to FIG. 24, the process procedure performed by Proxy 232 of gateway computer 230/252 will be described. The process steps S100 to S132 are similar to those performed by Proxy 232 of the sixth embodiment described with reference to FIG. 17. The process performed by Proxy 232 in accordance with the present embodiment differs from the flow of FIG. 17 in that steps S274 and S276 are added after it is required that a local replica of a file object of the client computer (client computer 222/242 or gateway computer 230/252) is to be utilized in S116 and before only the file object information is transmitted to the client computer (client computer 222/242 or gateway computer 230/252) in S132.

If it is required in S116 that a local replica of a file object in the client computer (client computer 222/242 or gateway computer 230/252) is to be used, first, relay unit 234 determines whether or not a replica of a file object corresponding to the file object information obtained from server computer 214/218 is stored in the storing unit 236, and gets the replica (arrow E, S274).

The replica of the file object obtained in the process of S274 is transmitted to read-and-discard unit 296 of prefetch control unit 238 no matter whether the client computer is a separate computer, that is, client computer 222/242 or the client computer is itself, that is, gateway computer 230/252 (arrow T, S76). Read-and-discard unit 296 does not perform any process on the transmitted replica of the file object. Here, relay unit 234 transmits the access request relayed through arrow B or Q and the replica of the file object (the file object information and the file object body contained therein) relayed through the arrow T to prefetch control unit 238 (arrows I, J, K). At analyzing unit 294, analysis is performed for making a new prefetch access request.

Tenth Embodiment

Figure 25:
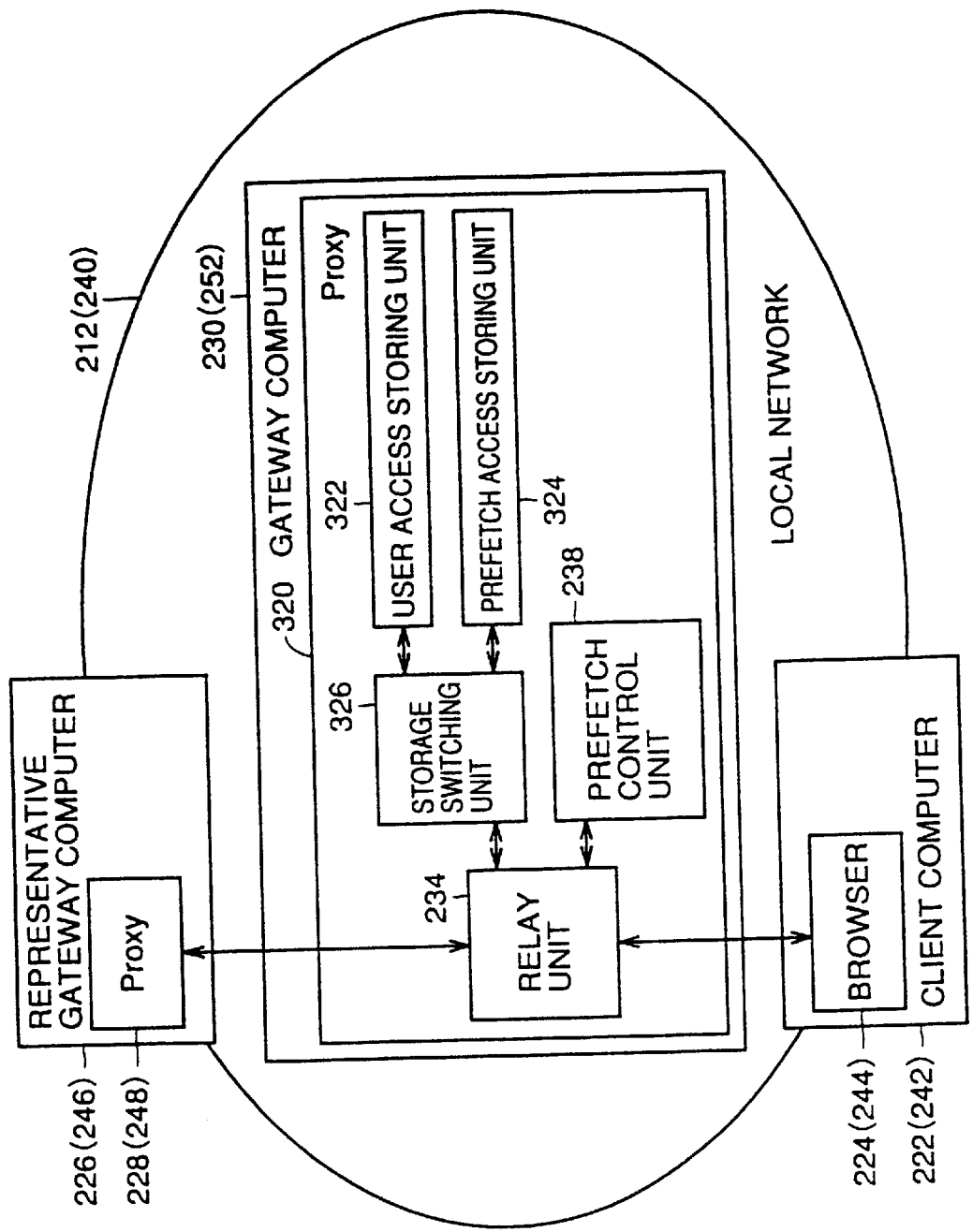
FIG. 25 shows configurations of a distributed file system and a gateway computer in accordance with a tenth embodiment.

Referring to FIG. 25, in the distributed file system in accordance with the tenth embodiment, a Proxy 320 is used in place of Proxy 232 of gateway computer 230/252 in the distributed file system in accordance with the sixth embodiment described with reference to FIGS. 13 and 14.

Proxy 320 of gateway computer 230/252 includes a relay unit 234, a storage switching unit 326 and a prefetch control unit 238 which are connected to the relay unit 234, and a user access storing unit 322 and a prefetch access storing unit 324 connected to storage switching unit 326.

User access storing unit 322 stores a replica of a file object of the server computer relayed in response to a user access request. Prefetch access storing unit 324 stores a replica of a file object of the server computer relayed in response to a prefetch access request in the storage. Storage switching unit 326 switches between user access storing unit 322 and prefetch access storing unit 324.

When relay unit 234 relays a user access request, storage switching unit 326 determines whether there is a replica of the file object corresponding to the user access request stored in user access storing unit 322. If the replica of the file object has already been stored and is available, storage switching unit 326 relays the replica through relay unit 234 to browser 224/244 of client computer 222/242.

When the replica of the file object is not stored in the user access storing unit 322, storage switching unit 326 determines whether the replica is in prefetch access storing unit 324. If the replica has already been stored and is available, storage switching unit 326 relays the replica through relay unit 234 to browser 224/244 of client computer 222/242. Storage switching unit 326 stores the replica in user access storing unit 322 and deletes the replica stored in the prefetch access storing unit 324.

When the replica of the file object is also not stored in prefetch access storing unit 324, relay unit 234 transmits the user access request to server computer 214/218 through Proxy 228/248 of the representative gateway computer 226/246. Relay unit 234 relays the file object 216/220 returned from server computer 214/218 through to browser 224/244 of client computer 222/242. If the replica is re-usable, relay unit 234 stores the replica to user access storing unit 322 through storage switching unit 326.

When relay unit 234 relays the prefetch access request, relay unit 234 transmits the prefetch access request to the server computer through proxy 228/248 of gateway computer 226/246. Relay unit 234 relays the file object return from the server computer to (the read-and-discard unit of) prefetch control unit 238. If the replica is reusable, relay unit 234 stores the replica in prefetch access storing unit 324 through storage switching unit 326.

Accordingly, it is the case that there is always a replica of the file object which is browsed in response to a user access request, in user access storing unit 322. Further, it is the case that the replica of a file object obtained in response to the prefetch access request only always exists in the prefetch access storing unit 324 only.

The process performed by Proxy 320 will be described with reference to FIGS. 26 to 31.

Figure 26:
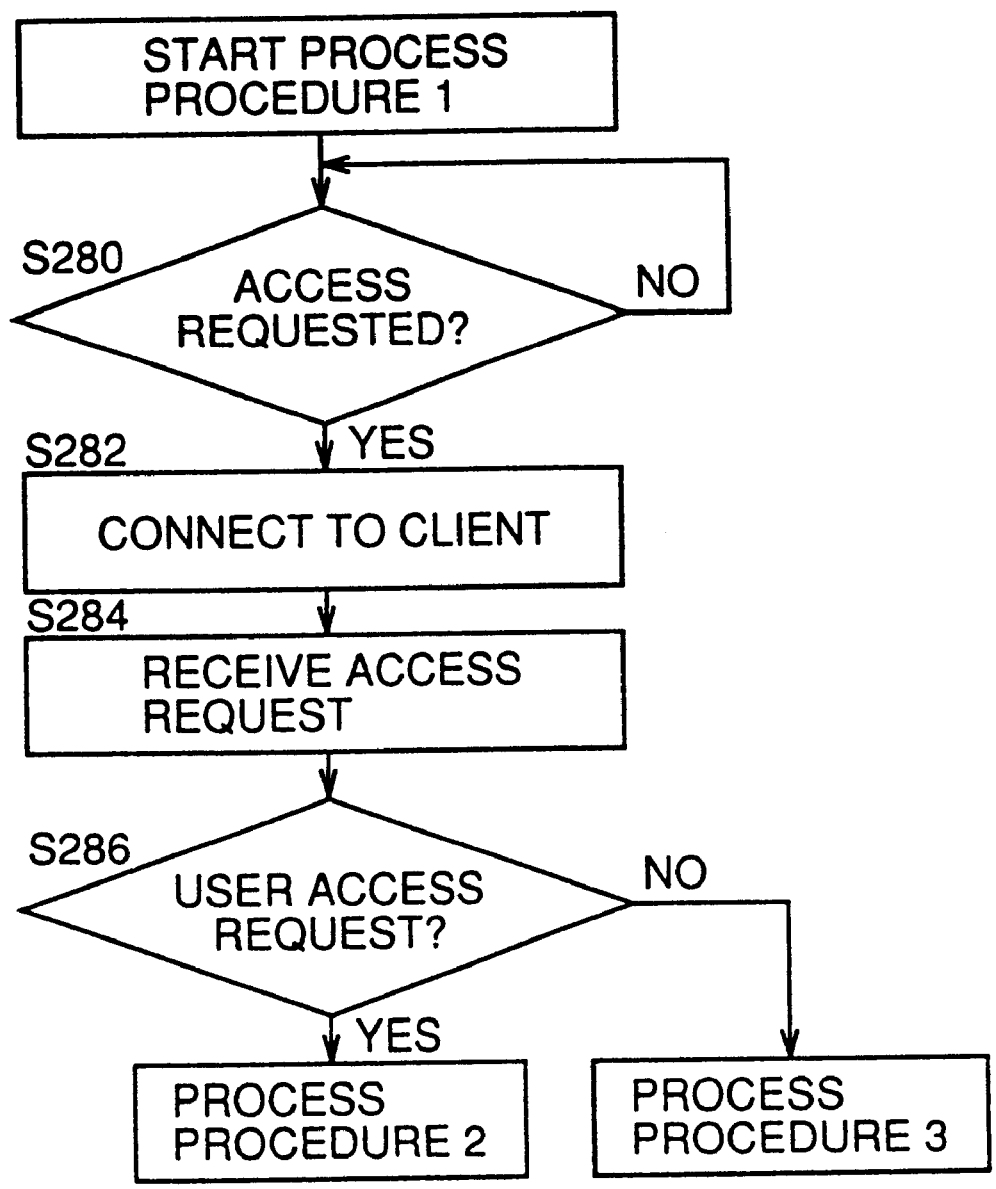
FIGS. 26 to 31 are flow charts showing the processing by the Proxy.
Figure 27:
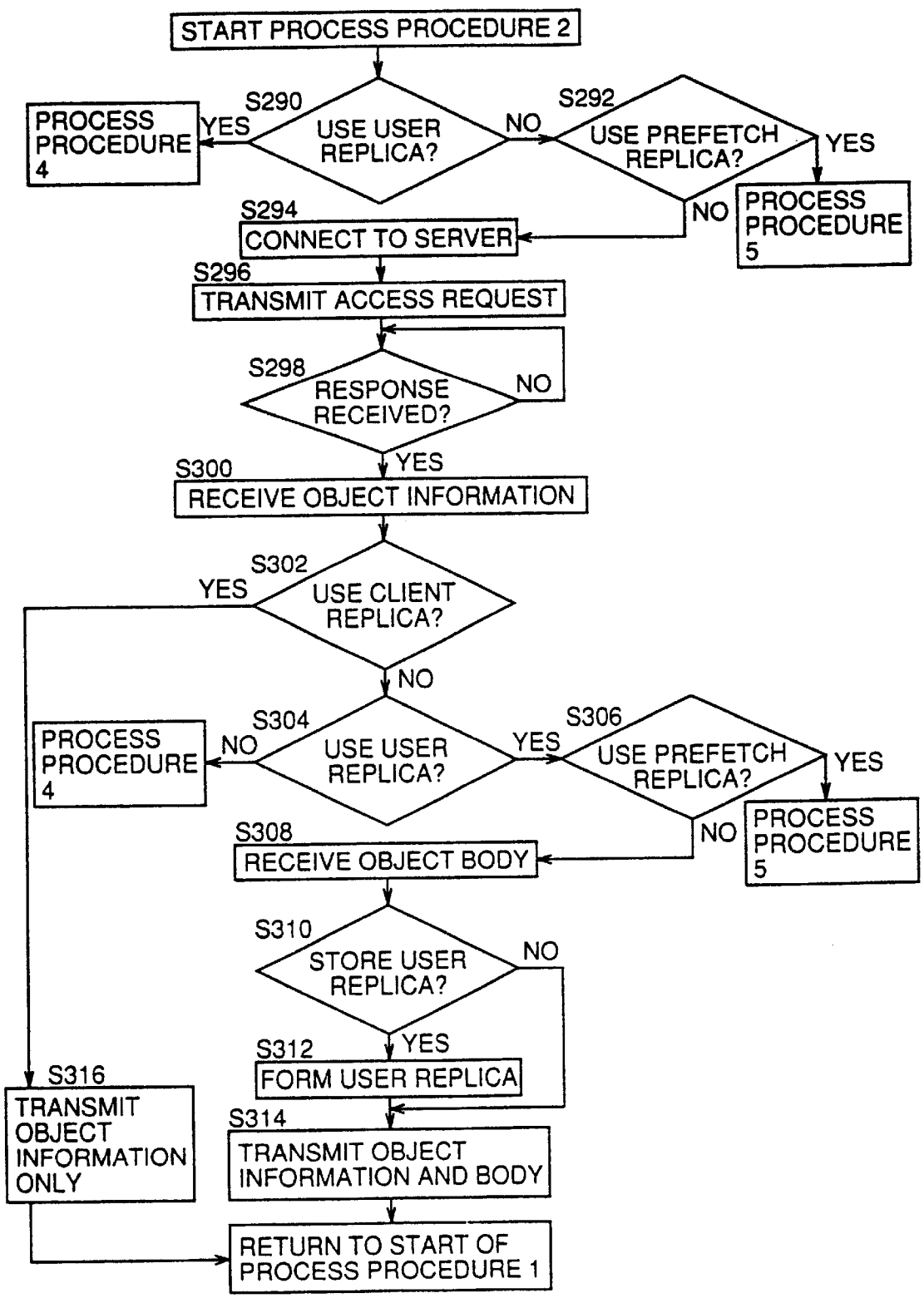
Figure 28:
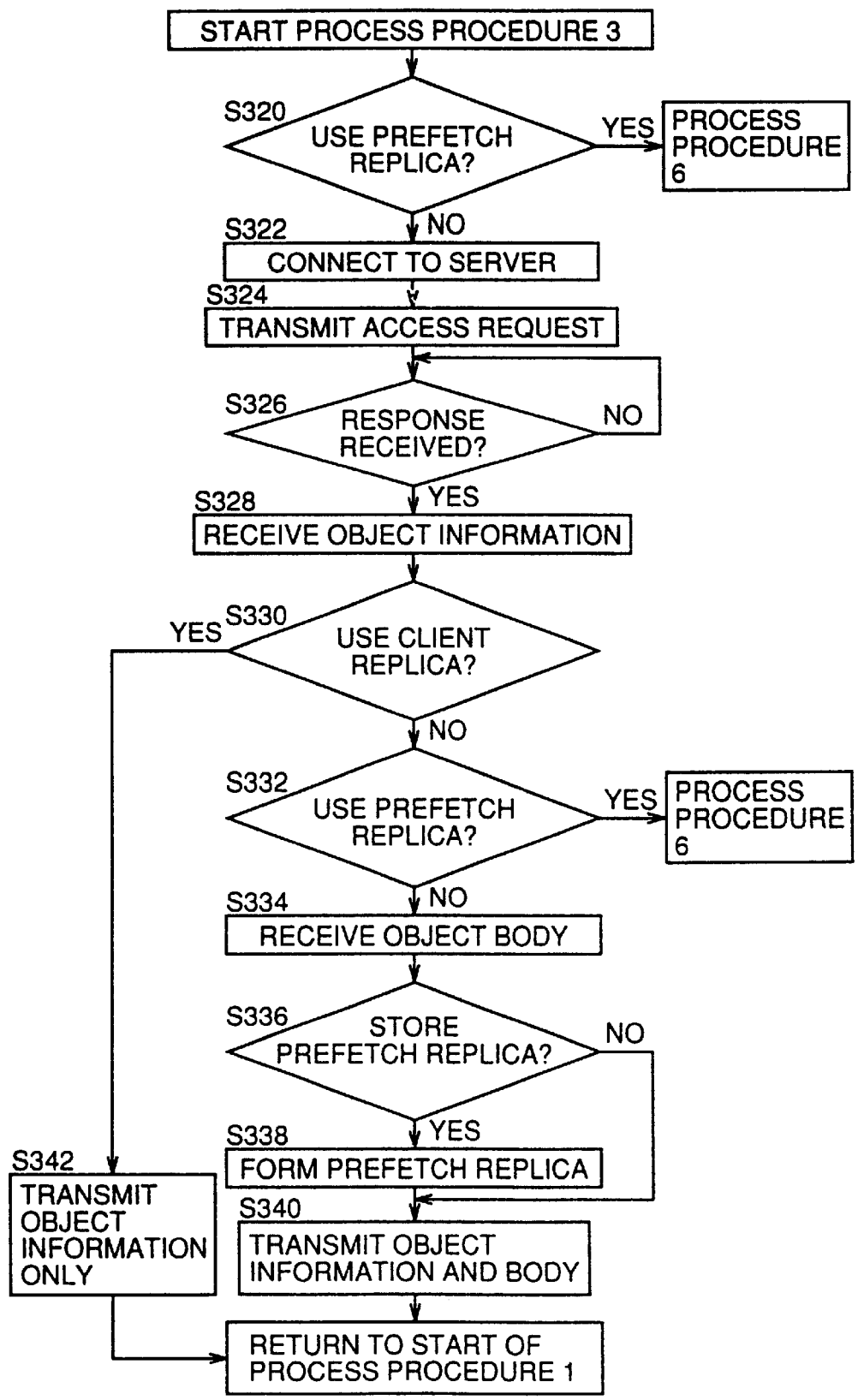

The process performed by Proxy 320 starts from the process procedure 1 shown in FIG. 26 and branches to process procedure 2 of FIG. 27 and process procedure 3 of FIG. 28. A part of the process procedure 2 shown in FIG. 27 branches to a process procedure 4 shown in FIG. 29 and a process procedure 5 shown in FIG. 30. Further, a part of process procedure 3 shown in FIG. 28 branches to a process procedure 6 of FIG. 31. The process procedures 2 to 6 all eventually return to the start of process procedure 1.

The series of processes shown in FIGS. 26 to 31 are an extension of the process procedure shown in FIG. 17. The contents of the processes will be described, focusing on differences over the process procedure shown in FIG. 17.

Process steps S280 to S284 of process procedure 1 shown in FIG. 26 correspond to steps S100 to S104 of the process procedure shown in FIG. 17. The difference is that following the step S284, there is a step S286 from which the process flow branches to process procedure 2 and process procedure 3. Therefore, the description of steps S280 to S284 will not be repeated here.

After an access request is received in S284, relay unit 234 determines whether the access request is a user access request coming from client computer 222/242 or the like or a prefetch access request coming from prefetch control unit 238 of gateway computer 230/252 (S286). If the access request is a user access request (YES in S286), the flow proceeds to the process procedure 2 of FIG. 27, and if the access request is a prefetch access request (NO in S286), the process proceeds to the process procedure 3 of FIG. 28.

Referring to FIG. 27, process procedure 2 is performed when the access request is determined to be a user access request, which procedure corresponds to the steps following S106 of the process procedure shown in FIG. 17. The contents will be described, focusing on the difference.

Proxy 320 performs the process steps S290 and S292 in place of the step S106. In S290, relay unit 234 determines whether a replica of the file object of the server computer which is requested by the access request is stored in the user access storing unit 322 and use of the replica is permitted by the access request and user access storing unit 322 or not. If it is possible to use the replica of the file object in user access storing unit 322 (YES in S290), the process branches to the process procedure 4 of FIG. 29.

If it is not possible to use the replica of the file object in user access storing unit 322 (NO in S290), relay unit 234 determines whether the replica of the file object of the server computer requested by the access request is stored in the prefetch access storing unit 324 and use of the replica is permitted by the access request and the prefetch access storing unit 324 or not (S292). If it is possible to use the replica of the file object stored in the prefetch access storing unit 324 (YES in S292), the process branches to the process procedure 5 of FIG. 30.

Proxy 320 performs the process of steps S304 and S306 in place of the step S118. In S304, relay unit 234 determines whether the file object information requests use of the replica of the file object and whether the replica of the file object is stored in the user access storing unit 322 or not. If it is possible to use the replica of the file object in user access storing unit 322 (NO in S304), the process branches to the process procedure 4 of FIG. 29.

If it is impossible to use the replica of the file object in user access storing unit 322 (YES in S304), relay unit 234 determines whether the file object information requests use of the replica of the file object and whether the replica of the file object is stored in the prefetch access storing unit 324 (S306). If it is possible to use the replica of the file object in prefetch access storing unit 324 (YES in S306), the process branches to the process procedure 5 of FIG. 30.

Further, Proxy 320 performs the process of steps S310 and S312 in place of steps S122 and S124. In S310, relay unit 234 determines whether the file object information and the file object body obtained through representative gateway computer 226/246 may be stored as a replica of the file object in user access storing unit 322.

If it is determined that these may be stored as the replica of the file object (YES in S310), relay unit 234 stores the file object information and the file object body in user access storing unit 322 (S312).

Referring to FIG. 28, process procedure 3 is performed when it is determined that the access request is a prefetch access request in S286, which procedure corresponds to steps following S106 of the process procedure shown in FIG. 17. The contents will be described, focusing on the difference.

Proxy 320 performs the process of step S320 instead of S106. In S320, relay unit 234 determines whether a replica of the file object of the server computer which is requested by the access request is stored in the prefetch access storing unit 324 and whether the access request and the prefetch access storing unit permit use of the replica. If it is possible to use the replica of the file object in prefetch access storing unit 324 (YES in S320), the process branches to the process procedure 6 of FIG. 31.

Proxy 320 performs the process of step S332 in place of S118. In S332, relay unit 234 determines whether the file object information requests use of the replica of the file object and whether the replica of the file object is stored in prefetch access storing unit 324 or not. If it is possible to use the replica of the file object in prefetch access storing unit 324, the process branches to the process procedure 6 of FIG. 31.

Further, Proxy 320 performs the process of steps S336 and S338 in place of steps S122 and S124. In S336, relay unit 320 determines whether the file object information and the file object body obtained through representative gateway computer 226/246 may be stored as a replica of the file object in prefetch access storing unit 324.

If it is determined in step S336 that the file object information and the file object body may be stored as the replica of the file object (YES in S336), relay unit 234 stores the file object information and the file object body in prefetch access storing unit 324 (S338).

Figure 29:
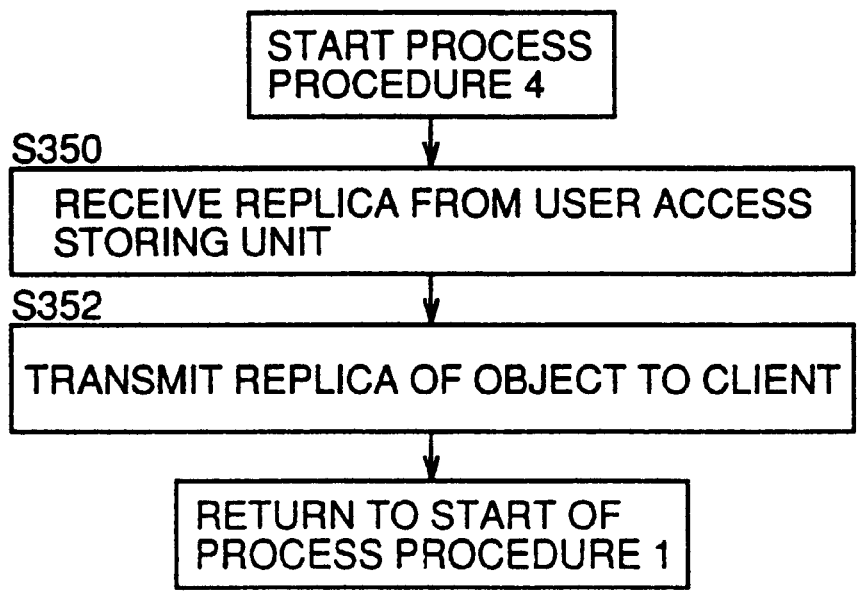

Referring to FIG. 29, the process procedure 4 is performed when it is determined that use of the replica of the file object in user access storing unit 322 is possible, in the process steps S290 and S304. The process procedure 4 corresponds to steps S128 and S130 of FIG. 17.

Relay unit 234 obtains the replica of the file object stored in user access storing unit 322 (S350).

The replica of the file object obtained in the process of step S350 is transmitted to the client computer (client computer 222/242 or gateway computer 230/252) (S352). If the client computer is the gateway computer 230/252, the replica of the file object is transmitted to the read-and-discard unit of prefetch control unit 238, and it is not subjected to any processing. Relay unit 234 further transmits the relayed access request and the replica of the file object (file object information and file object body contained therein) to prefetch control unit 238. Based on these, analyzing unit 294 performs analysis for making a new prefetch access request.

Figure 30:
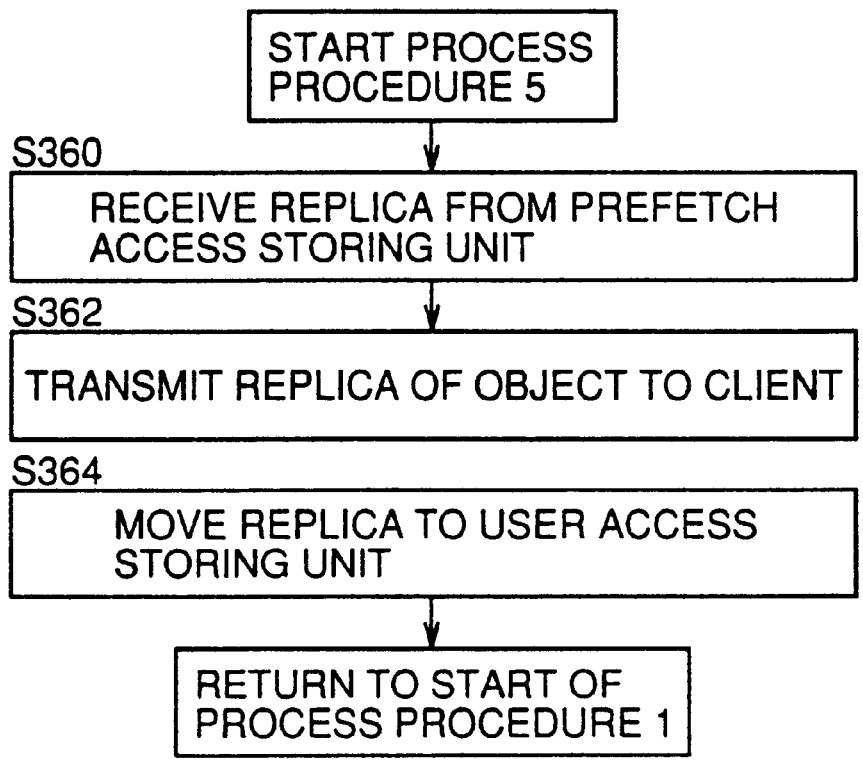

Referring to FIG. 30, process procedure 5 is performed when it is determined in the process of step S292 or S306 that use of the replica of the file object in prefetch access storing unit 324 is possible. The process procedure 5 corresponds to steps S128 and S130 of FIG. 17.

Relay unit 234 obtains the replica of the file object stored in prefetch access storing unit 324 (S360).

The replica of the file object obtained in the process of step S360 is transmitted to the client computer (client computer 222/242 or gateway computer 230/252) (S362). If the client computer is the gateway computer 230/252, the replica of the file object is transmitted to the read-and-discard unit of prefetch control unit 238, and it is not subjected to any processing. Relay unit 234 transmits the relayed access request and the replica of the file object (file object information and file object body contained therein) to prefetch control unit 238. Based on these, analyzing unit 294 performs an analysis for making a new prefetch access request.

Figure 31:
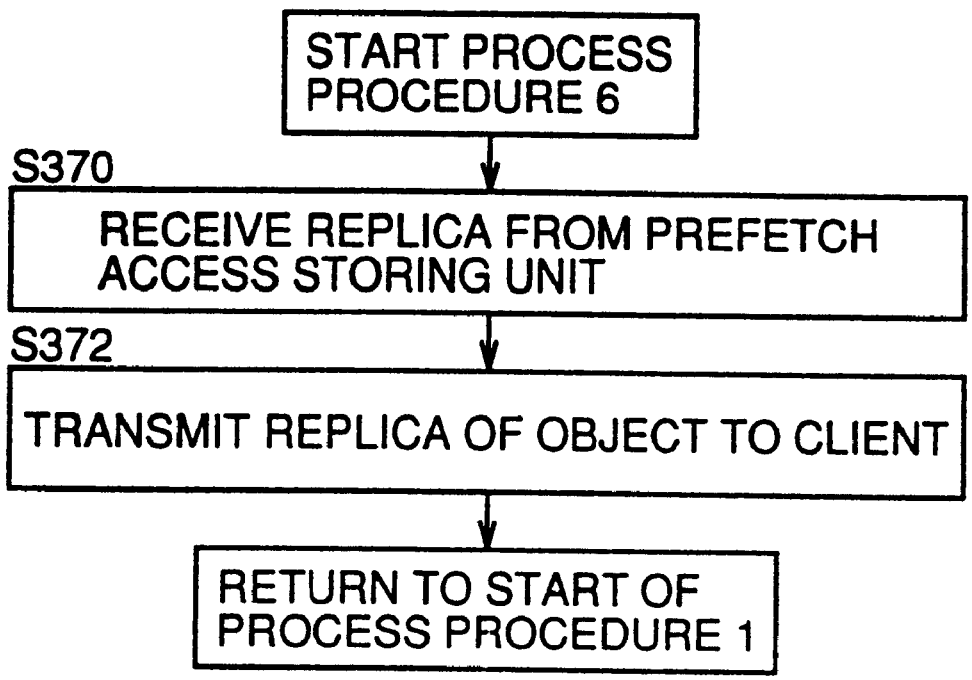

Finally, the replica of the file object stored in prefetch access storing unit 324 is moved to the user access storing unit 322 (S364). Referring to FIG. 31, the process procedure 6 is performed when it is determined in the step S320 or S332 that use of the replica of the file object in prefetch access storing unit 324 is possible. The process procedure 6 corresponds to steps S360 and S362 of the process procedure 5 of FIG. 30. The process procedure 6 does not include the process corresponding to the step S364 of process procedure 5.

According to the tenth embodiment, it becomes possible to effectively use the [storage having] limited storage capacity of gateway computer 230/252 by appropriately changing settings of valid date and the like such that the valid date for the replica of the file object stored in the user access storing unit 322 is set long and the valid date of the replica of the file object stored in the prefetch access storing unit 234 short.

Eleventh Embodiment

Figure 32:
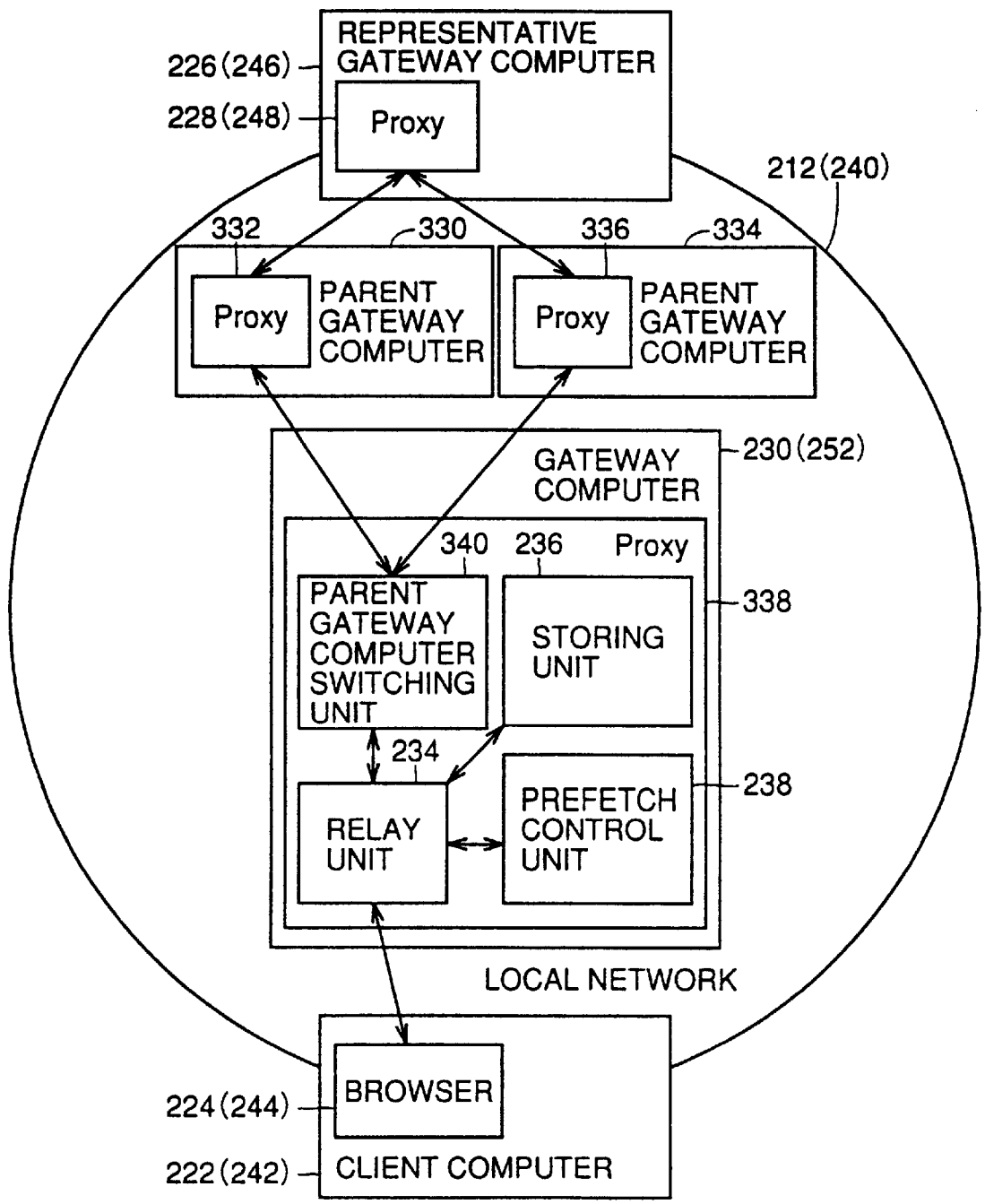
FIG. 32 shows configurations of a distributed file system and a gateway computer in accordance with an eleventh embodiment.

Referring to FIG. 32, the distributed file system in accordance with the eleventh embodiment includes parent gateway computers 330 and 334 additionally connected to the local network 212/240 in the distributed file system in accordance with the sixth embodiment described with reference to FIGS. 13 and 14. Each of the parent gateway computers 330 and 334 is connected to representative gateway computer 226/246 and gateway computer 230/252. On gateway computer 230/252, Proxy 338 is being executed in place of Proxy 232. Proxy 338 includes a parent gateway computer switching unit 340 for switching between parent gateway computers 330 and 334.

Proxy 332 of parent gateway computer 330 relays only the user access request from Proxy 338 of gateway computer 230/252 to Proxy 228/248 of representative gateway computer 226/246.

Proxy 336 of parent gateway computer 334 relays only the prefetch access request from Proxy 338 of gateway computer 230/252 to Proxy 228/248 of representative gateway computer 226/246.

When a user access request is received from relay unit 234, parent gateway computer switching unit 340 of Proxy 338 relays the user access request to Proxy 332 of parent gateway computer 330. The parent gateway computer switching unit 340 receives the file object corresponding to the user access request, and returns the received file object to relay unit 234. When a prefetch access request is received from relay unit 234, parent gateway computer switching unit 340 relays the prefetch access request to Proxy 336 of parent gateway computer 334. Parent gateway computer switching unit 340 receives the file object corresponding to the prefetch access request and returns the received file object to relay unit 234.

Figure 33:
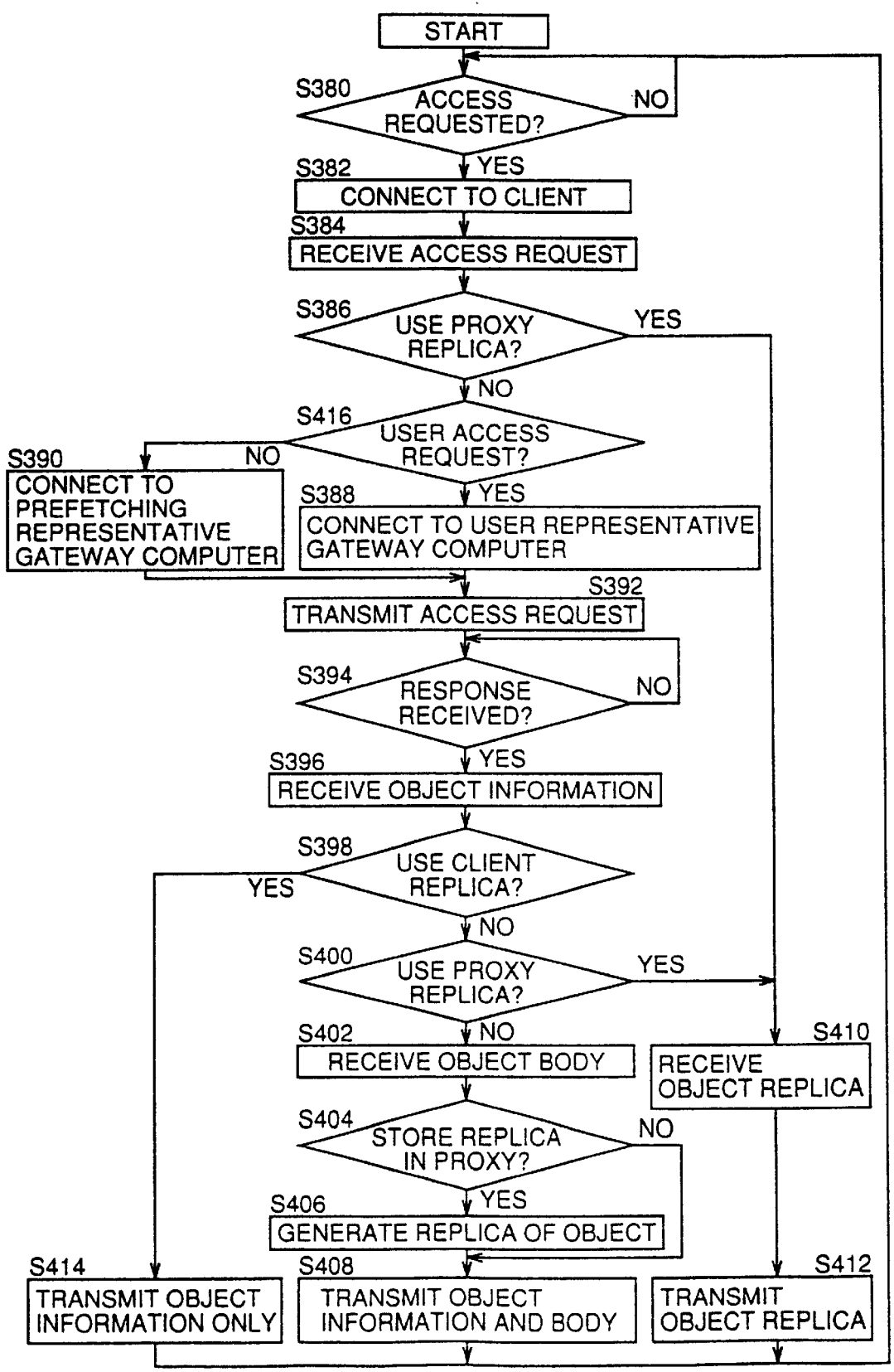
FIG. 33 shows a processing by the Proxy.

Referring to FIG. 33, the process performed by Proxy 338 will be described. The process of Proxy 338 is an extension of the process performed by Proxy 232 described with reference to FIG. 17. Step S108 corresponds to steps S416, S388 and S390.

If it is determined in the process of S386 that the replica of the file object in the storage should not be used, relay unit 234 determines whether the access request is a user access request coming from client computer 222/242 or a prefetch access request coming from itself, that is, prefetch control unit 238 of gateway computer 230/252 (S416).

If it is determined that the access request is a user access request (YES in S416), gateway computer 230/252 is network-connected to parent gateway computer 330 for user access, by parent gateway computer switching unit 340 (S388).

If the access request is determined to be a prefetch access request (NO in S416), gateway computer 230/252 is network-connected to parent gateway computer 334 for prefetch access, by parent gateway computer switching unit 340 (S390).

The processes after network-connection to respective parent gateway computer in the process step of S388 or S390 is the same. Therefore, its description will not be repeated here.

Accordingly, when a computer having high processing capability is used as parent gateway computer 330 which relays the user access request, response to the user access can be improved even when a computer having poor processing capability is used as parent gateway computer 334 which relays the prefetch access request. As histories of user access requests and prefetch access requests are separately kept by parent gateway computers 330 and 334, respectively, the state of use of the network can easily be monitored.

Twelfth Embodiment

Figure 34:
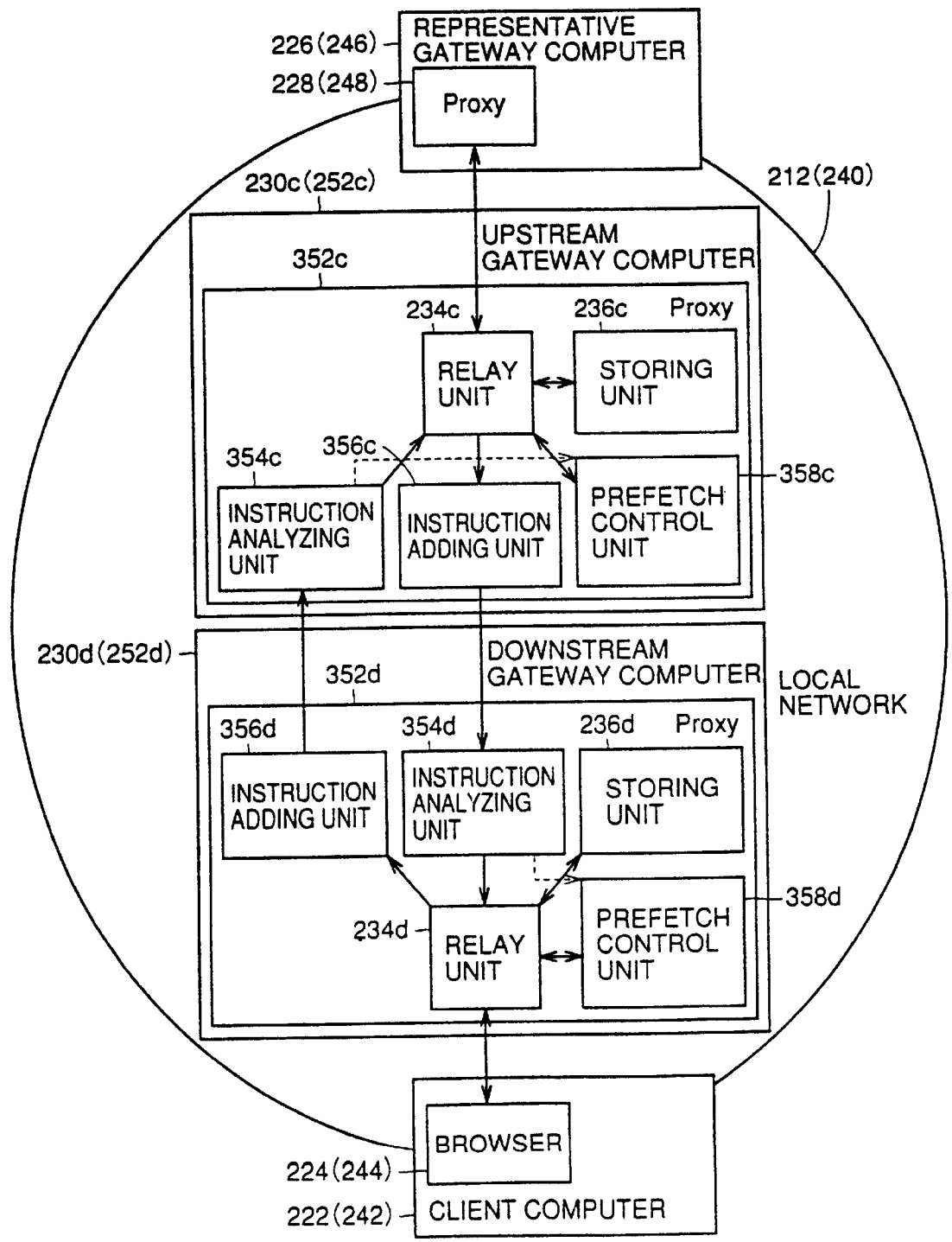
FIG. 34 shows configurations of a distributed file system and a gateway computer in accordance with a twelfth embodiment.

Referring to FIG. 34, the distributed file system in accordance with the twelfth embodiment includes two gateway computers 230/252 (upstream gateway computer 230c/252c) connected to the local network 212/240 in the distributed file system in accordance with the sixth embodiment described with reference to FIGS. 13 and 14. In each of the two gateway computers 230/252, Proxy 352 is being executed in place of Proxy 232. Proxy 352 includes relay unit 234, storing unit 236, prefetch control unit 358, and instruction adding unit 356 and an instruction analyzing unit 354.

Instruction adding unit 356d of Proxy 352d of downstream gateway computer 230d/252d transmits a user access request received from relay unit 234d to instruction analyzing unit 354c of Proxy 352c of upstream gateway computer 230c/252c. At this time, instruction adding unit 356d is capable of relaying additionally a prefetch access instruction for prefetch control unit 358c of Proxy 352c of upstream gateway computer 230c/252c.

Table 30 shows (only a part of) an exemplary request header to which an instruction is added, in the WWW system. The line starting from X-Prefetch-Request is the added instruction. The lines represent that the prefetch access is permitted, the prefetch access wait time is 10 seconds, the maximum number of prefetch access layers is 3, the number of simultaneous prefetch access requests is 2 and the total number of prefetch accesses is 100, respectively, in this order from the above. The line starting from X-Prefetch-Request is an extension unique to the present invention not defined in the WWW system. The lines starting with X-Prefetch Request are deleted after instruction analyzing unit 354c analyzes the instruction.

TABLE 30

GET http://www.foobar.co.jp/HTTP/1.0\r\n
Pragma: no-cache\r\n
If-Modified-Since: Wed, 01 Oct 1997 07:15:40 GMT\r\n
X-Prefetch-Request: true\r\n
X-Prefetch-Request-Delay: 10\r\n
X-Prefetch-Request-Level: 3\r\n
X-Prefetch-Request-Connection: 2\r\n
X-Prefetch-Request-Max: 100\r\n
:

(\r\n represents carriage return and line feed code)

Instruction analyzing unit 354c of Proxy 352c of upstream gateway computer 230c/252c transmits a user access request received from instruction adding unit 356d of Proxy 352d of downstream gateway computer 230d/252d to relay unit 234c. At this time, instruction analyzing unit 354c analyzes the prefetch access instruction contained in the user access request and transmits it to prefetch control unit 358c (represented by the dotted arrow in the figure), and deletes the prefetch access instruction. Prefetch control unit 358c gives higher priority to the transmitted prefetch access instruction than various parameters of prefetch access set in the Proxy control structure.

Instruction adding unit 356c of Proxy 352c of upstream gateway computer 230c/252c transmits the file object received from relay unit 234c to instruction analyzing unit 354d of Proxy 352d of downstream gateway computer 230d/252d. At this time, instruction adding unit 356c is capable of relaying additionally a prefetch access instruction for prefetch control unit 358d of Proxy 352d of downstream gateway computer 230d/252d, to the object information of the file object.

Table 31 shows (only a part of) an exemplary response header with an instruction added, in the WWW system. Lines starting with X-Prefetch-Response represent the added instruction. These lines represent that prefetch accessing is permitted, the prefetch access wait time is 10 seconds, the maximum number of prefetch access layers is 3, the number of simultaneous prefetch access requests is 2 and the total number of prefetch accesses is 100, respectively, from above. The line starting with X-Prefetch-Response is a unique extension particular to the present invention, not defined by the WWW system. The lines starting with X-Prefetch-Response are deleted after instruction analyzing unit analyzes the instruction.

TABLE 31

HTTP/1.0 200 Document OK\r\n
Last-Modified: Wed, 01 Oct 1997 07:15:40 GMT\r\n
Content-type: Text/html\r\n
Content-Length: 8096
X-Prefetch-Response: true\r\n
X-Prefetch-Response-Delay: 10\r\n
X-Prefetch-Response-Level: 3\r\n
X-Prefetch-Response-Connectipn: 2\r\n
X-Prefetch-Response-Max: 100\r\n
:

(\r\n represents carriage return and line feed code)

Instruction analyzing unit 354d of Proxy 352d of downstream gateway computer 230d/252d transmits the file object received from instruction adding unit 356c of Proxy 352c of upstream gateway computer 230c/252c to relay unit 234d. At this time, instruction analyzing unit 354d analyzes the prefetch access instruction included in the object information of the file object and transmits the instruction to prefetch control unit 358d (represented by the dotted arrow of the figure), and deletes the prefetch access instruction. Prefetch control unit 358d gives higher priority to the transmitted prefetch access instruction than various parameters of the prefetch access set in the Proxy control structure.

Thirteenth Embodiment

Figure 35:
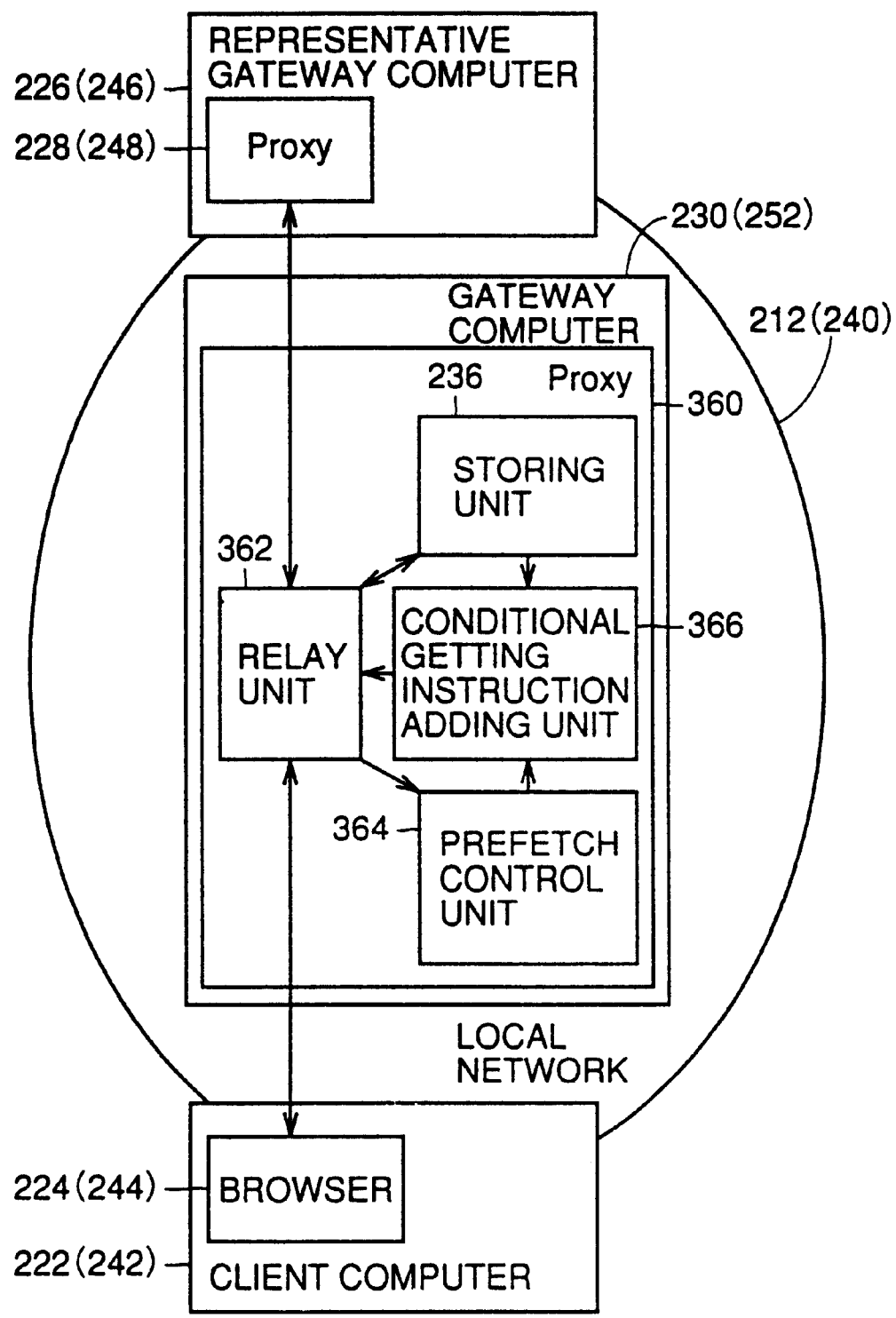
FIG. 35 shows configurations of a distributed file system and a gateway computer in accordance with a thirteenth embodiment.
Figure 36:
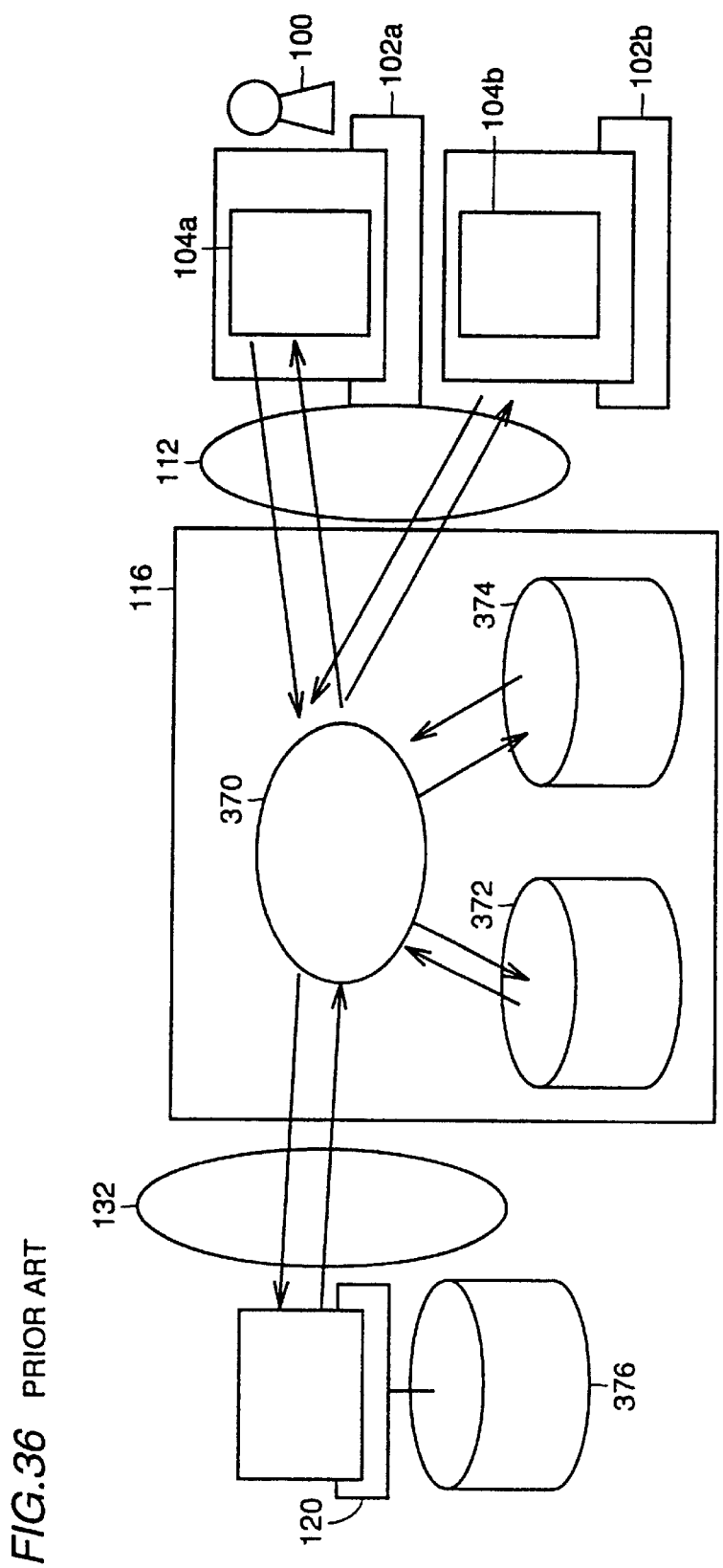
FIG. 36 shows a configuration of a conventional distributed file system.
Figure 37:
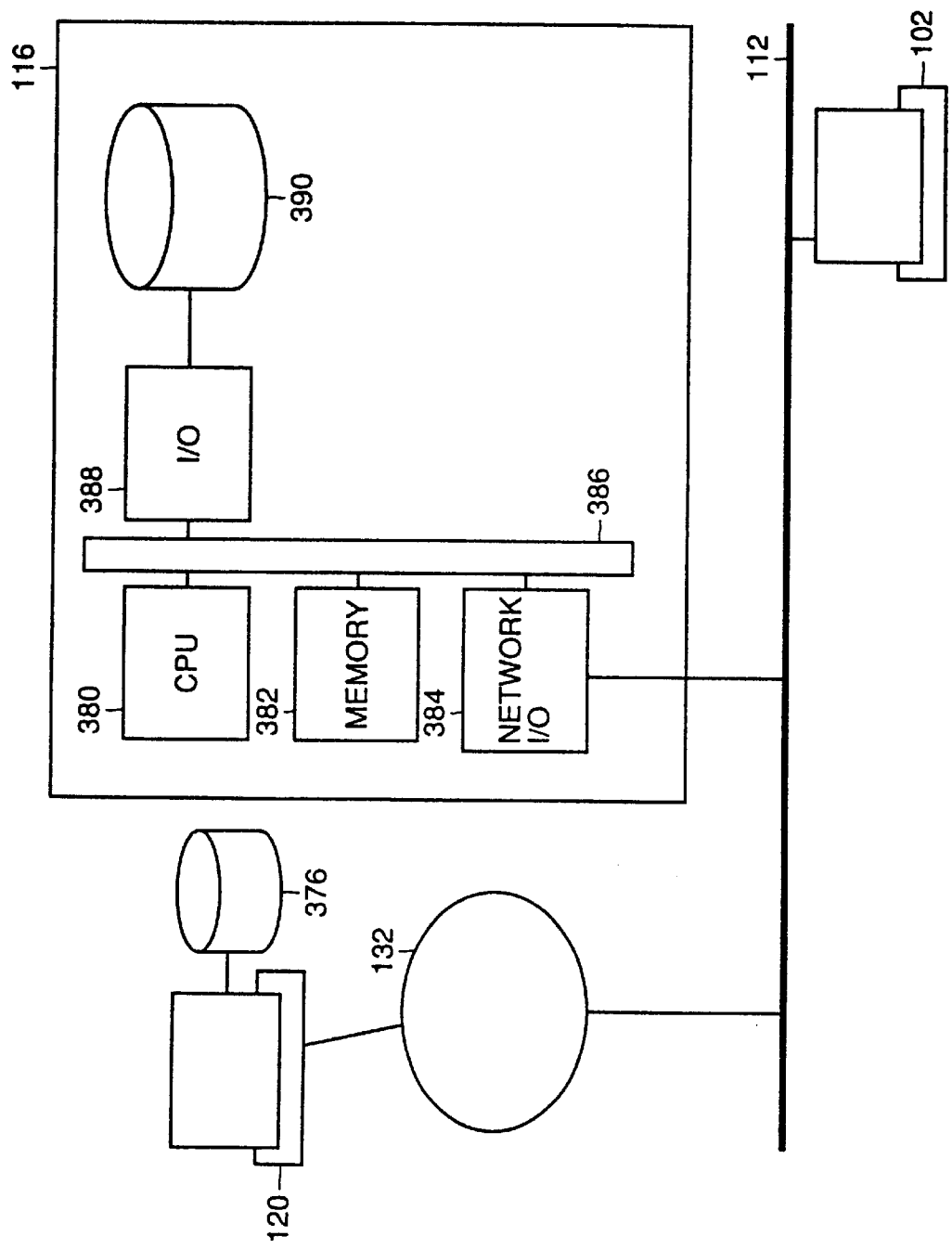
FIG. 37 shows a configuration of a conventional gateway computer.

Referring to FIG. 35, in the distributed file system in accordance with the thirteenth embodiment, a Proxy 360 is used in place of Proxy 232 which operates on gateway computer 230/252 of the distributed file system in accordance with the sixth embodiment. Therefore, the description of the other common components will not be repeated here. Proxy 360 includes a relay unit 362, storing unit 236, a conditional getting instruction adding unit 366 and prefetch control unit 364.

The operation of the distributed file system in accordance with the present embodiment is similar to the operation of the distributed file system in accordance with the sixth embodiment described with reference to FIGS. 17 to 19, except that the content of processing in step S184 shown in FIG. 19 differs from the operation of the distributed file system in accordance with the sixth embodiment.

In the process step S184 of the distributed file system in accordance with the sixth embodiment, an access request including the address information of the separate file object obtained in step S172, the source address information of the prefetch access request and the layer of the prefetch access request set in steps S148 and S150 of FIG. 18 is generated, and a new prefetch access request is made for access request relay unit 280 (arrow Q of FIG. 16).

By contrast, in the process of step S184 of Proxy 360, when the access request includes an instruction requiring use of the replica of the file object stored in the storage only when the replica is the latest (hereinafter referred to as "conditional getting instruction"), a "conditional getting instruction" adding instruction is added when the prefetch access request is generated, and transmitted to conditional getting instruction adding unit 366.

Table 32 shows (only a part of) an example of the request header of the prefetch access request in the WWW system. The X-Prefetch-If-Modified-Since: through field described in the second line is the "conditional getting instruction" adding instruction. The "conditional getting instruction" adding instruction is a unique extension of the present invention not defined in the WWW system. The "conditional getting instruction" adding instruction is deleted after the conditional getting instruction adding unit 366 analyzed the instruction.

TABLE 32

GET http://www.foobar.co.jp/menu.html HTTP/1.0\r\n
X-Prefetch-If-Modified-Since: true\r\n
X-Prefetch-URL: http://www.foobar.co.jp/\r\n
X-Prefetch-Level: 1\r\n
：
(\r\n represents carriage return and line feed code)

When the prefetch access request transmitted from prefetch control unit 364 includes "conditional getting instruction" adding instruction, conditional getting instruction adding unit 366 gets the latest date and time of updating of the file object (in the WWW system, Last-Modified field) from the object information of the replica of the file object corresponding to the prefetch access request stored in the storing unit 236 in previous access, and adds the conditional getting instruction to the prefetch access request, utilizing the latest date and time of updating. Conditional getting instruction adding unit 366 deletes the "conditional getting instruction" adding instruction, and transmits the result to relay unit 362.

Table 33 shows (only a part of) an exemplary request header of a prefetch access request in the WWW system. The If-Modified-Since field described in the second line is the conditional getting instruction added utilizing the latest date and time of updating described in the Last-Modified field in the response header of the replica of the file object.

TABLE 33

GET http://www.foobar.co.jp/HTTP/1.0\r\n
If-Modified-Since: Wed, 01 Oct 1997 07:15:40 GMT\r\n
X-Prefetch-URL: http://www.foobarp.co.jp/\r\n
X-Prefetch-Level: 1\r\n
：
(\r\n represents carriage return and line feed code)

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of relaying a file object used in a gateway computer for relaying a file object in accordance with any of a plurality of control structures corresponding to a plurality of networks, respectively, wherein said gateway computer includes a storage for storing said file object, and each of said plurality of control structures has an address of a representative gateway computer to which a client computer is connected;

said method comprising the steps of:

receiving an event;

when said event is a request for switching between said control structures, switching various parameters in accordance with that one of said control structures to which switching is requested;

when said event is a request for getting said file object transmitted from said client computer, reading said file object from either one of an upstream computer and said storage and relaying the read file object to said client computer; and storing said relayed filed object in the storage.

2. The method of relaying a file object according to claim 1, further comprising the step of displaying a network address information of said gateway computer.

3. The method of relaying a file object according to claim 1, wherein each of said plurality of control structures further has a permission address pattern; and said step of relaying includes the steps of when said event is a request for getting said file object, determining whether an address of said client computer which transmitted said getting request matches said permission address pattern, and when the address matches said permission address pattern, reading said file object from either one of said upstream computer and said storage and relaying the read file object to said client computer.

4. The method of relaying a file object according to claim 1, wherein each of said plurality of control structures further has a permission user name and a password; and said step of relaying includes the steps of asking a user using said client computer which transmitted said file object getting request to input a user name and a password, receiving said user name and said password transmitted from said client computer, comparing said user name and said password received from said client computer with said user name and said password stored in said control structure and when these match, reading said file object from either one of said upstream computer and said storage and relaying the read file object to said client computer.

5. The method of relaying a file object according to claim 1, further comprising the step of displaying, when said event is a request for display of history, an address of said file object relayed in said step of relaying.

6. The method of relaying a file object according to claim 5, wherein said step of display includes the step of displaying, when said event is a request for history display, the address of said file object relayed in said step of relaying, and information specifying said network to which said gateway computer was connected at the time of relaying.

7. The method of relaying a file object according to claim 5, wherein each of said plurality of control structures further has a permission user name and a password; and said step of display includes the steps of asking a user using said client computer which transmitted said request for history display to input a user name and a password, receiving said user name and said password transmitted from said client computer, and comparing said user name and said password received from said client computer with said user name and said password stored in said control structure and, when these match, displaying the address of said file object relayed in said step of relaying.

8. The method of relaying a file object according to claim 1, wherein said file object includes a plurality of file objects; and said step of relaying includes a step of relaying a user access request for reading, when said event is a request for getting said file object, said file object from either one of said upstream computer and said storage and relaying the read file object to said client computer, and a prefetch step for further reading, based on a hyperlink included in said relayed file object, said file object from either one of said upstream computer and said storage and storing the further read file object in said storage.

9. The method of relaying a file object according to claim 8, wherein each of said plurality of control structures further has a prefetch access wait time; and said prefetch step includes the steps of determining said prefetch access wait time based on time interval of said request for getting a file object received from said client computer, and based on a hyperlink contained in said file object read from either one of said upstream computer and said storage and relayed to said client computer, reading said file object from either one of said upstream computer and said storage after said prefetch access wait time lapses, and storing the read file object in said storage.

10. The method of relaying a file object according to claim 8, wherein each of said plurality of control structures further has a prefetch access permission flag; and said prefetch step includes the step of reading, only when said prefetch access permission flag is true, said file object from either one of said upstream computer and said storage, based on said hyperlink contained in said file object read from either one of said upstream computer and said storage and relayed, and storing the read file object in said storage.

11. The method of relaying a file object according to claim 8, wherein each of said plurality of control structures further has a value representing number of simultaneous prefetch access requests;

said file object includes a plurality of file objects; and said prefetch step includes the step of reading, based on said hyperlink included in said file object read from either one of said upstream computer and said storage and relayed, said file objects not larger in number than said value representing number of simultaneous prefetch access request, from either one of said upstream computer and said storage, and storing the read file objects in said storage.

12. The method of relaying a file object according to claim 8, wherein each of said plurality of control structures further has a value representing maximum number of prefetch access layers; and said prefetch step includes the step of extracting said hyperlink within said maximum number of prefetch access layers from said file object read from either one of said upstream computer and said storage and relayed, reading said file object from either one of said upstream computer and said storage based on said hyperlink, and storing the read file object in said storage.

13. The method of relaying a file object according to claim 8, wherein each of said plurality of control structures further has a value representing a total number of prefetch accesses defining, based on said hyperlink included in one of said file objects, maximum value of the number of relays in processing said file object; and said prefetch step includes the step of reading, based on said hyperlink included in said file object read from either one of said upstream computer and said storage and relayed, said file object from either one of said upstream computer and said storage within said total number of prefetch accesses, and storing said read file object in said storage.

14. The method of relaying a file object according to claim 8, wherein each of said plurality of control structures further has a file object size limit; and said prefetch step includes the step of reading, based on said hyperlink included in said file object read from either one of said upstream computer and said storage and relayed, said file object having file size not larger than said file object size limit from either one of said upstream computer and said storage, and storing said read file object in said storage.

15. The method of relaying a file object according to claim 8, wherein each of said plurality of control structures further has a file object type limit; and said prefetch step includes the step of reading, based on said hyperlink included in said file object read from either one of said upstream computer and said storage and relayed, said file object not corresponding to said file object type limit from either one of said upstream computer and said storage, and storing said read file object in said storage.

16. The method of relaying a file object according to claim 8, wherein each of said plurality of control structures further has a prefetch access inhibition upstream computer; and said prefetch step includes the step of reading, based on said hyperlink included in said file object read from either one of said upstream computer and said storage and relayed, said file object from said upstream computer and said gateway computer other than said prefetch access inhibition upstream computer, and storing said read file object in said storage.

17. The method of relaying a file object according to claim 8, wherein said upstream computer includes first and second upstream computers;

said step of relaying a user access request includes the step of reading, when said event is a request for getting said file object, said file object from either one of said first upstream computer and said storage and relaying the read file object to said client computer; and said prefetch step includes the step of further reading, based on the hyperlink included in said relayed file object, said file object from either one of said second upstream computer and said storage, and storing said further read file object in said storage.

18. The method of relaying a file object according to claim 1, further comprising the steps of:

when said event is a response designating use of said file object stored in said client computer, reading the same file object as said file object stored in said client computer designated by said response from said storage; and further reading said file object from either one of said upstream computer and said storage based on a hyperlink included in said read file object, and storing said further read file object in said storage.

19. The method of relaying a file object according to claim 1, wherein said step of relaying includes the steps of when said event is a request for getting a latest said file object, reading said latest file object from either one of said upstream computer and said storage and relaying the read file object to said client computer, and based on a hyperlink included in said relayed file object, reading said latest file object from either one of said upstream computer and said storage and storing the read file object in said storage.

20. The method of relaying a file object according to claim 1, wherein said file object is a dynamic file object.

21. A computer readable recording medium recording a program of a method of relaying a file object used in a gateway computer for relaying a file object in accordance with a plurality of control structures corresponding to a plurality of networks, respectively, wherein said gateway computer includes a storage for storing said file object;

each of said plurality of control structures has an address of a representative gateway computer to which a client computer is connected; and said method of relaying a file object includes the steps of receiving an event, when said event is a request for switching between said control structures, switching various parameters in accordance with that one of said control structures to which switching is requested, when said event is a request for getting said file object transmitted from said client computer, reading said file object from either one of an upstream computer and said storage and relaying the read file object to said client computer, and storing said relayed file object in the storage.

22. The computer readable recording medium according to claim 21, wherein said method of relaying a file object further includes the step of displaying network address information of said gateway computer.

23. The computer readable recording medium according to claim 21, wherein each of said plurality of control structures further has a permission address pattern; and said step of relaying includes the steps of determining, when said event is a request for getting said file object, whether an address of said client computer which transmitted said getting request matches said permission address pattern, and when the address matches said permission address pattern, reading said file object from either one of said upstream computer and said storage and relaying the read file object to said client computer.

24. The computer readable recording medium according to claim 21, wherein each of said plurality of control structures further has a permission user name and a password; and said step of relaying includes the steps of asking a user using said client computer which transmitted said request for getting a file object, to input a user name and a password, receiving said user name and said password transmitted from said client computer, and comparing said user name and said password received from said client computer with said user name and said password stored in said control structure, and when these match, reading said file object from either one of said upstream computer and said storage, and relaying the read file object to said client computer.

25. The computer readable recording medium according to claim 21, wherein said step of relaying a file object further includes, when said event is a request for history display, the step of displaying an address of said file object relayed in said step of relaying.

26. The computer readable recording medium according to claim 25, wherein said step of display includes when said event is a request for history display, displaying an address of said file object relayed in said step of relaying, and information specifying said network to which said gateway computer was connected at the time of relay.

27. The computer readable recording medium according to claim 25, wherein each of said plurality of control structures further has a permission user name and a password; and said step of display includes the steps of asking a user using said client computer which transmitted said request of history display, to input a user name and a password, receiving said user name and said password transmitted from said client computer, and comparing said user name and said password received from said client computer with said user name and said password stored in said control structure, and when these match, displaying an address of said file object relayed in said step of relaying.

28. The computer readable recording medium according to claim 21, wherein said file object includes a plurality of file objects; and said step of relaying includes a step of relaying a user access request for reading, when said event is a request for getting said file object, said file object from either one of said upstream computer and said storage and relaying the read file object to said client computer, and a prefetch step for further reading, based on a hyperlink included in said relayed file object, said file object from either one of said upstream computer and said storage and storing the read file object in said storage.

29. The computer readable recording medium according to claim 28, wherein each of said plurality of control structures further has a prefetch access wait time; and said prefetch step includes the steps of based on time interval of a request for getting said file object received from said client computer, determining said prefetch access wait time, and reading, based on a hyperlink included in said file object read from either one of said upstream computer and said storage and relayed to said client computer, said file object from either one of said upstream computer and said storage after said prefetch access wait time lapsed, and storing the read file object in said storage.

30. The computer readable recording medium according to claim 28, wherein each of said plurality of control structures further has a prefetch access permission flag; and said prefetch step includes the step of reading, only when said prefetch access permission flag is true, said file object from either one of said upstream computer and said storage, based on said hyperlink included in said file object read from either one of said upstream computer and said storage and relayed, and storing said read file object in said storage.

31. The computer readable recording medium according to claim 28, wherein each of said plurality of control structures further has a value representing number of simultaneous prefetch access request;

said file object includes a plurality of file objects; and said prefetch step includes the steps of reading, based on said hyperlink included in said file object read from either one of the upstream computer and said storage and relayed, said file objects not larger in number than said value representing the number of simultaneous prefetch access requests, simultaneously from either one of said upstream computer and said storage, and storing the read file objects in said storage.

32. The computer readable recording medium according to claim 28, wherein each of said plurality of control structures further has a value representing maximum number of prefetch access layers; and said prefetch step includes the step of extracting said hyperlink within said maximum number of prefetch access layers from said file object read from either one of said upstream computer and said storage and relayed, and based on the hyperlink, reading said file object from either one of said upstream computer and said storage and storing the read file object in said storage.

33. The computer readable recording medium according to claim 28, wherein each of said control structures further has a value representing a total number of prefetch accesses defining, based on said hyperlink included in one of said file objects, a maximum value of the number of relays in processing said file object; and said prefetch step includes the step of reading, based on said hyperlink included in said file object read from either one of said upstream computer and said storage and relayed, said file object within said total number of prefetch accesses from either one of said upstream computer and said storage, and storing said read file object in said storage.

34. The computer readable recording medium according to claim 28, wherein each of said plurality of control structures further has a file object size limit; and said prefetch step includes the step of reading, based on said hyperlink included in said file object read from either one of said upstream computer and said storage and relayed, said file object having a file size not larger than said file object size limit from either one of said upstream computer and said storage, and storing said read file object in said storage.

35. The computer readable recording medium according to claim 28, wherein each of said control structures further has a file object type limit; and said prefetch step includes the step of reading, based on said hyperlink included in said file object read from either one of said upstream computer and said storage and relayed, said file object not corresponding to said file object type limit from either one of said upstream computer and said storage and storing said file object in said storage.

36. The computer readable recording medium according to claim 28, wherein each of said plurality of control structures further has a prefetch access inhibition upstream computer; and said prefetch step includes the step of reading, based on said hyperlink included in said file object read from said upstream computer and said storage and relayed, said file object from said upstream computer and said gateway computer other than said prefetch access inhibition upstream computer, and storing said read file object in said storage.

37. The computer readable recording medium according to claim 28, wherein said upstream computer includes first and second upstream computers;

said step of relaying a user access request includes the step of reading, when said event is a request for getting said file object, said file object from either one of said first upstream computer and said storage and relaying the read file object to said client computer; and said prefetch step includes the step of further reading, based on a hyperlink included in said relayed file object, said file object from either one of said second upstream computer and said storage, and storing the read file object in said storage.

38. The computer readable recording medium according to claim 21, wherein said method of relaying said file object further includes the steps of when said event is a response designating use of said file object stored in said client computer, reading the same file object as said file object stored in said client computer designated by said response from said storage, and based on a hyperlink included in said read file object, further reading said file object from either one of said upstream computer and said storage and storing said further read file object in said storage.

39. The computer readable recording medium according to claim 21, wherein said step of relaying includes the steps of when said event is a request for getting latest said file object, reading latest said file object from either one of said upstream computer and said storage and relaying the read file object to said client computer, and base on a hyperlink included in said relayed file object, reading latest said file object from either one of said upstream computer and said storage and storing the read file object in said storage.

40. The computer readable recording medium according to claim 21, wherein said file object is a dynamic file object.

41. A gateway computer, comprising:

a storage for storing a plurality of control structures corresponding to a plurality of networks, respectively, and a file object;

means for receiving an event from a client computer;

means for switching, when said event is a request for switching between said control structures, various parameters in accordance with that one of said control structures to which switching is requested;

relay means for reading, when said event is a request for getting said file object, said file object from either one of an upstream computer and said gateway computer and relaying the read file object to said client computer; and storage means for storing said relayed file object in the storage; wherein each of said control structures has an address of a representative gateway computer to which said client computer is connected.

42. The gateway computer according to claim 41, further comprising means for displaying network address information of said gateway computer.

43. The gateway computer according to claim 41, wherein each of said plurality of control structures further includes a permission address pattern; and said relay means includes means for determining, when said event is a request for getting said file object, whether an address of said client computer which transmitted said getting request matches said permission address pattern, and means for reading, when the address matches said permission address pattern, said file object from either one of said upstream computer and said gateway computer and relaying said file object to said client computer.

44. The gateway computer according to claim 41, wherein each of said plurality of control structures further includes a first permission user name and a password; and said relay means includes means for asking a user using said client computer which transmitted a request for getting said file object, to input a user name and a password, means for receiving said user name and said password from said client computer, and means for comparing said user name and said password received from said client computer with said user name and said password stored in said control structure and when these match, for reading said file object from either one of said upstream computer and said gateway computer and relaying said read file object to said client computer.

45. The gateway computer according to claim 41, further comprising history display means for displaying, when said event is a request for history display, an address of said file object relayed by said relay means.

46. The gateway computer according to claim 45, wherein said history display means includes means for displaying, when said event is a request for history display, an address of said file object relayed by said relay means and information specifying said network to which said gateway computer is connected at the time of relay.

47. The gateway computer according to claim 45, wherein each of said plurality of control structures further has a permission user name and a password; and said history display means includes means for asking a user using said client computer which transmitted said request for history display to input a user name and a password, means for receiving said user name and said password transmitted from said computer, and means for comparing said user name and said password received from said computer with said user name and said password stored in said control structure and, when these match, displaying an address of said file object relayed by said relay means.

48. The gateway computer according to claim 41, wherein said relay means includes means for relaying a user access request for reading, when said event is a request for getting said file object, said file object from either one of said upstream computer and said gateway computer and relaying the read file object to said client computer, and prefetch means for further reading, based on a hyperlink included in said relayed file object, said file object from either one of said upstream computer and said gateway computer and storing the read file object in said storage.

49. The gateway computer according to claim 48, wherein each of said plurality of control structures further has a prefetch access wait time; and said prefetch means includes means for determining said prefetch access wait time based on time interval of said request for getting the file object received from said client computer, and means for reading, based on a hyperlink included in said file object read from either one of said upstream computer and said gateway computer and relayed to said client computer, said file object from either one of said upstream computer and said gateway computer after said prefetch access wait time lapsed, and storing the read file object in said storage.

50. The gateway computer according to claim 48, wherein each of said plurality of control structures further has a prefetch access permission flag; and said prefetch means includes means for further reading, based on said hyperlink included in said file object read from either one of said upstream computer and said gateway computer and relayed, said file object from either one of said upstream computer and said gateway computer and storing said further read file object in said storage, only when said prefetch access permission flag is true.

51. The gateway computer according to claim 48, wherein each of said plurality of control structures further has a value representing number of simultaneous prefetch access requests;

said file object includes a plurality of file objects; and said prefetch means includes means for reading, based on said hyperlink included in said file object read from either one of said upstream computer and said gateway computer and relayed, said file objects not larger in number than said value representing number of simultaneous prefetch access requests from either one of said upstream computer and said gateway computer and storing the read file objects in said storage.

52. The gateway computer according to claim 48, wherein each of said plurality of control structures further has a value representing a maximum number of prefetch access layers; and said prefetch means includes means for further reading, based on said hyperlink within the range of said maximum number of prefetch access layers from said file object read from said upstream computer and said gateway computer and relayed, said file object from either one of said upstream computer and said gateway computer and storing said further read file object in said storage.

53. The gateway computer according to claim 48, wherein
each of said plurality of control structures further has a
value representing a total number of prefetch accesses;
and said prefetch means includes means for further reading, based on said hyperlink included in said file object read from either one of said upstream computer and said gateway computer and relayed, said file object from either one of said upstream computer and said gateway computer within the range of said total number of prefetch accesses and storing the further read file object in said storage.

54. The gateway computer according to claim 48, wherein
each of said plurality of control structures further has a file
object size limit; and said prefetch means includes means for further reading, based on said hyperlink included in said file object read from either one of said upstream computer and said gateway computer and relayed, said file object having a file size not larger than said file object size limit from either one of said upstream computer and said gateway computer, and storing said further read file object in said storage.

55. The gateway computer according to claim 48, wherein
each of said plurality of control structures further has a file
object type limit; and said prefetch means includes means for further reading, based on said hyperlink included in said file object read from either one of said upstream computer and said gateway computer and relayed, said file object not corresponding to said file object type limit from either one of said upstream computer and said gateway computer and storing said further read file object in said storage.

56. The gateway computer according to claim 48, wherein
each of said plurality of control structures further has a
prefetch access inhibition upstream computer; and said prefetch means includes means for further reading, based on said hyperlink included in said file object read from either one of said upstream computer and said gateway computer and relayed, said file object from said upstream computer other than said prefetch access inhibition upstream computer and said gateway computer, and storing the read file object in said storage.

57. The gateway computer according to claim 48, wherein
said upstream computer includes first and second upstream computers;

said means for relaying a user access request includes means for relaying, when said event is a request for getting said file object, said file object from either one of said first upstream computer and said gateway computer and relaying the read file object to said client computer; and said prefetch means includes means for further reading, based on a hyperlink included in said relayed file object, said file object from either one of said second upstream computer and said gateway computer and storing the further read file object in said storage.

58. The gateway computer according to claim 41, wherein
said relay means includes means for reading, when said event is a response designating use of said file object stored in said client computer, the same file object as said file object stored in said client computer designated by said response from said storage, and means for further reading, based on a hyperlink included in said read file object, said file object from either one of said upstream computer and said storage, and storing said further read file object in said storage.

59. The gateway computer according to claim 41, wherein
said relay means includes means for reading, when said event is a request for getting latest said file object, latest said file object from either one of said upstream computer and said gateway computer and relaying the read file object to said client computer, and means for further reading, based on a hyperlink included in said relayed file object, latest said file object from either one of said upstream computer and said gateway computer and storing said further read file object in said storage.

60. The gateway computer according to claim 41, wherein
said file object is a dynamic file object.

* * * * *